United States Patent
Fujisaki

(10) Patent No.: US 8,897,442 B2
(45) Date of Patent: Nov. 25, 2014

(54) ENCRYPTION DEVICE, DECRYPTION DEVICE, ENCRYPTION METHOD, DECRYPTION METHOD, PROGRAM, AND RECORDING MEDIUM

(75) Inventor: Eiichiro Fujisaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 155 days.

(21) Appl. No.: 13/703,381

(22) PCT Filed: Jul. 22, 2011

(86) PCT No.: PCT/JP2011/066692
§ 371 (c)(1),
(2), (4) Date: Dec. 11, 2012

(87) PCT Pub. No.: WO2012/011564
PCT Pub. Date: Jan. 26, 2012

(65) Prior Publication Data
US 2013/0083921 A1 Apr. 4, 2013

(30) Foreign Application Priority Data
Jul. 23, 2010 (JP) .................... 2010-166406

(51) Int. Cl.
*H04L 9/00* (2006.01)
*H04L 9/28* (2006.01)
*H04L 9/08* (2006.01)
*H04L 9/30* (2006.01)

(52) U.S. Cl.
CPC ............. *H04L 9/28* (2013.01); *H04L 9/0836* (2013.01); *H04L 9/0847* (2013.01); *H04L 9/085* (2013.01); *H04L 9/3073* (2013.01)
USPC ............... 380/44; 380/28; 380/30; 380/277; 380/279; 713/171; 713/180

(58) Field of Classification Search
CPC ......... H04L 9/28; H04L 9/085; H04L 9/0836; H04L 9/0847; H04L 9/3073
USPC ........ 380/28, 30, 44, 277, 279; 713/171, 180, 713/193
See application file for complete search history.

(56) References Cited

U.S. PATENT DOCUMENTS 5,987,128 A * 11/1999 Baba ............................ 380/279
5,987,129 A * 11/1999 Baba ............................ 380/279
(Continued)

FOREIGN PATENT DOCUMENTS

| JP | 2008 177998 | 7/2008 |
|----|-------------|--------|
| WO | 2010 123112 | 10/2010 |

OTHER PUBLICATIONS

Boneh, D., et al., "Improved Efficiency for CCA-Secure Cryptosystems Built Using Identity-Based Encryption," Proc. of CT-RSA'05, pp. 1-18, (2004).

(Continued)

*Primary Examiner* — Thu Ha Nguyen
(74) *Attorney, Agent, or Firm* — Oblon, Spivak, McClelland, Maier & Neustadt, L.L.P.

(57) ABSTRACT

In encryption, a random number r is generated to generate a ciphertext $C_2=M(+)R(r)$, function values $H_S(r, C_2)$, a common key K, a ciphertext $C(\Psi+1)$ of the random number r using the common key K, and ciphertexts $C(0)$ and $C(\lambda)$ of the common key K that correspond to function values $H_S(r, C_2)$. In decryption, a common key K' is decrypted from input ciphertexts $C'(0)$ and $C'(\lambda)$, an input ciphertext $C'(\Psi+1)$ is decrypted by using the common key K' to generate a decrypted value r', and function values $H_S(r', C_2')$ is generated. If the input ciphertexts $C'(0)$ and $C'(\lambda)$ do not match ciphertexts $C''(0)$ and $C''(\lambda)$ of the common key K' that correspond to the function values $H_S(r', C_2')$, decryption is rejected; if they match, the input ciphertext $C_2'$ is decrypted.

34 Claims, 10 Drawing Sheets

(56) References Cited

U.S. PATENT DOCUMENTS

| | | | | |
|---|---|---|---|---|
| 6,285,760 | B1* | 9/2001 | Crandall | 380/30 |
| 7,088,821 | B2* | 8/2006 | Shaik | 380/30 |
| 7,093,137 | B1* | 8/2006 | Sato et al. | 713/193 |
| 7,933,414 | B2* | 4/2011 | Bauchot et al. | 380/279 |
| 8,316,237 | B1* | 11/2012 | Felsher et al. | 713/171 |
| 8,515,060 | B2* | 8/2013 | Fujisaki et al. | 380/28 |
| 8,630,419 | B2* | 1/2014 | Mori | 380/277 |
| 8,683,208 | B2* | 3/2014 | Hayashi et al. | 713/180 |
| 2002/0122555 | A1* | 9/2002 | Crandall | 380/30 |
| 2002/0141577 | A1* | 10/2002 | Ripley et al. | 380/201 |
| 2005/0195975 | A1* | 9/2005 | Kawakita | 380/30 |
| 2006/0036853 | A1* | 2/2006 | Chen et al. | 713/161 |
| 2008/0046731 | A1* | 2/2008 | Wu | 713/171 |
| 2010/0317420 | A1* | 12/2010 | Hoffberg | 463/1 |
| 2011/0202776 | A1* | 8/2011 | Chen et al. | 713/193 |
| 2011/0296192 | A1* | 12/2011 | Hayashi et al. | 713/180 |

OTHER PUBLICATIONS

Boneh, D., et al., "Identity-Based Encryption from the Weil Pairing," Crypto 2001, Lecture Notes in Computer Science, vol. 2139, pp. 213-229, (2001).

Canetti, R., et al., "Chosen-Ciphertext Security From Identity-Based Encryption," Proc. of Eurocrypt'04, LNCS 3027, pp. 207-222, (2004).

"Information technology—Security techniques—Encryption algorithms—Part 2: Asymmetric ciphers," ISO/IEC, 18033-2, Total 2 Pages, (May 1, 2006).

Boyen, X., et al., "Identity Based Cryptography Standard (IBCBS) #1: Supersingular Curve Implementations of the BF and BB1 Cryptosystems," Network Working Group, Voltage Security, Total 63 Pages, (Dec. 2007).

Blake, I., et al., "Elliptic Curves in Cryptography," London Mathematical Society, Lecture Note Series 265, Total 4 Pages, (Dec. 20, 2001).

Menezes, A.J., "Elliptic Curve Public Key Cryptosystems," Kluwer Academic Publishers, Ch. 5, pp. 61-81, (1993).

Miller, V.S., "Short Programs for functions on Curves," http://crypto.stanford.edu/miller.pdf., Total 7 Pages, (May 6, 1986).

Miyaji, A., et al., "New explicit conditions of elliptic curve traces for FR-reduction," IEICE Tras. Fundamentals, vol. E84-A, No. 5, pp. 1234-1243, (May 2001).

Barreto, P.S.L.M., et al., "Constructing Elliptic Curves with Prescribed Embedding Degrees," Proc. SCN'2002, LNCS 2576, pp. 257-267, (2003).

Dupont, R., et al., "Building curves with arbitrary small MOV degree over finite prime fields," http://eprint.iacr.org/2002/094/, Total 13 Pages, (Jul. 18, 2002).

Katz, J., et al., "Predicate Encryption Supporting Disjunctions, Polynomial Equations, and Inner Products," Eurocrypt 2008, LNCS 4965, pp. 146-162, (2008).

Shamir, A., "How to Share a Secret," Communications of the ACM, vol. 22, No. 11, Total 2 Pages (Nov. 1979).

International Search Report Issued Aug. 16, 2011 in PCT/JP11/66692 Filed Jul. 22, 2011.

* cited by examiner

ENCRYPTION DEVICE, DECRYPTION DEVICE, ENCRYPTION METHOD, DECRYPTION METHOD, PROGRAM, AND RECORDING MEDIUM

TECHNICAL FIELD

The present invention relates to a security technique and, in particular, to an encryption technique.

BACKGROUND ART

One study field of encryption is Chosen Ciphertext Attacks-secure (CCA-secure) cryptography. In these years in particular, studies are being actively made to attempt to construct CCA-secure cryptosystems based on Identity-Based Encryption (IBE), which in general are secure only from Chosen Plaintext Attacks (CPA) (see for example Non-patent literature 1). For example, Non-patent literature 2 proposes CHK transformation. In the CHK transformation, a one-time signature is used in order to construct a CCA-secure encryption scheme based on an arbitrary CPA-secure identity-based encryption scheme. For example, Non-patent literature 3 proposes BK transformation. In the BK transformation, a Message Authentication Code (MAC) and a bit commitment scheme are used in order to construct a CCA-secure encryption scheme based on an arbitrary CPA-secure identity-based encryption.

PRIOR ART LITERATURE

Non-Patent Literature

Non-patent literature 1: D. Boneh, M. Franklin, "Identity based encryption from the Weil pairing," Crypto 2001, Lecture Notes in Computer Science, Vol. 2139, Springer-Verlag, pp. 213-229, 2001.

Non-patent literature 2: R. Canetti, S. Halevi, J. Katz, "Chosen-Ciphertext Security from Identity-Based Encryption," Proc. of EUROCRYPT'04, LNCS 3027, pp. 207-222, 2004.

Non-patent literature 3: D. Boneh, J. Katz, "Improved Efficiency for CCA-Secure Cryptosystems Built Using Identity-Based Encryption," Proc. of CT-RSA'05, LNCS 3376, pp. 87-103, 2005.

SUMMARY OF THE INVENTION

Problems to be Solved by the Invention

A ciphertext generated on the basis of the CHK transformation described above includes an encrypted plaintext, a one-time signature of the encrypted plaintext, and a signature key for verifying the one-time signature. Accordingly, ciphertext spaces of a ciphertext generated on the basis of the CHK transformation include not only a space for the encrypted plaintext but also spaces for the one-time signature and the signature key. A ciphertext generated on the basis of the BK transformation described above includes an encrypted plaintext, a message authentication code, and a bit commitment string. Accordingly, a ciphertext space of a ciphertext generated on the basis of the BK transformation includes not only a space for the encrypted plaintext but also spaces for the message authentication code and the bit commitment string. That is, ciphertext spaces generated on the basis of the CHK transformation and the BK transformation include two-dimensional spaces allocated only for improving security against CCA. However, since the amount of computation and the amount of data increase with increasing size of a ciphertext space, it is desirable that the size of the ciphertext space be as small as possible.

In the identity-based encryption, an encrypting party needs to obtain an ID of a decryption party before the encrypting party can encrypt. It would be convenient if a scheme can be constructed in which an encrypting party can generate a ciphertext without having to identify a decryption party and one who meets a desired condition can decrypt the ciphertext.

The present invention has been made in light of these circumstances and provides an encryption scheme that is convenient and capable of improving security against CCA without an additional ciphertext space for the CCA security.

Means to Solve the Problems

In encryption according to the present invention, a random number r is generated and a ciphertext $C_2$ which is the exclusive OR of a binary sequence dependent on the random number r and a binary sequence which is a plaintext M is generated. The pair of random number r and ciphertext $C_2$ are input into each of collision-resistant functions $H_S$ ($S=1, \ldots, S_{max}$) to generate $S_{max}$ ($S_{max} \geq 1$) function values $H_S(r, C_2)$ ($S=1, \ldots, S_{max}$). A common key K which is an element of a cyclic group $G_T$ is generated and the common key K is used to encrypt the random number r by common key cryptosystem, thereby generating a ciphertext $C(\Psi+1)$. A ciphertext $C_1$ including $C(0)=\upsilon \cdot b_1(0) + \Sigma_{\iota=2}^{I} \upsilon_\iota(0) \cdot b_\iota(0)$, $C(\lambda)=\upsilon \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota(\lambda) \cdot b_\iota(\lambda)$ and a ciphertext $C(\Psi+1)$ is generated.

Here, $\Psi$ is an integer greater than or equal to 1, $\phi$ is an integer greater than or equal to 0 and less than or equal to $\Psi$, $n(\phi)$ is an integer greater than or equal to 1, $\zeta(\phi)$ is an integer greater than or equal to 0, $\lambda$ is an integer greater than or equal to 1 and less than or equal to $\Psi$, I is a constant greater than or equal to 2 and less than or equal to $n(0)+\zeta(0)$, $e_\phi$, is a nondegenerate bilinear map that outputs one element of a cyclic group $G_T$ in response to input of $n(\phi)+\zeta(\phi)$ elements $\gamma_\beta$ ($\beta=1, \ldots, n(\phi)+\zeta(\phi)$) of a cyclic group $G_1$ and $n(\phi)+\zeta(\phi)$ elements $\gamma_\beta^*$ ($\beta=1, \ldots, n(\phi)+\zeta(\phi)$) of a cyclic group $G_2$, i is an integer greater than or equal to 1 and less than or equal to $n(\phi)+\zeta(\phi)$, $b_i(\phi)$ are $n(\phi)+\zeta(\phi)$-dimensional basis vectors each consisting of $n(\phi)+\zeta(\phi)$ elements of the cyclic group $G_1$, $b_i^*(\phi)$ are $n(\phi)+\zeta(\phi)$-dimensional basis vectors each consisting of $n(\phi)+\zeta(\phi)$ elements of the cyclic group $G_2$, $\delta(i, j)$ is a Kronecker delta function, $e_\phi(b_i(\phi), b_j^*(\phi))=g_T^{\tau \cdot \tau' \cdot \delta(i,j)}$ are satisfied for the generator $g_T$ of the cyclic group $G_T$ and constants $\tau$ and $\tau'$, and $w(\lambda)^{\rightarrow}=(w_1(\lambda), \ldots, w_{n(\lambda)}(\lambda))$ is an $n(\lambda)$-dimensional vector consisting of $w_1(\lambda), \ldots, w_{n(\lambda)}(\lambda)$. At least some of the values $\upsilon$, $\upsilon_\iota(0)$ ($\iota=2, \ldots, I$), $\upsilon_\iota(\lambda)$ ($\iota=n(\lambda)+1, \ldots, n(\lambda)+\zeta(\lambda)$) correspond to at least some of the function values $H_S(r, C_2)$ ($S=1, \ldots, S_{max}$).

In decryption according to the present invention, if coefficients const($\mu$) that satisfy $SE=\Sigma_{\mu \in SET}$ const ($\mu$)·share ($\mu$) ($\mu \in SET$) exist, first key information $D^*(0)$, second key information $D^*(\lambda)$, and input ciphertexts $C'(0)$ and $C'(\lambda)$ are used to generate a common key $K'$ as follows:

$$K' = e_0(C'(0), D^*(0)) \cdot \prod_{\mu \in SET \wedge LAB(\mu)=v(\mu)^{\rightarrow}} e_\mu(C'(\mu), D^*(\mu))^{const(\mu)} \cdot$$

$$\prod_{\mu \in SET \wedge LAB(\mu)=\neg v(\mu)^{\rightarrow}} e_\mu(C'(\mu), D^*(\mu))^{const(\mu)/(v(\mu)^{\rightarrow} \cdot w(\mu)^{\rightarrow})}$$

The common key K' is used to decrypt an input ciphertext C'($\Psi$+1), thereby generating a decrypted value r'. The pair of decrypted value r' and input ciphertext $C_2$' are input into each of collision-resistant functions $H_S$ (S=1, ..., $S_{max}$) to generate $S_{max}$ ($S_{max} \geq 1$) function values $H_S$(r', $C_2$') (S=1, ..., $S_{max}$). If the ciphertexts C'(0) and C'($\lambda$) do not match ciphertexts C''(0)=$\upsilon$''·$b_1$(0)+$\Sigma_{\iota=2}^{I} \upsilon_\iota$''(0)·$b_\iota$(0) and C''($\lambda$)=$\upsilon$''·$\Sigma_{\iota=1}^{n(\lambda)} w_\iota$($\lambda$)·$b_\iota$($\lambda$)+$\Sigma_{\iota=n(\lambda)+1}^{n(\lambda)+\zeta(\lambda)} \upsilon_\iota$''($\lambda$)·$b_\iota$($\lambda$), respectively, decryption is rejected.

Here, v($\lambda$)$^\to$=($v_1$($\lambda$), ..., $v_{n(\lambda)}$($\lambda$)) is an n($\lambda$)-dimensional vector consisting of $v_1$($\lambda$), ..., $v_{n(\lambda)}$($\lambda$), w($\lambda$)$^\to$=($w_1$($\lambda$), ..., $w_{n(\lambda)}$($\lambda$)) is an n($\lambda$)-dimensional vector consisting of $w_1$($\lambda$), ..., $w_{n(\lambda)}$($\lambda$), labels LAB($\lambda$) ($\lambda$=1, ..., $\Psi$) are pieces of information each representing the n($\lambda$)-dimensional vector v($\lambda$)$^\to$ or the negation $\neg$ v($\lambda$)$^\to$ of the n($\lambda$)-dimensional vector v($\lambda$)$^\to$, "LAB($\lambda$)=v($\lambda$)$^\to$" means that LAB($\lambda$) represents the n($\lambda$)-dimensional vector v($\lambda$)$^\to$, "LAB($\lambda$)=$\neg$ v($\lambda$)$^\to$" means that LAB($\lambda$) represents the negation $\neg$ v($\lambda$)$^\to$ of the n($\lambda$)-dimensional vector v($\lambda$)$^\to$, share($\lambda$) ($\lambda$=1, ..., $\Psi$) represents shared information obtained by secret-sharing of secret information SE, the first key information is D*(0)=−SE·$b_1$*(0)+$\Sigma_{\iota=2}^{I}$ coef$_\iota$(0)·$b_\iota$*(0), the second key information for $\lambda$ that satisfies LAB($\lambda$)=v($\lambda$)$^\to$ is D*($\lambda$)=(share($\lambda$)+coef($\lambda$)·$v_1$($\lambda$))·$b_1$*($\lambda$)+$\Sigma_{\iota=2}^{n(\lambda)}$coef($\lambda$)·$v_\iota$($\lambda$)·$b_\iota$*($\lambda$)+$\Sigma_{\iota=n(\lambda)+1}^{n(\lambda)+\zeta(\lambda)}$ coef$_\iota$($\lambda$)·$b_\iota$*($\lambda$), the second key information for $\lambda$ that satisfies LAB($\lambda$)=$\neg$ v($\lambda$)$^\to$ is D*($\lambda$)=share($\lambda$)·$\Sigma_{\iota=1}^{n(\lambda)} v_\iota$($\lambda$)·$b_\iota$*($\lambda$)+$\Sigma_{\iota=n(\lambda)+1}^{n(\lambda)+\zeta(\lambda)}$ coef$_\iota$($\lambda$)·b*($\lambda$), and SET represents a set of $\lambda$ that satisfies {LAB($\lambda$)=v($\lambda$)$^\to$}$\wedge$ {v($\lambda$)$^\to$·w($\lambda$)$^\to$=0} or {LAB($\lambda$)=$\neg$ v($\lambda$)$^\to$}$\wedge${v($\lambda$)$^\to$·w($\lambda$)$^\to$$\neq$0}. At least some of the values of $\upsilon$'', $\upsilon_\iota$''(0) ($\iota$=2, ..., I), $\upsilon_\iota$''($\lambda$) ($\iota$=n($\lambda$)+1, ..., n($\lambda$)+$\zeta$($\lambda$)) correspond to at least some of function values $H_S$(r', C2') (S=1, ..., $S_{max}$).

Effects of the Invention

The present invention improves security against CCA because if ciphertexts C' (0) and C' ($\lambda$) do not match C'' (0) and C'' ($\lambda$), respectively, decryption is rejected. The present invention does not require an additional ciphertext space for the CCA security. According to the present invention, an encrypting party can generate a ciphertext without having to identify a decryption party and one who meets a desired condition can decrypt the ciphertext.

Thus, the present invention is convenient and is capable of improving security against CCA without requiring an additional ciphertext space for the CCA security.

DETAILED DESCRIPTION OF THE EMBODIMENTS

Figure 1:
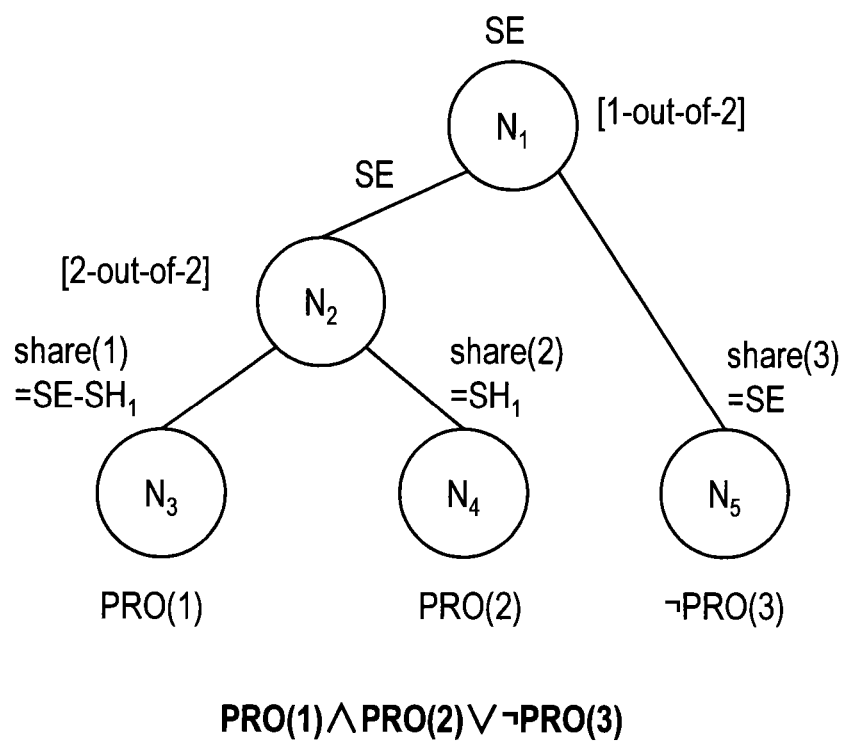
FIG. 1 is a diagram illustrating tree-structure data representing normal logical formulas.

Embodiments for carrying out the present invention will be described.

Definitions

Matrix: The term "matrix" represents a rectangular array of elements of a set for which an operation is defined. Not only elements of a ring but also elements of a group can form the matrix.

($\bullet$)$^T$: ($\bullet$)$^T$ represents the transposed matrix of $\bullet$.

($\bullet$)$^{-1}$: ($\bullet$)$^{-1}$ represents the inverse matrix of $\bullet$.

$\wedge$ : $\wedge$ is a logical symbol representing logical conjunction (AND).

$\vee$ : $\vee$ is a logical symbol representing logical disjunction (OR).

$\neg$ : $\neg$ is a logical symbol representing negation (NOT).

Propositional variable: A propositional variable is a variable on a set {true, false} whose elements are "true" and false" of a proposition. That is, the domain of propositional variables is a set whose elements are "true" and "false" values. Propositional variables and the negations of the propositional variables are collectively called literals.

Logical formula: A logical formula is a formula expressing a proposition in mathematical logic. Specifically, "true" and "false" is logical formulas, a propositional variable is a logical formula, the negation of a logical formula is a logical formula, the AND of logical formulas is a logical formula, and the OR of logical formulas is a logical formula.

Z: Z represents the integer set.

sec: sec represents a security parameter (sec $\in$ Z, sec>0).

0*: 0* represents a string of a * number of 0s.

1*: 1* represents a string of a * number of 1s.

{0, 1}*: {0, 1}* represents a binary sequence of an arbitrary bit length. An example of {0, 1}* is an integer sequence consisting of 0s and/or 1s. However, {0, 1}* is not limited to an integer sequence consisting of 0s and/or 1s. {0, 1}* is synonymous with a finite field of order 2 or an extension of such a finite field.

{0, 1}$^\zeta$: {0, 1}$^\zeta$ is a binary sequence having a bit length of $\zeta$ ($\zeta \in$ Z, $\zeta$>0). An example of {0, 1}$^\zeta$ is a sequence of $\zeta$ integers 0s and/or 1s. However, {0, 1}$^\zeta$ is not limited to a sequence of integers 0s and/or 1s. {0, 1}$^\zeta$ is synonymous with a finite field of order 2 (when $\zeta$=1) or an extension of degree $\zeta$ of a finite field (when $\zeta$>1).

(+): (+) represents an exclusive OR operator between binary sequences. For example, 10110011(+)11100001=01010010 holds.

$F_q$: $F_q$ represents a finite field of order q. Order q is an integer greater than or equal to 1 and may be a prime or a power of a prime, for example. That is, an example of finite filed $F_q$ is a prime field or an extension field over a prime filed. An operation in the prime finite filed $F_q$ can be defined simply by a modulo operation with order q as the modulus, for example. An operation in the extension finite field $F_q$ can be defined simply by a modulo operation with an irreducible polynomial as the modulus, for example. A specific method for constructing the finite filed $F_q$ is disclosed in Reference literature 1 "ISO/IEC 18033-2: Information technology—Security techniques—Encryption algorithms—Part 2: Asymmetric ciphers", for example.

$0_F$: $0_F$ represents the additive identity (zero element) of the finite field $F_q$.

$1_F$: $1_F$ represents the multiplicative identity of the finite field $F_q$.

$\delta(i, j)$: $\delta(i, j)$ represents a Kronecker delta function. When $i=j$, $\delta(i, j)=1_F$ is satisfied; when $i \neq j$, $\delta(i, j)=0_F$ is satisfied.

E: E represents an elliptic curve defined on the finite field $F_q$. The elliptic curve E is a set including a set of points (x, y) consisting of $x, y \in F_q$ that satisfy the Weierstrass equation in affine coordinates given below and a special point O called a point at infinity.

$$y^2 + a_1 \cdot x \cdot y + a_3 \cdot y = x^3 + a_2 \cdot x^2 + a_4 \cdot x + a_6$$

Here, $a_1, a_2, a_3, a_4, a_6 \in F_q$ holds.

A binary operation + called elliptic curve addition is defined for arbitrary two points on the elliptic curve E and a unary operation − called inverse operation is defined for arbitrary one point on the elliptic curve E. It is well known that a finite set consisting of rational points on the elliptic curve E form a group with respect to elliptic curve addition and that an operation called elliptic curve scalar multiplication can be defined using elliptic curve addition. Specific methods for calculating elliptic operations such as elliptic curve addition on computer are also well known (see Reference literature 1, reference literature 2 "RFC 5091: Identity-Based Cryptography Standard (IBCS) #1: Supersingular Curve Implementations of the BF and BB1 Cryptosystems", Reference literature 3 "Ian F. Blake, Gadiel Seroussi, Nigel Paul Smart, "Elliptic Curves in Cryptography", published by Peason Education, ISBN4-89471-431-0, for example).

A finite set consisting of rational points on the elliptic curve E has a subgroup of order p (p≥1). For example, a finite set E[p] consisting of p-division points on the elliptic curve E forms a subgroup of a finite set consisting of rational points on the elliptic curve E, where #E is the number of elements in the finite set consisting of the rational points on the elliptic curve E and p is a large prime that can divide #E. The "p-division points on the elliptic curve E" means the points for which the elliptic curve scalar multiplication value p·A on the elliptic curve E satisfies p·A=O, among the points A on the elliptic curve E.

$G_1, G_2, G_T$: $G_1, G_2,$ and $G_T$ represent cyclic groups of order q. Specific examples of cyclic groups $G_1$ and $G_2$ are a finite set E[p] consisting of p-division points on the elliptic curve E and its subgroups. $G_1$ may or may not be equal to $G_2$. A specific example of cyclic group $G_T$ is a finite set constituting an extension field over the finite field $F_q$. One example is a finite set consisting of the p-th roots of 1 in the algebraic closure of a finite filed $F_q$. When the order of the cyclic groups $G_1, G_2, G_T$ is equal to the order of the finite field $F_q$, the security is higher.

In the present embodiment, operations defined on the cyclic groups $G_1, G_2$ are additively expressed while operations defined on the cyclic group $G_T$ are multiplicatively expressed. For example, $\chi \cdot \Omega \in G_1$ for $\chi \in F_q$ and $\Omega \in G_1$ means that an operation defined by the cyclic group $G_1$ is repeated $\chi$ times on $\Omega \in G_1$; $\Omega_1 + \Omega_2 \in G_1$ for $\Omega_1, \Omega_2 \in G_1$ means that an operation defined by the cyclic group $G_1$ is performed on operands $\Omega_1 \in G_1$ and $\Omega_2 \in G_1$. Similarly, for example $\chi \cdot \Omega \in G_2$ for $\chi \in F_q$ and $\Omega \in G_2$ means that an operation defined by the cyclic group $G_2$ is performed $\chi$ times on $\Omega \in G_2$; $\Omega_1 + \Omega_2 \in G_2$ for $\Omega_1, \Omega_2 \in G_2$ means that an operation defined by the cyclic group $G_2$ is performed on operands $\Omega_1 \in G_2$ and $\Omega_2 \in G_2$. On the other hand, $\Omega^\chi \in G_T$ for $\chi \in F_q$ and $\Omega \in G_T$ means that for example an operation defined by the cyclic group $G_T$ is performed $\chi$ times on $\Omega \in G_T$; $\Omega_1 \cdot \Omega_2 \in G_T$ for $\Omega_1, \Omega_2 \in G_T$ means that an operation defined by the cyclic group $G_T$ is performed on operands $\Omega_1 \in G_T$ and $\Omega_2 \in G_T$.

$\Psi$: $\Psi$ represents an integer greater than or equal to 1.

$\phi$: $\phi$ represents an integer greater than or equal to 0 and less than or equal to $\Psi$ ($\phi=0, \ldots, \Psi$).

$\lambda$: $\lambda$ represents an integer greater than or equal to 1 and less than or equal to $\Psi$ ($\lambda=1, \ldots, \Psi$).

$n(\phi)$: $n(\phi)$ represents a predetermined integer greater than or equal to 1.

$\zeta(\phi)$: $\zeta(\phi)$ represents a predetermined integer greater than or equal to 0.

$G_1^{n(\phi)+\zeta(\phi)}$: $G_1^{n(\phi)+\zeta(\phi)}$ represents the direct product of the $n(\phi)+\zeta(\phi)$ cyclic groups $G_1$.

$G_2^{n(\phi)+\zeta(\phi)}$: $G_2^{n(\phi)-\zeta(\phi)}$ represents the direct product of the $n(\phi)+\zeta(\phi)$ cyclic groups $G_2$.

$g_1, g_2, g_T$: $g_1, g_2,$ and $g_T$ represent the generators of the cyclic groups $G_1, G_2,$ and $G_T$, respectively.

$V(\phi)$: $V(\phi)$ represents an $n(\phi)+\zeta(\phi)$-dimensional vector space spanned by the direct product of the $n(\phi)+\zeta(\phi)$ cyclic groups $G_1$.

$V^*(\phi)$: $V^*(\phi)$ represents an $n(\phi)+\zeta(\phi)$-dimensional vector space spanned by the direct product of the $n(\phi)+\zeta(\phi)$ cyclic groups $G_2$.

$e_\phi$: $e_\phi$ represents a nondegenerate bilinear map that maps the direct product $G_1^{n(\phi)+\zeta(\phi)} \times G_2^{n(\phi)+\zeta(\phi)}$ of direct products $G_1^{n(\phi)+\zeta(\phi)}$ and $G_2^{n(\phi)+\zeta(\phi)}$ to the cyclic group $G_T$. The bilinear map $e_\phi$, outputs one element of the cyclic group $G_T$ in response to input of $n(\phi)+\zeta(\phi)$ elements $\gamma_\beta$ ($\beta=1, \ldots, n(\phi)+\zeta(\phi)$ of the cyclic group $G_1$ and $n(\phi)+\zeta(\phi)$ elements $\gamma_\beta^*$ ($\beta=1, \ldots, n(\phi)+\zeta(\phi)$ of the cyclic group $G_2$.

$$e_\phi : G_1^{n(\phi)+\zeta(\phi)} \times G_2^{n(\phi)-\zeta(\phi)} \to G_T \qquad (1)$$

The bilinear map $e_\phi$ satisfies the following properties.

[Bilinearity] For all of $\Gamma_1 \in G_1^{n(\phi)+\zeta(\phi)}$, $\Gamma_2 \in G_2^{n(\phi)+\zeta(\phi)}$, and $v, \kappa \in F_q$, the bilinear map $e_\phi$ satisfies the following relationship:

$$e_\phi(v \cdot \Gamma_1, \kappa \cdot \Gamma_2) = e_\phi(\Gamma_1, \Gamma_2)^{v \cdot \kappa} \qquad (2)$$

[Nondegenerateness] The bilinear map $e_\phi$ is not a map that maps all of $\Gamma_1 \in G_1^{n(\phi)+\zeta(\phi)}$, $\Gamma_2 \in G_2^{n(\phi)+\zeta(\phi)}$ to the identity element of the cyclic group $G_T$.

[Computability] There is an algorithm that efficiently calculates $e_\phi(\Gamma_1, \Gamma_2)$ for all of $$\Gamma_1 \in G_1^{n(\phi)+\zeta(\phi)}, \Gamma_2 \in G_2^{n(\phi)+\zeta(\phi)} \qquad (3)$$

In the present embodiment, the nondegenerate bilinear map given below that maps the direct product $G_1 \times G_2$ of the cyclic groups $G_1$ and $G_2$ to the cyclic group $G_T$ is used to construct the bilinear map $e_\phi$.

$$\text{Pair}: G_1 \times G_2 \to G_T \qquad (4)$$

The bilinear map $e_\phi$ in this embodiment outputs one element of subgroup $G_T$ for inputs of an $n(\phi)+\zeta(\phi)$-dimensional vector $(\gamma_1, \ldots, \gamma_{n(\phi)+\zeta(\phi)})$ consisting of $n(\phi)+\zeta(\phi)$ elements $\gamma_\beta$ ($\beta=1, \ldots, n(\phi)+\zeta(\phi)$) of the cyclic group $G_1$ and an $n(\phi)+\zeta(\phi)$-dimensional vector $(\gamma_1^*, \ldots, \gamma_{n(\phi)+\zeta(\phi)}^*)$ consisting of $n(\phi)+\zeta(\phi)$ elements $\gamma_\beta^*$ ($\beta=1, \ldots, n(\phi)+\zeta(\phi)$) of the cyclic group $G_2$.

$$e_\phi : \Pi_{\beta=1}^{n(\phi)+\zeta(\phi)} \text{Pair}(\gamma_\beta, \gamma_\beta^*) \qquad (5)$$

The bilinear map Pair outputs one element of the cyclic group $G_T$ in response to input of a pair of one element of the cyclic group $G_1$ and one element of the cyclic group $G_2$. The bilinear map Pair satisfies the following properties.

[Bilinearity] For all of $\Omega_1 \in G_1$, $\Omega_2 \in G_2$, and $\nu, \kappa \in F_q$, the bilinear map Pair satisfies the following relationship:

$$\text{Pair}(\nu \cdot \Omega_1, \kappa \cdot \Omega_2) = \text{Pair}(\Omega_1, \Omega_2)^{\nu \cdot \kappa} \quad (6)$$

[Nondegenerateness] The bilinear map Pair is not a map that maps all of $$\Omega_1 \in G_1, \Omega_2 \in G_2 \quad (7)$$

to an identity element of the cyclic group $G_T$.

[Computability] There is an algorithm that efficiently calculates $\text{Pair}(\Omega_1, \Omega_2)$ for all $\Omega_1 \in G_1$, $\Omega_2 \in G_2$.

Specific examples of bilinear map Pair include functions for pairing operations such as Weil pairing and Tate pairing (see Reference literature 4 "Alfred J. Menezes, ELLIPTIC CURVE PUBLIC KEY CRYPTOSYSTEMS, KLUWER ACADEMIC PUBLISHERS, ISBN 0-7923-9368-6, pp. 61-81, for example). Depending on the type of the elliptic curve E, the bilinear map Pair may be a modified pairing function $e(\Omega_1, \text{phi}(\Omega_2))$ $(\Omega_1 \in G_1, \Omega_2 \in G_2)$, which is a combination of a function for performing a pairing operation such as Tate pairing and a given function phi (see Reference literature 2, for example). Examples of algorithms for performing pairing operations on computer include well-known Miller's algorithm (Reference literature 5 "V. S. Miller, "Short Programs for functions on Curves," 1986, Internet http://crypto.stanford.edu/miller/miller.pdf). Methods for constructing elliptic curves and cyclic groups for efficient pairing operations are also well known (see Reference literature 2, Reference literature 6 "A. Miyaji, M. Nakabayashi, S. Takano, "New explicit conditions of elliptic curve Traces for FR-Reduction," IEICE Trans. Fundamentals, vol. E84-A, no 05, pp. 1234-1243, May 2001", Reference literature 7 "P. S. L. M. Barreto, B. Lynn, M. Scott, "Constructing elliptic curves with prescribed embedding degrees, "Proc. SCN '2002, LNCS 2576, pp. 257-267, Springer-Verlag. 2003", and Reference literature 8 "R. Dupont, A. Enge, F. Morain, "Building curves with arbitrary small MOV degree over finite prime fields" http://eprint.iacr.org/2002/094/", for example).

$a_i(\phi)$ $(i=1, \ldots, n(\phi)+\zeta(\phi))$: $a_i(\phi)$ represent $n(\phi)+\zeta(\phi)$-dimensional basis vectors each consisting of $n(\phi)+\zeta(\phi)$ elements of the cyclic group $G_1$. For example, the basis vectors $a_i(\phi)$ are the $n(\phi)+\zeta(\phi)$-dimensional basis vectors whose i-th dimensional elements are $\kappa_1 \cdot g_1 \in G_1$ and the other $n(\phi)+\zeta(\phi)-1$ elements are the identity elements (additively represented as "0") of the cyclic group $G_1$. In this example, the elements of the $n(\phi)+\zeta(\phi)$-dimensional basis vectors $a_i(\phi)$ $(i=1, \ldots, n(\phi)+\zeta(\phi))$ can be listed as follows:

$$a_1(\varphi) = (\kappa_1 \cdot g_1, 0, 0, \ldots, 0) \quad (8)$$
$$a_2(\varphi) = (0, \kappa_1 \cdot g_1, 0, \ldots, 0)$$
$$\ldots$$
$$a_{n(\varphi)+\zeta(\varphi)}(\varphi) = (0, 0, 0, \ldots, \kappa_1 \cdot g_1)$$

Here, $\kappa_1$ is a constant consisting of elements of a finite element $F_q$ other than the additive identity $0_F$. A specific example of $\kappa_1 \in F_q$ is $\kappa_1 = 1_F$. The basis vectors $a_i(\phi)$ are orthogonal bases and all $n(\phi)+\zeta(\phi)$-dimensional vectors consisting of $n(\phi)+\zeta(\phi)$ elements of the cyclic group $G_1$ can be represented by the linear sum of $n(\phi)+\zeta(\phi)$-dimensional basis vectors $a_i(\phi)$ $(i=1, \ldots, n(\phi)+\zeta(\phi))$. That is, the $n(\phi)+\zeta(\phi)$-dimensional basis vectors $a_i(\phi)$ span the vector space $V(\phi)$ described above.

$a_i^*(\phi)$ $(i=1, \ldots, n(\phi)+\zeta(\phi))$: $a_i^*(\phi)$ represents $n(\phi)+\zeta(\phi)$-dimensional basis vectors each consisting of $n(\phi)+\zeta(\lambda)$ elements of the cyclic group $G_2$. For example, the basis vectors $a_i^*(\phi)$ are the $n(\phi)+\zeta(\phi)$-dimensional basis vectors whose i-th elements are $\kappa_2 \cdot g_2 \in G_2$ and the other $n(\phi)+\zeta(\phi)-1$ elements are the identity elements (additively represented as "0") of the cyclic group $G_2$. In this example, the elements of the basis vectors $a_i^*(q)$ $(i=1, \ldots, n(\phi)+\zeta(\phi))$ can be listed as follows:

$$a_1^*(\varphi) = (\kappa_2 \cdot g_2, 0, 0, \ldots, 0) \quad (9)$$
$$a_2^*(\varphi) = (0, \kappa_2 \cdot g_2, 0, \ldots, 0)$$
$$\ldots$$
$$a_{n(\varphi)+\zeta(\varphi)}^*(\varphi) = (0, 0, 0, \ldots, \kappa_2 \cdot g_2)$$

Here, $\kappa_2$ is a constant consisting of elements of the finite field $F_q$ other than the additive identity $0_F$. A specific example of $\kappa_2 \in F_q$ is $\kappa_2 = 1_F$. The basis vectors $a_i^*(\phi)$ are orthogonal bases and all $n(\phi)+\zeta(\phi)$-dimensional vectors consisting of $n(\phi)+\zeta(\phi)$ elements of the cyclic group $G_2$ can be represented by the linear sum of the $n(\phi)+\zeta(\phi)$-dimensional basis vectors $a_i^*(\phi)$ $(i=1, \ldots, n(\phi)+\zeta(\phi))$. That is, the $n(\phi)+\zeta(\phi)$-dimensional basis vectors $a_i^*(\phi)$ span the vector space $V^*(\phi)$ described above.

The basis vectors $a_i(\phi)$ and $a_i^*(\phi)$ satisfy $$e_\phi(a_i(\phi), a_j^*(\phi)) = g_T^{\tau \cdot \delta(i,j)} \quad (10)$$

for elements $\tau = \kappa_1 \cdot \kappa_2$ of the finite field $F_q$ other than $0_F$. That is, from Formulas (5) and (6), when i=j, the basis vectors satisfy $$e_\varphi(a_i(\varphi), a_j^*(\varphi)) = \text{Pair}(\kappa_1 \cdot g_1, \kappa_2 \cdot g_2) \cdot \text{Pair}(0, 0) \cdot \ldots \cdot \text{Pair}(0, 0)$$
$$= \text{Pair}(g_1, g_2)^{\kappa_1 \cdot \kappa_2} \cdot \text{Pair}(g_1, g_2)^{0 \cdot 0} \cdot \ldots \cdot \text{Pair}(g_1, g_2)^{0 \cdot 0}$$
$$= \text{Pair}(g_1, g_2)^{\kappa_1 \cdot \kappa_2} = g_T^\tau$$

where the superscripts, $\kappa 1$, $\kappa 2$, represent $\kappa_1$ and $\kappa_2$, respectively. On the other hand, when i≠j, the right-hand side of $e_\phi(a_i(\phi), a_j^*(\phi)) = \Pi_{i=1}^{n(\phi)+\zeta(\phi)} \text{Pair}(a_i(\phi), a_j^*(\phi))$ does not include $\text{Pair}(\kappa_1 \cdot g_1, \kappa_2 \cdot g_2)$ but is the product of $\text{Pair}(\kappa_1 \cdot g_1, 0)$, $\text{Pair}(0, \kappa_2 \cdot g_2)$ and $\text{Pair}(0, 0)$. Furthermore, from Formula (6), $\text{Pair}(g_1, 0) = \text{Pair}(0, g_2) = \text{Pair}(g_1, g_2)^0$ is satisfied. Therefore, when i≠j, the following relationship is satisfied:

$$e_\phi(a_i(\phi), a_j^*(\phi)) = e_\phi(g_1, g_2)^0 = g_T^0$$

Especially when $\tau = \kappa_1 \cdot \kappa_2 = 1_F$ (for example when $\kappa_1 = \kappa_2 = 1_F$), the following relationship is satisfied.

$$e(a_i(\phi), a_j^*(\phi)) = g_T^{\delta(i,j)} \quad (11)$$

Here, $g_T^0 = 1$ is the identity element of the cyclic group $G_T$ and $g_T^1 = g_T$ is the generator of the cyclic group $G_T$. The basis vectors $a_i(\phi)$ and $a_i^*(\phi)$ are dual orthogonal bases and the vector spaces $V(\phi)$ and $V^*(\phi)$ are dual pairing vector spaces (DPVS) that can form a bilinear map.

$A(\phi)$: $A(\phi)$ represents an $n(\phi)+\zeta(\phi)$ row by $n(\phi)+\zeta(\phi)$ column matrix consisting of the basis vectors $a_i(\phi)$ $(i=1, \ldots, n(\phi)+\zeta(\phi))$. For example, when the basis vectors $a_i(\phi)$ $(i=1, \ldots, n(\phi)+\zeta(\phi))$ are expressed by Formula (8), the matrix $A(\phi)$ is as follows:

$$A(\psi) = \begin{pmatrix} a_1(\psi) \\ a_2(\psi) \\ \vdots \\ a_{n(\psi)+\zeta(\psi)}(\psi) \end{pmatrix} = \begin{pmatrix} \kappa_1 \cdot g_1 & 0 & \cdots & 0 \\ 0 & \kappa_1 \cdot g_1 & & \vdots \\ \vdots & & \ddots & 0 \\ 0 & \cdots & 0 & \kappa_1 \cdot g_1 \end{pmatrix} \quad (12)$$

$A^*(\phi)$: $A^*(\phi)$ represents an $n(\phi)+\zeta(\phi)$ row by $n(\phi)+\zeta(\phi)$ column matrix consisting of the basis vectors $a_i^*(\phi)$ ($i=1, \ldots, n(\phi)+\zeta(\phi)$). For example, when the basis vectors $a_i^*(\phi)$ ($i=1, \ldots, n(\phi)+\zeta(\phi)$) are expressed by Formula (9), the matrix $A^*(\phi)$ is as follows:

$$A^*(\psi) = \begin{pmatrix} a_1^*(\psi) \\ a_2^*(\psi) \\ \vdots \\ a_{n(\psi)+\zeta(\psi)}^*(\psi) \end{pmatrix} = \begin{pmatrix} \kappa_2 \cdot g_2 & 0 & \cdots & 0 \\ 0 & \kappa_2 \cdot g_2 & & \vdots \\ \vdots & & \ddots & 0 \\ 0 & \cdots & 0 & \kappa_2 \cdot g_2 \end{pmatrix} \quad (13)$$

$X(\phi)$: $X(\phi)$ represents an $n(\phi)+\zeta(\phi)$ row by $n(\phi)+\zeta(\phi)$ column matrix consisting of the elements of the finite field $F_q$. The matrix $X(\phi)$ is used for coordinate transform of the basis vectors $a_i(\phi)$. Let the elements of $i$ rows and $j$ columns ($i=1, \ldots, n(\phi)+\zeta(\phi)$, $j=1, \ldots, n(\phi)+\zeta(\phi)$) of the matrix $X(\phi)$ be $\chi_{i,j}(\phi) \in F_q$, then the matrix $X(\phi)$ is:

$$X(\psi) = \begin{pmatrix} \chi_{1,1}(\psi) & \chi_{1,2}(\psi) & \cdots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \cdots & \chi_{n(\psi)+\zeta(\psi),n(\psi)+\zeta(\psi)}(\psi) \end{pmatrix} \quad (14)$$

Each element $\chi_{i,j}(\phi)$ of the matrix $X(\phi)$ is herein referred to as a transform coefficient.

$X^*(\phi)$: Matrix $X^*(\phi)$ and the matrix $X(\phi)$ satisfy the relationship $X^*(\phi) = \tau' \cdot (X(\phi)^{-1})^T$. Here, $\tau' \in F_q$ is an arbitrary constant that belongs to the finite field $F_q$ and, $\tau' = 1_F$, for example. $X^*(\phi)$ is used for coordinate transform of the basis vectors $a_i^*(\phi)$. Let the elements of $i$ rows and $j$ columns of matrix $X^*(\phi)$ be $\chi_{i,j}^* \in F_q$, then the matrix $X^*(\phi)$ is as follows:

$$X^*(\psi) = \begin{pmatrix} \chi_{1,1}^*(\psi) & \chi_{1,2}^*(\psi) & \cdots & \chi_{1,n(\psi)+\zeta(\psi)}^*(\psi) \\ \chi_{2,1}^*(\psi) & \chi_{2,2}^*(\psi) & & \vdots \\ \vdots & & \ddots & \vdots \\ \chi_{n(\psi)+\zeta(\psi),1}^*(\psi) & \chi_{n(\psi)+\zeta(\psi),2}^* & \cdots & \chi_{n(\psi)+\zeta(\psi),n(\psi)+\zeta(\psi)}^*(\psi) \end{pmatrix} \quad (15)$$

Each element $\chi_{i,j}^*(\phi)$ of the matrix $X^*(\phi)$ is herein referred to as a transform coefficient.

Letting $I(\phi)$ be the unit matrix of $n(\phi)+\zeta(\phi)$ rows and $n(\phi)+\zeta(\phi)$ columns, then $X(\phi) \cdot (X^*(\phi))^T = \tau' \cdot I(\phi)$ is satisfied. That is, the unit matrix is defined as:

$$I(\psi) = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \quad (16)$$

For the unit matrix, the following formula holds.

$$\begin{pmatrix} \chi_{1,1}(\psi) & \chi_{1,2}(\psi) & \cdots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \cdots & \chi_{n(\psi)+\zeta(\psi),n(\psi)+\zeta(\psi)}(\psi) \end{pmatrix} \times$$

$$\begin{pmatrix} \chi_{1,1}^*(\psi) & \chi_{2,1}^*(\psi) & \cdots & \chi_{n(\psi)+\zeta(\psi),1}^*(\psi) \\ \chi_{1,2}^*(\psi) & \chi_{2,2}^*(\psi) & & \vdots \\ \vdots & & \ddots & \vdots \\ \chi_{1,n(\psi)+\zeta(\psi)}^*(\psi) & \chi_{2,n(\psi)+\zeta(\psi)}^*(\psi) & \cdots & \chi_{n(\psi)+\zeta(\psi),n(\psi)+\zeta(\psi)}^*(\psi) \end{pmatrix} = \quad (17)$$

$$\tau' \cdot \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix}$$

Here, the following $n(\phi)+\zeta(\phi)$-dimensional vectors are defined.

$$\vec{\chi_i}(\phi) = (\chi_{i,1}(\phi), \ldots, \chi_{i,n(\phi)+\zeta(\phi)}(\phi)) \quad (18)$$

$$\vec{\chi_j}^*(\phi) = (\chi_{j,1}^*(\phi), \ldots, \chi_{j,n(\phi)+\zeta(\phi)}^*(\phi)) \quad (19)$$

From Formula (17), the inner product of the $n(\phi)+\zeta(\phi)$-dimensional vectors $\vec{\chi_i}(\phi)$ and $\vec{\chi_j}^*(\phi)$ is:

$$\vec{\chi_i}(\phi) \cdot \vec{\chi_j}^*(\phi) = \tau' \cdot \delta(i,j) \quad (20)$$

$b_i(\phi)$: $b_i(\phi)$ represent $n(\phi)+\zeta(\phi)$-dimensional basis vectors each consisting of $n(\phi)+\zeta(\phi)$ elements of the cyclic group $G_1$. Here, $b_i(\phi)$ can be obtained by coordinate transform of the basis vectors $a_i(\phi)$ ($i=1, \ldots, n(\phi)+\zeta(\phi)$) by using the matrix $X(\phi)$. Specifically, the basis vectors $b_i(\phi)$ can be obtained by calculating $$b_i(\phi) = \sum_{j=1}^{n(\phi)+\zeta(\phi)} \chi_{i,j}(\phi) \cdot a_j(\phi) \quad (21)$$

For example, if the basis vectors $a_j(\phi)$ ($j=1, \ldots, n(\phi)+\zeta(\phi)$) are expressed by Formula (8), the elements of the basis vectors $b_i(\phi)$ can be listed as:

$$b_i(\phi) = (\chi_{i,1}(\phi) \cdot \kappa_1 \cdot g_1, \chi_{i,2}(\phi) \cdot \kappa_1 \cdot g_1, \ldots, \chi_{i,n(\phi)+\zeta(\phi)}(\phi) \cdot \kappa_1 \cdot g_1) \quad (22)$$

All $n(\phi)+\zeta(\phi)$-dimensional vectors consisting of $n(\phi)+\zeta(\phi)$ elements of the cyclic group $G_1$ can be represented by the linear sum of the $n(\phi)+\zeta(\phi)$-dimensional basis vectors $b_i(\phi)$ ($i=1, \ldots, n(\phi)+\zeta(\phi)$). That is, the $n(\phi)+\zeta(\phi)$-dimensional basis vectors $b_i(\phi)$ span the vector space $V(\phi)$ described above.

$b_i^*(\phi)$: $b_i^*(\phi)$ represent $n(\phi)+\zeta(\psi)$-dimensional basis vectors each consisting of $n(\phi)+\zeta(\phi)$ elements of the cyclic group $G_2$. Here, $b_i^*(\phi)$ can be obtained by coordinate transform of the basis vectors $a_i^*(\phi)$ ($i=1, \ldots, n(\phi)+\zeta(\phi)$) by using the matrix $X^*(\phi)$. Specifically, the basis vectors $b_i^*(\phi)$ can be obtained by calculating $$b_i^*(\phi) = \sum_{j=1}^{n(\phi)+\zeta(\phi)} \chi_{i,j}^*(\phi) \cdot a_j^*(\phi) \quad (23)$$

For example, when the basis vectors $a_j^*(\phi)$ ($j=1, \ldots, n(\phi)+\zeta(\phi)$) are expressed by Formula (9), the elements of the basis vectors $b_i^*(\phi)$ can be listed as:

$$b_i^*(\phi) = (\chi_{i,1}^*(\phi) \cdot \kappa_2 \cdot g_2, \chi_{i,2}^*(\phi) \cdot \kappa_2 \cdot g_2, \ldots, \chi_{i,n(\phi)+\zeta(\phi)}^*(\phi) \cdot \kappa_2 \cdot g_2) \quad (24)$$

All $n(\phi)+\zeta(\phi)$-dimensional vectors consisting of $n(\phi)+\zeta(\phi)$ elements of the cyclic group $G_2$ can be represented by the linear sum of the $n(\phi)+\zeta(\phi)$-dimensional basis vectors $b_i^*(\phi)$ ($i=1, \ldots, n(\phi)+\zeta(\phi)$). That is, the $n(\phi)+\zeta(\phi)$-dimensional basis vectors $b_i^*(\phi)$ span the vector space $V^*(\phi)$ described above.

The basis vectors $b_i(\phi)$ and $b_i^*(\phi)$ satisfy the following relationship for all elements $\tau = \kappa_1 \cdot \kappa_2$ of the finite field $F_q$ other than $0_F$.

$$e_\phi(b_i(\phi), b_j^*(\phi)) = g_T^{\tau \cdot \tau' \cdot \delta(i,j)} \tag{25}$$

That is, from Formulas (5), (20), (22) and (24), the following relationship holds:

$$e_\psi(b_i(\psi), b_j^*(\psi)) = \prod_{\beta=1}^{n(\psi)+\zeta(\psi)} \text{Pair}(\chi_{i,\beta}(\psi) \cdot \kappa_1 \cdot g_1, \chi_{j,\beta}^*(\psi) \cdot \kappa_2 \cdot g_2)$$
$$= \text{Pair}(g_1, g_2)^{\kappa_1 \cdot \kappa_2 \cdot \vec{\chi_i}(\psi) \cdot \vec{\chi_j^*}(\psi)}$$
$$= \text{Pair}(g_1, g_2)^{\tau \cdot \tau' \cdot \delta(i,j)} = g_T^{\tau \cdot \tau' \cdot \delta(i,j)}$$

Especially when $\tau = \kappa_1 \cdot \kappa_2 = 1_F$ (for example when $\kappa_1 = \kappa_2 = 1_F$) and $\tau' = 1_F$, the following relationship holds:

$$e_\phi(b_i(\phi), b_j^*(\phi)) = g_T^{\delta(i,j)} \tag{26}$$

The basis vectors $b_i(\phi)$ and $b_i^*(\phi)$ are the dual orthogonal bases of dual pairing vector spaces (vector spaces $V(\phi)$ and $V^*(\phi)$).

It should be noted that basis vectors $a_i(\phi)$ and $a_i^*(\phi)$ other than those shown in Formulas (8) and (9) and basis vectors $b_i(\phi)$ and $b_i^*(\phi)$ other than those shown in Formulas (21) and (23) may be used, provided that they satisfy the relationship in Formula (25).

$B(\phi)$: $B(\phi)$ is an $n(\phi)+\zeta(\phi)$ row by $n(\phi)+\zeta(\phi)$ column matrix consisting of the basis vectors $b_i(\phi)$ ($i=1, \ldots, n(\phi)+\zeta(\phi)$). $B(\phi)$ satisfies $B(\phi) = X(\phi) \cdot A(\phi)$. For example, when the basis vectors $b_i(\phi)$ are expressed by Formula (22), matrix $B(\phi)$ is:

$$B(\psi) = \begin{pmatrix} b_1(\psi) \\ b_2(\psi) \\ \vdots \\ b_{n(\psi)+\zeta(\psi)}(\psi) \end{pmatrix} \tag{27}$$
$$= \begin{pmatrix} \chi_{1,1}(\psi) \cdot \kappa_1 \cdot g_1 & \cdots & \chi_{1,n(\psi)+\zeta(\psi)}(\psi) \cdot \kappa_1 \cdot g_1 \\ \vdots & \ddots & \vdots \\ \chi_{n(\psi)+\zeta(\psi),1}(\psi) \cdot \kappa_1 \cdot g_1 & \cdots & \chi_{n(\psi)+\zeta(\psi),n(\psi)+\zeta(\psi)}(\psi) \cdot \kappa_1 \cdot g_1 \end{pmatrix}$$

$B^*(\phi)$: $B^*(\phi)$ represents an $n(\phi)+\zeta(\phi)$ row by $n(\phi)+\zeta(\phi)$ column matrix consisting of the basis vectors $b_i^*(\phi)$ ($i=1, \ldots, n(\phi)+\zeta(\phi)$). $B^*(\phi)$ satisfies $B^*(\phi) = X^*(\phi) \cdot A^*(\phi)$. For example, when the basis vectors $b_i^*(\phi)$ ($i=1, \ldots, n(\phi)+\zeta(\phi)$) are expressed by Formula (24), matrix $B^*(\phi)$ is:

$$B^*(\psi) = \begin{pmatrix} b_1^*(\psi) \\ b_2^*(\psi) \\ \vdots \\ b_{n(\psi)+\zeta(\psi)}^*(\psi) \end{pmatrix} \tag{28}$$
$$= \begin{pmatrix} \chi_{1,1}^*(\psi) \cdot \kappa_2 \cdot g_2 & \cdots & \chi_{1,n(\psi)+\zeta(\psi)}^*(\psi) \cdot \kappa_2 \cdot g_2 \\ \vdots & \ddots & \vdots \\ \chi_{n(\psi)+\zeta(\psi),1}^*(\psi) \cdot \kappa_2 \cdot g_2 & \cdots & \chi_{n(\psi)+\zeta(\psi),n(\psi)+\zeta(\psi)}^*(\psi) \cdot \kappa_2 \cdot g_2 \end{pmatrix}$$

$v(\lambda)^\rightarrow$: $v(\lambda)^\rightarrow$ represent $n(\lambda)$-dimensional vectors each consisting of the elements of the finite field $F_q$.

$$v(\lambda)^\rightarrow = (v_1(\lambda), \ldots, v_{n(\lambda)}(\lambda)) \in F_q^{n(\lambda)} \tag{29}$$

$v_\mu(\lambda)$: $v_\mu(\lambda)$ represent the $\mu$-th elements ($\mu = 1, \ldots, n(\lambda)$) of the $n(\lambda)$-dimensional vectors $v(\lambda)^\rightarrow$.

$w(\lambda)^\rightarrow$: $w(\lambda)^\rightarrow$ represent $n(\lambda)$-dimensional vectors each consisting of the elements of the finite field $F_q$.

$$w(\lambda)^\rightarrow = (w_1(\lambda), \ldots, w_{n(\lambda)}(\lambda)) \in F_q^{n(\lambda)} \tag{30}$$

$w_\mu(\lambda)$: $w_\mu(\lambda)$ represent the $\mu$-th elements ($\mu = 1, \ldots, n(\lambda)$) of the $n(\lambda)$-dimensional vectors $w(\lambda)^\rightarrow$.

Enc: Enc represents a common key encryption function indicating an encryption process of a common key encryption scheme.

$\text{Enc}_K(M)$: $\text{Enc}_K(M)$ represents a ciphertext obtained by using a common key K to encrypt a plaintext M according to the common key encryption function Enc.

Dec: Dec represents a common key decryption function indicating a decryption process of the common key encryption scheme.

$\text{Dec}_K(C)$: $\text{Dec}_K(C)$ represents a decrypted result obtained by using a common key K to decrypt a ciphertext C according to the common key decryption function Dec.

Collision-resistant function: A "collision-resistant function" is a function h that satisfies the following condition for a sufficiently large security parameter sec, or a function that can be considered to be the function h.

$$Pr[A(h) = (x,y) | h(x) = h(y) \wedge x \neq y] < \epsilon(\text{sec})$$

Here, Pr [•] is the probability of the event [•], A(h) is a probabilistic polynomial time algorithm that calculates values x, y ($x \neq y$) that satisfy $h(x) = h(y)$ for the function h, $\epsilon(\text{sec})$ is a polynomial for the security parameter sec. An example of the collision-resistant function is a hash function such as a "cryptographic hash function" disclosed in Reference literature 1.

Random function: A "random function" is a function that belongs to a subset $\phi_\zeta$ of a set $\Phi_\zeta$ or a function that can be considered to be a function belonging to the subset $\phi_\zeta$. Here, the set $\Phi_\zeta$ is a set of all functions that map the elements of a set $\{0, 1\}^\zeta$ to the elements of a set $\{0, 1\}^\zeta$. Any probabilistic polynomial time algorithm cannot distinguish between the set $\Phi_\zeta$ and the subset $\phi_\zeta$. Examples of random functions include hash functions mentioned above.

Injective function: An "injective function" is a function that does not map distinctive elements of its domain to the same element of its range, or a function that can be considered to be a function that does not map distinctive elements of its domain to the same element of its range. That is, an "injective function" is a function that maps elements of its domain to the elements of its range on a one-to-one basis, or a function that can be considered to be a function that maps elements of its domain to the elements of its range on a one-to-one basis. Examples of injective functions include hash functions such as a "KDF (Key Derivation Function)" disclosed in Reference literature 1.

$H_S$ ($S = 1, \ldots, S_{max}$): $H_S$ represents a collision-resistant function that outputs one element of the finite field $F_q$ in response to input of two values. $S_{max}$ is a positive integer constant. An example of the function $H_S$ is a function including: a collision-resistant function that outputs one element of the finite field $F_q$ in response to input of one element of the cyclic group $G_T$ and one binary sequence; and a collision-resistant function that outputs one element of the finite field $F_q$ in response to input of two binary sequences. A specific example of the function $H_S$ is a function including: an injective function that maps two input values to one binary sequence; a hash functions such as the "cryptographic hash function" disclosed in Reference literature 1; and a transform function that maps a binary sequence to an element of an finite field (for example an "octet string and integer/finite field conversion" in Reference literature 1). Specific examples of the injective function that map two input values to one binary sequence include a function that maps one input element of the cyclic group $G_T$ to a binary sequence and outputs the exclusive OR of the binary sequence and one input binary sequence, or a function that outputs the exclusive OR of two input binary sequences. In terms of security, functions $H_S$ are preferably one-way functions, more preferably random functions. Only some of the functions $H_S$ may be one-way or random functions. In terms of security, however, preferably all functions $H_S$ are one-way functions, more preferably random functions. In terms of security, the functions $H_S$ ($S=1, \ldots, S_{max}$) are preferably different functions.

R: R represents an injective function which outputs one binary sequence in response to one input value. An example of the injective function R is a function that outputs one binary sequence in response to input of one element of the cyclic group $G_T$, or a function that outputs one binary sequence in response to input of one binary sequence. A specific example of the injective function R is a function including: an injective function that maps one input value to one binary sequence; and a hash function such as a "cryptographic hash function" disclosed in Reference literature 1. The injective function R may be a hash function such as the "cryptographic hash function" disclosed in Reference literature 1. The injection function R is preferably a one-way function, more preferably a random function, in terms of security.

[Functional Encryption Scheme]

A basic construction of functional encryption will be described below.

Functional encryption is a scheme in which a ciphertext is decrypted when the truth value of a logical formula determined by a combination of first information and second information is "true". One of the "first information" and the "second information" is embedded in the ciphertext and the other is embedded in key information. For example, the predicate encryption scheme disclosed in "Predicate Encryption Supporting Disjunctions, Polynomial Equations, and Inner Products," with Amit Sahai and Brent Wasters One of 4 papers from Eurocrypt 2008 invited to the Journal of Cryptology" (Reference literature 9) is one type of functional encryption.

While there are other well-known functional encryption schemes, an unpublished new functional encryption scheme will be described below. In the new functional encryption scheme described below, values that depend on secret information are hierarchically secret-shared in a mode that depends on a given logical formula. The given logical formula includes propositional variables whose truth values are determined by a combination of first information and second information and further includes any or all of logical symbols $\Lambda$, $\vee$, and $\neg$ necessary. If the truth value of the given logical formula determined by the truth values of the propositional variables is true, the value that is dependent on the secret information is recovered and a ciphertext is decrypted on the basis of the recovered value.

<Relationship between Logical Formula and Hierarchical Secret Sharing Scheme>

The relationship between the given logical formula and the hierarchical secret sharing described above will be described.

Secret sharing means that secret information is divided into N (N≥2) pieces of share information in such a manner that the secret information is recovered only when at least a threshold number $K_t$ ($K_t \geq 1$) of pieces of share information are obtained. A secret sharing scheme (SSS) in which $K_t = N$ is required to be satisfied is called N-out-of-N sharing scheme (or "N-out-of-N threshold sharing scheme") and a secret sharing scheme in which $K_t < N$ is required to be satisfied is called $K_t$-out-of-N sharing scheme (or "$K_t$-out-of-N threshold sharing scheme")

(see Reference literature 10 'Kaoru Kurosawa, Wakaha Ogata "Basic Mathematics of Modern Encryption" (Electronics, information and communication lectures series)", Corona Publishing Co., March 2004, pp. 116-119', and Reference literature 11 'A. Shamir, "How to Share a Secret", Communications of the ACM, November 1979, Volume 22, Number 11, pp. 612-613', for example).

In the N-out-of-N sharing scheme, secret information SE can be recovered when all of the pieces of share information, share(1), ..., share(N), are given but no secret information SE can be obtained when any N−1 pieces of share information, share($\phi_1$), ..., share($\phi_{N-1}$), are given. One example of the N-out-of-N sharing scheme is given below.

Randomly select $SH_1, \ldots, SH_{N-1}$.

Calculate $SH_N = SE - (SH_1 + \ldots + SH_{N-1})$.

Set $SH_1, \ldots, SH_N$ as the pieces of share information share(1), ..., share(N).

When all of the pieces of share information, share(1), ..., share(N), are given, the secret information SE can be recovered by the recovery operation given below.

$$SE = \text{share}(1) + \ldots + \text{share}(N) \quad (31)$$

In the $K_t$-out-of-N sharing scheme, secret information SE can be recovered when any different $K_t$ pieces of share information, share($\phi_1$), ..., share($\phi_{Kt}$), are given but no secret information SE can be obtained when any $K_t-1$ pieces of share information, share($\phi_1$), ..., share($\phi_{Kt-1}$), are given. The subscript Kt represents $K_t$. One example of the $K_t$-out-of N sharing scheme is given below.

Randomly select a $K_t-1$-dimensional polynomial $f(x) = \xi_0 + \xi_1 \cdot x + \xi_2 \cdot x^2 + \ldots + \xi_{Kt-1} \cdot x^{Kt-1}$ that satisfies $f(0) = SE$. That is, $\xi_0 = SE$, and $\xi_1, \ldots, \xi_{Kt-1}$ are selected randomly. The share information is set as share($\rho$) = ($\rho$, f($\rho$)) ($\rho = 1, \ldots, N$). $\rho$ and f($\rho$) can be extracted from ($\rho$, f($\rho$)). An example of ($\rho$, f($\rho$)) is a bit combination value of $\rho$ and f($\rho$).

When any different $K_t$ pieces of share information share ($\phi_1$), ..., share($\phi_{Kt}$) ($\phi_1, \ldots \phi_{Kt}) \subset (1, \ldots, N)$) can be obtained, the secret information SE can be recovered using a Lagrange interpolation formula, for example, by the following recovery operation:

$$SE = f(0) = LA_1 \cdot f(\phi_1) + \ldots + LA_{Kt} \cdot f(\phi_{Kt}) \quad (32)$$

$$LA_\rho(x) = \frac{(x - \phi_1) \ldots \overset{\rho}{\vee} \ldots (x - \phi_{K_t})}{(\phi_\rho - \phi_1) \ldots \overset{\rho}{\vee} \ldots (\phi_\rho - \phi_{K_t})} \in F_q \quad (33)$$

Here, "$\ldots \overset{\rho}{\vee} \ldots$" represents that the p-th operand [element ($\phi_\rho - \phi_\rho$) of the denominator and element (x−$\phi_\rho$) of the numerator)] from the left do not exist. That is, the denominator of Formula (33) can be expressed as:

$$(\phi_\rho - \phi_1) \cdot \ldots \cdot (\phi_\rho - \phi_{\rho-1}) \cdot (\phi_\rho - \phi_{\rho+1}) \cdot \ldots \cdot (\phi_\rho - \phi_{Kt})$$

and the numerator of Formula (33) can be expressed as:

$$(x - \phi_1) \cdot \ldots \cdot (x - \phi_{\rho-1}) \cdot (x - \phi_{\rho+1}) \cdot \ldots \cdot (x - \phi_{Kt})$$

The secret sharing schemes described above can be executed on a field. Furthermore, these schemes can be extended to share a value that is dependent on secret information SE into values that are dependent on share information, shares, by secret sharing. The value that is dependent on secret information SE is the secret information SE itself or a function value of the secret information SE, and values that are dependent on the share information, shares, are the pieces of share information, shares, themselves or function values of the share information. For example, an element $g_T^{SE} \in G_T$ that is dependent on secret information $SE \in F_q$ that is an element of the finite field $F_q$ can be secret-shared into elements $g_T^{share(1)}, g_T^{share(2)} \in G_T$ of the cyclic group $G_T$ that is dependent on share information, share(1), share(2) by secret sharing. The secret information SE described above is a linear combination of share information, shares (Formulas (31) and (32)). A secret sharing scheme in which secret information SE is linear combination of share information, shares, is called linear secret sharing scheme.

The given logical formula described above can be represented by tree-structure data that can be obtained by hierarchically secret-sharing of the secret information. Specifically, according to De Morgan's lows, the given logical formula can be represented by a logical formula made up of literals or a logical formula made up of at least some of the logical symbols $\wedge$, $\vee$ and literals (such a logical formula will be referred to as the "normal logical formula"). The normal logical formula can be represented by tree-structure data that can be obtained by hierarchically secret-sharing of the secret information.

The tree-structure data that represents the normal logical formula includes a plurality of nodes. At least some of the nodes are parent nodes of one or more child nodes, one of the parent nodes is the root node, and at least some of the child nodes are leaf nodes. There is not a parent node of the root node and there is not a child node of a leaf node. The root node corresponds to a value that is dependent on secret information and each child node of each parent node corresponds to a value that is dependent on share information obtained by secret-sharing of the value corresponding to the parent node. The mode of secret sharing (a secret sharing scheme and a threshold value) at each node is determined according to the normal logical formula. The leaf nodes correspond to the literals that make up the normal logical formula. The truth value of each of the literals is determined by the combination of the first information and the second information.

It is assumed here that a value that is dependent on share information corresponding to a leaf node corresponding to a literal whose truth value is true can be obtained whereas a value that is dependent on share information corresponding to a leaf node corresponding to a literal whose truth value is false cannot be obtained. Because of the nature of the secret sharing described above, the value that is dependent on share information corresponding to a parent node (if the parent node is the root node, the value that is dependent on the secret information) is recovered only when the number of values dependent on share information corresponding to its child nodes obtained is greater than or equal to a threshold value associated with the parent node. Accordingly, whether the value that is dependent on the secret information corresponding to the root node can be recovered or not is ultimately determined by which leaf node's literal has returned true as its truth value and by the configuration (including the mode of secret sharing at each node) of the tree-structure data. The tree-structure data represents the normal logical formula if the tree-structure data is configured in such a way that the value dependent on the secret information corresponding to the root node can be ultimately recovered only when the truth values of the literals corresponding to the leaf nodes allow the normal logical formula to return true as its truth value. Such tree-structure data that represents a normal logical formula can be readily configured. A specific example will be given below.

FIG. 1 illustrates tree-structure data representing a normal logical formula, PRO(1) $\wedge$ PRO(2) $\vee \neg$ PRO(3), containing propositional variables PRO(1) and PRO(2), the negation $\neg$ PRO(3) of a propositional variable PRO(3), and logical symbols $\wedge$ and $\vee$. The tree-structure data illustrated in FIG. 1 includes a plurality of nodes $N_1, \ldots, N_5$. The node $N_1$ is set as the parent node of the nodes $N_2$ and $N_5$, the node $N_2$ is set as the parent node of the nodes $N_3$ and $N_4$, the one node $N_1$ of the parent nodes is set as the root node, and the child nodes $N_3$, $N_4$ and $N_5$ among the child nodes are set as leaf nodes. The node $N_1$ corresponds to the value that is dependent on the secret information SE; and the child nodes $N_2$ and $N_5$ of the node $N_1$ correspond to the values corresponding to the pieces of share information SE, SE, where the value corresponding to the secret information SE is divided, according to a 1-out-of-2 sharing scheme, into the values corresponding to the pieces of share information SE, SE. The child nodes $N_3$ and $N_4$ of the node $N_2$ correspond to the values dependent on the pieces of share information SE–SH$_1$, SH$_1$, where the value that is dependent on the share information SE is divided, according to a 2-out-of-2 sharing scheme, into the values dependent on the pieces of share information SE–SH$_1$, SH$_1$. That is, the leaf node $N_3$ corresponds to the value dependent on share information share(1)=SE–SH$_1$, the leaf node $N_4$ corresponds to the value dependent on share information share(2)=SH$_1$, and the leaf node $N_5$ corresponds to the value dependent on share information share(3)=SE. The leaf nodes $N_3$, $N_4$ and $N_5$ correspond to the literals PRO(1), PRO(2) and $\neg$ PRO(3), respectively, that make up the normal logical formula PRO(1)$\wedge$PRO(2)$\vee \neg$ PRO(3). The truth value of each of the literals PRO(1), PRO(2) and $\neg$ PRO(3) is determined by the combination of the first information and the second information. Here, the value dependent on share information corresponding to the leaf node whose literal has returned true can be obtained but the value dependent on share information corresponding to the leaf node whose literal has returned false cannot be obtained. In this case, the value that is dependent on the secret information SE is recovered only when the combination of the first information and the second information allows the normal logical formula PRO(1) $\wedge$ PRO(2)$\vee \neg$ PRO(3) to return true.

Figure 2:
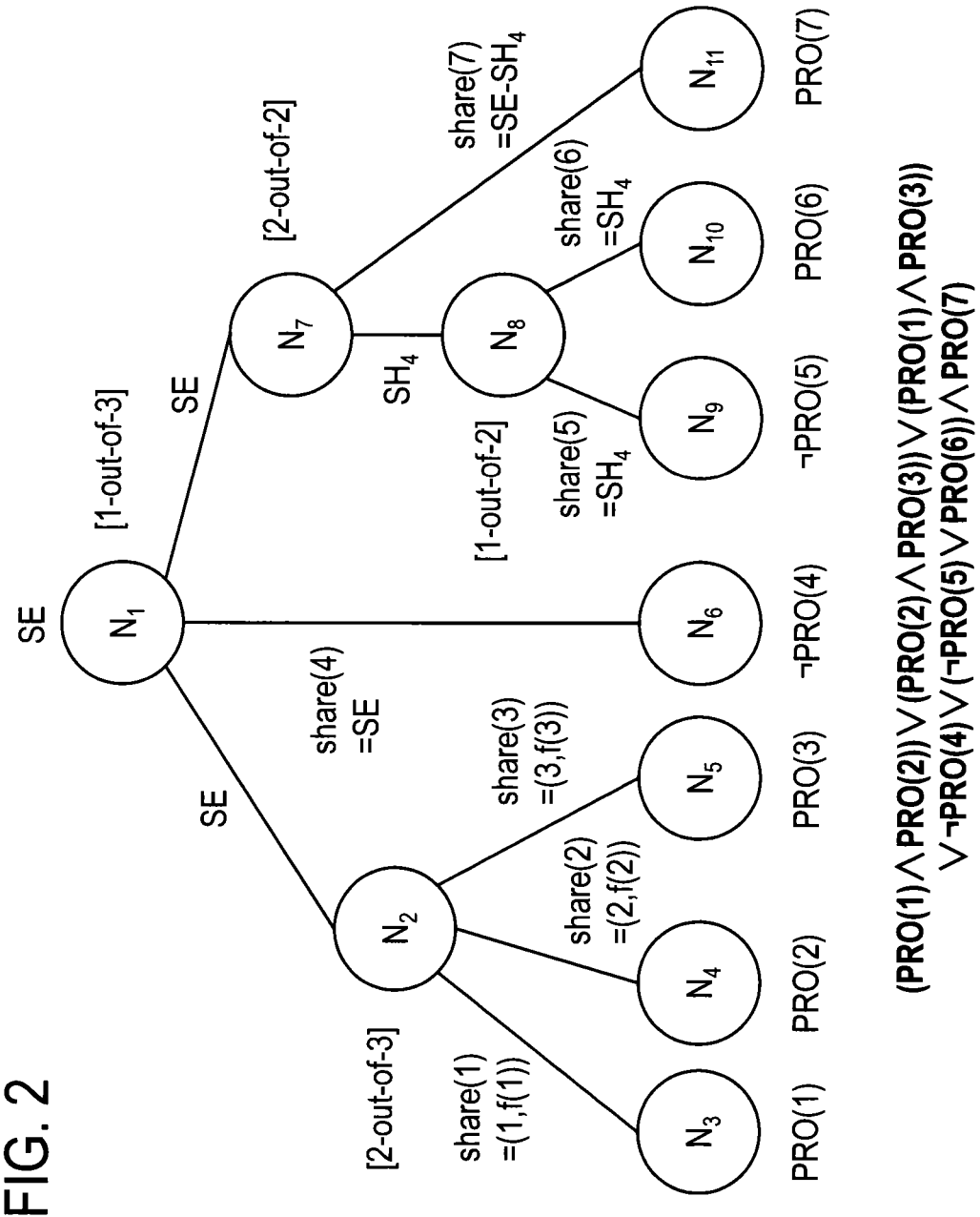
FIG. 2 is a diagram illustrating tree-structure data representing normal logical formulas.

FIG. 2 illustrates tree-structure data that represents a normal logical formula, (PRO(1)$\wedge$PRO(2)) $\vee$ (PRO(2)$\wedge$PRO(3)) $\vee$ (PRO(1) $\wedge$ PRO(3)) $\vee \neg$ PRO(4) $\vee$ ($\neg$ PRO(5) $\vee$ PRO(6)) $\wedge$ PRO(7), which includes propositional variables PRO(1), PRO(2), PRO(3), PRO(6), and PRO(7), the negations $\neg$ PRO(4) and $\neg$ PRO(5) of propositional variables PRO(4) and PRO(5), and logical symbols $\wedge$ and $\vee$.

The tree-structure data illustrated in FIG. 2 includes a plurality of nodes $N_1, \ldots, N_{11}$. The node$_1$ is set as the parent node of the nodes $N_2$, $N_6$ and $N_7$, the node $N_2$ is set as the parent node of the nodes $N_3$, $N_4$ and $N_5$, the node $N_7$ is set as the parent node of the nodes $N_8$ and $N_{11}$, the node $N_8$ is set as the parent node of the nodes $N_9$ and $N_{10}$, the node $N_1$, which is one of the parent nodes, is set as the root node, and the nodes $N_3$, $N_4$, $N_5$, $N_6$, $N_9$, $N_{10}$ and $N_{11}$ are set as leaf nodes. The node $N_1$ corresponds to the value dependent on the secret information SE; and the child nodes $N_2$, $N_6$ and $N_7$ of the node $N_1$ correspond to the values dependent on the pieces of share information SE, SE, SE, where the value dependent on the secret information SE is divided, according to a 1-out-of-3 sharing scheme, into the values dependent on the pieces of share information SE, SE, SE. The child nodes $N_3$, $N_4$, and $N_5$ of the node $N_2$ correspond to the values dependent on the pieces of share information (1, f(1)), (2, f(2)), and (3, f(3)), respectively, where the value corresponding to the share information SE is divided, according to a 2-out-of-3 sharing scheme, into the values dependent on the pieces of share information (1, f(1)), (2, f(2)), and (3, f(3)). The child nodes $N_8$ and $N_{11}$ of the node $N_7$ correspond to the values dependent on the pieces of share information $SH_4$ and $SE-SH_4$, respectively, where the value corresponding to the share information SE is shared, according to a 2-out-of-2 sharing scheme, into the values dependent on the pieces of share information $SH_4$ and $SE-SH_4$. The child nodes $N_9$ and $N_{10}$ of node $N_8$ correspond to the values dependent on the pieces of share information $SH_4$, $SH_4$, where the value dependent on share information $SH_4$ is divided, according to a 1-out-of-2 sharing scheme, into the values dependent on the pieces of share information $SH_4$, $SH_4$. That is, the leaf node $N_3$ corresponds to the value dependent on share information share(1)=(1, f(1)), the leaf node $N_4$ corresponds to the value dependent on share information share(2)=(2, f(2)), the leaf node $N_5$ corresponds to the value dependent on share information share(3)=(3, f(3)), the leaf node $N_6$ corresponds to the value dependent on share information share(4)=SE, the leaf node $N_9$ corresponds to the value dependent on share information share(5)=$SH_4$, the leaf node $N_{10}$ corresponds to the value dependent on share information share(6)=$SH_4$, and the leaf node $N_{11}$ corresponds to the value dependent on share information share(7)=$SE-SH_4$. The leaf nodes $N_3$, $N_4$, $N_5$, $N_6$, $N_9$, $N_{10}$ and $N_{11}$ correspond to the literals PRO(1), PRO(2), PRO(3), ¬ PRO(4), ¬ PRO(5), PRO(6), and PRO(7), respectively, that make up the normal logical formula (PRO(1) ∧ PRO(2)) ∨ (PRO(2) ∧ PRO(3)) ∨ (PRO(1) ∧ PRO(3)) ∨ ¬ PRO(4) ∨ (PRO(5) ∨ PRO(6))∧Pro(7). The truth value of each of the literals PRO(1), PRO(2), PRO(3), ¬ PRO(4), ¬ PRO(5), PRO(6), and PRO(7) is determined by the combination of the first information and the second information. Here, the value that is dependent on share information that corresponds to the leaf node whose literal has returned true can be obtained but the value that is dependent on share information corresponding to the leaf node whose literal has returned false cannot be obtained. In this case, the value that is dependent on the secret information SE is recovered only when the combination of the first information and the second information allows the normal logical formula (PRO(1)∧ PRO(2))∨ (PRO(2)∧ PRO(3))∨ (PRO(1)∧ PRO(3))∨ ¬ PRO(4)∨ (¬ PRO(5)∨ PRO(6)) ∧ PRO(7) to return true.

<Access Structure>

When a given logical formula is represented by tree-structure data that can be obtained by hierarchically secret-sharing of secret information as described above, it can be determined whether the truth value of the logical formula which is determined by the combination of the first information and the second information will be "true" or "false", on the basis of whether the value dependent on the secret information can be recovered from the values corresponding to pieces of share information at the leaf nodes, each of which can be obtained for the combination of the first information and the second information. A mechanism that accepts a combination of first information and second information when the truth value of a logical formula which is determined by the combination of the first information and second information is "true" and rejects a combination of first information and second information when the truth value is "false" is hereinafter called the access structure.

The total number of the leaf nodes of tree-structure data that represents a given logical formula as described above is denoted by $\Psi$ and identifiers corresponding to the leaf nodes are denoted by $\lambda=1, \ldots, \Psi$. First information is a set $\{v(\lambda)^{\rightarrow}\}_{\lambda=1,\ldots,\Psi}$ of $n(\lambda)$-dimensional vectors $v(\lambda)^{\rightarrow}$ corresponding to the leaf nodes and second information is a set $\{w(\lambda)^{\rightarrow}\}_{\lambda=1,\ldots,\Psi}$ of $n(\lambda)$-dimensional vectors $w(\lambda)^{\rightarrow}$. The tree-structure data described above is implemented as a labeled matrix LMT(MT, LAB).

The labeled matrix LMT(MT, LAB) includes a matrix MT of $\Psi$ rows and COL columns (COL≥1) and the labels LAB($\lambda$) associated with the rows $\lambda=1, \ldots, \Psi$ of the matrix MT.

$$MT = \begin{pmatrix} mt_{1,1} & \cdots & mt_{1,COL} \\ \vdots & \ddots & \vdots \\ mt_{\Psi,1} & \cdots & mt_{\Psi,COL} \end{pmatrix} \quad (34)$$

Each of the elements $mt_{\lambda,col}$ (col=1, ..., COL) of the matrix MT satisfies the following two requirements. First, if a value that is dependent on secret information $SE \in F_q$ corresponds to the root node of the tree-structure data that represents a given logical formula as described above, the following relationship holds between a COL-dimensional vector $GV^{\rightarrow}$ consisting of predetermined elements of the finite field $F_q$ and a COL-dimensional vector $CV^{\rightarrow}$ consisting of the elements that are dependent on the secret information SE and belong to the finite field $F_q$.

$$GV^{\rightarrow}=(gv_1, \ldots, gv_{COL}) \in F_q^{COL} \quad (35)$$

$$CV^{\rightarrow}=(cv_1, \ldots, cv_{COL}) \in F_q^{COL} \quad (36)$$

$$SE=GV^{\rightarrow} \cdot (CV^{\rightarrow})^T \quad (37)$$

A specific example of the COL-dimensional vector $GV^{\rightarrow}$ is given below.

$$GV^{\rightarrow}=(1_F, \ldots, 1_F) \in F_q^{COL} \quad (38)$$

Note that $GV^{\rightarrow}$ may be other COL-dimensional vector such as $GV^{\rightarrow}=(1_F, 0_F, \ldots, 0_F) \in F_q^{COL}$.

Second, if values dependent on share information share($\lambda$) $\in F_q$ correspond to leaf nodes corresponding to identifiers $\lambda$, the following relationship holds.

$$(share(1), \ldots, share(\Psi))^T = MT \cdot (CV^{\rightarrow})^T \quad (39)$$

Once the tree-structure data representing the given logical formula as describe above has been determined, it is easy to choose a matrix MT that satisfies the two requirements. Even if the secret information SE and the share information share ($\lambda$) are variables, it is easy to choose a matrix MT that satisfies the two requirements. That is, values of the secret information SE and the share information share($\lambda$) may be determined after the matrix MT is determined.

The labels LAB($\lambda$) associated with the rows $\lambda=1, \ldots, \Psi$ of the matrix MT correspond to the literals (PRO($\lambda$) or ¬ PRO ($\lambda$)) corresponding to the leaf nodes corresponding to the identifiers $\lambda$. Here, the truth value "true" of a propositional variable PRO($\lambda$) is treated as being equivalent to that the inner product of $v(\lambda)^{\rightarrow} \cdot w(\lambda)^{\rightarrow}$ of $v(\lambda)^{\rightarrow}$ included in first information VSET1={$\lambda$, $v(\lambda)^{\rightarrow}|\lambda=1, \ldots, \Psi$} and $w(\lambda)^{\rightarrow}$ included in second information VSET2={$\lambda$, $w(\lambda)^{\rightarrow}|\lambda=1, \ldots, \Psi$} is 0; the truth value "false" of the propositional variable PRO($\lambda$) is treated as being equivalent to that the inner product $v(\lambda)^{\rightarrow} \cdot w(\lambda)^{\rightarrow}$ is not 0. It is assumed that the label LAB($\lambda$) corresponding to PRO($\lambda$) represents $v(\lambda)^{\rightarrow}$ and the label LAB($\lambda$) corresponding to ¬ PRO($\lambda$) represents $\neg v(\lambda)^{\rightarrow}$. Here, $\neg v(\lambda)^{\rightarrow}$ is a logical formula representing the negation of $v(\lambda)^{\rightarrow}$ and $v(\lambda)^{\rightarrow}$ can be determined from $\neg v(\lambda)^{\rightarrow}$. "LAB($\lambda$)=$v(\lambda)^{\rightarrow}$" denotes that LAB($\lambda$) represents $v(\lambda)^{\rightarrow}$ and "LAB($\lambda$)=$\neg v(\lambda)^{\rightarrow}$" denotes that LAB($\lambda$) represents $\neg v(\lambda)^{\rightarrow}$. LAB denotes a set $\{LAB(\lambda)\}_{\lambda=1,\ldots,\Psi}$ of LAB($\lambda$)'s ($\lambda=1, \ldots, \Psi$).

A $\Psi$-dimensional vector $TFV^{\rightarrow}$ is defined as:

$$TFV^{\rightarrow}=(tfv(1), \ldots, tfv(\Psi)) \quad (40)$$

Each element $tfv(\lambda)$ is $tfv(\lambda)=1$ when the inner product $v(\lambda)^{\rightarrow} \cdot w(\lambda)^{\rightarrow}$ is 0, and $tfv(\lambda)=0$ when the inner product $v(\lambda)^{\rightarrow} \cdot w(\lambda)^{\rightarrow}$ is nonzero.

$$tfv(\lambda)=1(PRO(\lambda) \text{ is true}) \text{ if } v(\lambda)^{\rightarrow} \cdot w(\lambda)^{\rightarrow} = 0 \qquad (41)$$

$$tfv(\lambda)=0(PRO(\lambda) \text{ is false}) \text{ if } v(\lambda)^{\rightarrow} \cdot w(\lambda)^{\rightarrow} \neq 0 \qquad (42)$$

Furthermore, when the truth value of the following logical formula is "true", it is denoted by $LIT(\lambda)=1$; when "false", it is denoted by $LIT(\lambda)=0$.

$$\{(LAB(\lambda)=v(\lambda)^{\rightarrow}) \wedge (tfv(\lambda)=1)\} \vee \{(LAB(\lambda)=\neg v(\lambda)^{\rightarrow}) \wedge (tfv(\lambda)=0)\} \qquad (43)$$

That is, when the truth value of the literal corresponding to the leaf node corresponding to an identifier $\lambda$ is "true", it is denoted by $LIT(\lambda)=1$; when "false", it is denoted by $LIT(\lambda)=0$. Then, a submatrix $MT_{TFV}$ made up only of row vectors $mt_{\lambda}^{\rightarrow}=(mt_{\lambda,1}, \ldots, mt_{\lambda,COL})$ that yield $LIT(\lambda)=1$ among the vectors in the matrix MT can be written as $$MT_{TFV}=(MT)_{LIT(\lambda)=1} \qquad (44)$$

In the case where the secret sharing scheme described above is a linear secret sharing scheme, if the value dependent on the secret information SE can be recovered from values dependent on share information $share(\lambda)$ corresponding to identifiers $\lambda$, then it is equivalent to that the COL-dimensional vector $GV^{\rightarrow}$ belongs to the vector space spanned by the row vectors $mt_{\lambda}^{\rightarrow}$ corresponding to the identifies $\lambda$. That is, whether or not the value dependent on the secret information SE can be recovered from values dependent on share information $share(\lambda)$ corresponding to the identifiers $\lambda$ can be determined by determining whether or not the COL-dimensional vector $GV^{\rightarrow}$ belongs to the vector space spanned by the row vectors $mt_{\lambda}^{\rightarrow}$ corresponding to the identifiers $\lambda$. A vector space spanned by row vectors $mt_{\lambda}^{\rightarrow}$ means the vector space that can be represented by a linear combination of the row vectors $mt_{\lambda}^{\rightarrow}$.

It is assumed here that if the COL-dimensional vector $GV^{\rightarrow}$ belongs to the vector space "span<$MT_{TFV}$>" which is spanned by the row vectors $mt_{\lambda}^{\rightarrow}$ of the submatrix $MT_{TFV}$ described above, the combination of the first information and the second information is accepted; otherwise the combination of the first information and the second information is rejected. This embodies the access structure described above. Here, in the case where the labeled matrix LMT(MT, LAB) corresponds to the first information as described above, "the access structure accepts the second information" refers to that the access structure accepts the combination of the first information and the second information; "the access structure rejects the second information" refers to that the access structure does not accept the combination of the first information and the second information.

Accept if $GV^{\rightarrow} \in$ span<$MT_{TFV}$>
Reject if $\neg(GV^{\rightarrow} \in$ span<$MT_{TFV}$>)

When $GV^{\rightarrow} \in$ span<$MT_{TFV}$>, there are coefficients $const(\mu)$ that satisfy the conditions given below and such coefficients $const(\mu)$ can be found in polynomial time of the order of the size of the matrix MT.

$$SE = \Sigma_{\mu \in SET} const(\mu) \cdot share(\mu) \qquad (45)$$

$\{const(\mu) \in F_q | \mu \in SET\}$, $SET \subseteq \{1, \ldots, \lambda | LIT(\lambda)=1\}$ <Basic Functional Encryption Scheme using Access Structure>

An example of a basic scheme of a key encapsulation mechanism (KEM) constructed by functional encryption using the access structure will be described below. The basic scheme involves Setup($1^{sec}$, ($\Psi$; n(1), ..., n($\Psi$))), GenKey(PK, MSK, LMT(MT, LAB)), Enc(PK, M, $\{\lambda, v(\lambda)^{\rightarrow} | \lambda = 1, \ldots, \Psi\}$) ($v_1(\lambda)=1_F$), and Dec(PK, SKS, C). The first element $w_1(\lambda)$ of the second information VSET2 = $\{\lambda, w(\lambda)^{\rightarrow} | \lambda=1, \ldots, \Psi\}$ is $1_F$.

[Setup($1^{sec}$, ($\Psi$; n(1), ..., n($\Psi$))): Setup]
Input: $1^{sec}$, ($\Psi$; n(1), ..., n($\Psi$))
Output: Master key information MSK, public parameters PK In Setup, the following process is performed for each $\phi=0, \ldots \Psi$.

(Setup-1) The order q, the elliptic curve E, the cyclic groups $G_1$, $G_2$, $G_T$, and the bilinear map $e_\phi(\phi=0, \ldots, \Psi)$ for the security parameter sec are generated by using the input $1^{sec}$ (param=(q, E, $G_1$, $G_2$, $G_T$, $e_\phi$)).

(Setup 2) $\tau' \in F_q$ is chosen and the matrices $X(\phi)$ and $X^*(\phi)$ that satisfy $X^*(\phi)=\tau' \cdot (X(\phi)^{-1})^T$ are chosen.

(Setup-3) The basis vectors $a_i(\phi)$ (i=1, ..., n($\phi$)+$\zeta(\phi)$) are coordinate-transformed according to Formula (21) to generate the n($\phi$)+$\zeta(\phi)$-dimensional basis vectors $b_i(\phi)$ (i=1, ..., n($\phi$)+$\zeta(\phi)$). The n($\phi$)+$\zeta(\phi)$ row by n($\phi$)+$\zeta(\phi)$ column matrix B($\phi$) consisting of the basis vectors $b_i(\phi)$ (i=1, ..., n($\phi$)+$\zeta(\phi)$) is generated.

(Setup-4) The basis vectors $a_i^*(\phi)$ (i=1, ..., n($\phi$)+$\zeta(\phi)$) are coordinate-transformed according to Formula (23) to generate the n($\phi$)+$\zeta(\phi)$-dimensional basis vectors $b_i^*(\phi)$ (i=1, ..., n($\phi$)+$\zeta(\phi)$). The B*($\phi$) of n($\phi$)+$\zeta(\phi)$ row by n($\phi$)+$\zeta(\phi)$ column matrix consisting of the basis vectors $b_i^*(\phi)$ (i=1, ..., n($\phi$)+$\zeta(\phi)$) is generated.

(Setup-5) A set $\{B^*(\phi)^{\wedge}\}_{\phi=0, \ldots, \Psi}$ of B*($\phi$)$^{\wedge}$ is set as master key information MSK=$\{B^*(\phi)^{\wedge}\}_{\phi=0, \ldots, \Psi}$. A set $\{B(\phi)^{\wedge}\}_{\phi=0, \ldots, \Psi}$ of B($\phi$)$^{\wedge}$, $1^{sec}$, and param are set as public parameters PK. Here, B*($\phi$)$^{\wedge}$ is the matrix B*($\phi$) or its submatrix and B($\phi$)$^{\wedge}$ is the matrix B($\phi$) or its submatrix. The set $\{B^*(\phi)^{\wedge}\}_{\phi=0, \ldots, \Psi}$ includes at least $b_1^*(0), b_1^*(\lambda), \ldots, b_{n(\lambda)}^*(\lambda)$ ($\lambda=1, \ldots, \Psi$). The set $\{B(\phi)^{\wedge}\}_{\phi=0, \ldots, \Psi}$ includes at least $b_1(0), b_1(\lambda), \ldots, b_{n(\lambda)}(\lambda)$ ($\lambda=1, \ldots, \Psi$). One example is given below.

$$n(0)+\zeta(0) \geq 5, \zeta(\lambda)=3 \cdot n(\lambda)$$

$$B(0)^{\wedge} = (b_1(0) b_3(0) b_5(0))^T$$

$$B(\lambda)^{\wedge} = (b_1(\lambda) \ldots b_{n(\lambda)}(\lambda) b_{3 \cdot n(\lambda)+1}(\lambda) \ldots b_{4 \cdot n(\lambda)}(\lambda))^T$$
$$(\lambda=1, \ldots, \Psi)$$

$$B^*(0)^{\wedge} = (b_1^*(0) b_3^*(0) b_4^*(0))^T$$

$$B^*(\lambda)^{\wedge} = (b_1^*(\lambda) \ldots b_{n(\lambda)}^*(\lambda) b_{2 \cdot n(\lambda)+1}^*(\lambda) \ldots b_{3 \cdot n(\lambda)}^*(\lambda))^T (\lambda=1, \ldots, \Psi)$$

[GenKey(PK, MSK, LMT(MT, LAB)): Key Information Generation]
Input: Public parameters PK, master key information MSK, a labeled matrix LMT(MT, LAB) corresponding to first information VSET1=$\{\lambda, v(\lambda)^{\rightarrow} | \lambda=1, \ldots, \Psi\}$
Output: Key information SKS (GenKey-1) The following operation is performed for the secret information SE that satisfies formulas (35) to (39).

$$D^*(0) = -SE \cdot b_1^*(0) + \Sigma_{\iota=2}^{I} coef_\iota(0) \cdot b_\iota^*(0) \qquad (46)$$

where I is a constant greater than or equal to 2 and less than or equal to n(0)+$\zeta(0)$; and $coef_\iota(0) \in F_q$ is a constant or a random number. The term "random number" means a true random number or a pseudo random number. One example of D*(0) is given below. Here, $coef_4(0)$ in Formula (47) is a random number.

$$D^*(0) = -SE \cdot b_1^*(0) + b_3^*(0) + coef_4(0) \cdot b_4^*(0) \qquad (47)$$

(GenKey-2) The following operation is performed for each $share(\lambda)$ ($\lambda=1, \ldots, \Psi$) that satisfies Formulas (35) to (39).

For $\lambda$ that satisfies $LAB(\lambda)=v(\lambda)^\rightarrow$, $D^*(\lambda)$ given below is generated.

$$D^*(\lambda) = (share(\lambda) + coef(\lambda) \cdot v_1(\lambda)) \cdot b_1^*(\lambda) + \sum_{\iota=2}^{n(\lambda)} coef(\lambda) \cdot v_\iota(\lambda) \cdot b_\iota^*(\lambda) + \sum_{\iota=n(\lambda)+1}^{n(\lambda)+\zeta(\lambda)} coef_\iota(\lambda) \cdot b_\iota^*(\lambda) \quad (48)$$

For $\lambda$ that satisfies $LAB(\lambda)=\neg v(\lambda)^\rightarrow$, $D^*(\lambda)$ given below is generated.

$$D^*(\lambda) = share(\lambda) \cdot \Sigma_{\iota=1}^{n(\lambda)} v_\iota(\lambda) \cdot b_\iota^*(\lambda) + \Sigma_{\iota=n(\lambda)+1}^{n(\lambda)+\zeta(\lambda)} coef_\iota(\lambda) \cdot b^*(\lambda) \quad (49)$$

Here, $coef(\lambda)$ and $coef_\iota(\lambda) \in F_q$ are constants or random numbers. An example is given below.

For $\lambda$ that satisfies $LAB(\lambda)=v(\lambda)^\rightarrow$, the following $D^*(\lambda)$, for example, is generated:

$$D^*(\lambda) = (share(\lambda) + coef(\lambda) \cdot v_1(\lambda)) \cdot b_1^*(\lambda) + \sum_{\iota=2}^{n(\lambda)} coef(\lambda) \cdot v_\iota(\lambda) \cdot b_\iota^*(\lambda) + \sum_{\iota=2 \cdot n(\lambda)+1}^{3 \cdot n(\lambda)} coef_\iota(\lambda) \cdot b_\iota^*(\lambda) \quad (50)$$

For $\lambda$ that satisfies $LAB(\lambda)=\neg v(\lambda)^\rightarrow$, the following $D^*(\lambda)$, for example, is generated:

$$D^*(\lambda) = share(\lambda) \cdot \Sigma_{\iota=1}^{n(\lambda)} v_\iota(\lambda) \cdot b_\iota^*(\lambda) + \Sigma_{\iota=2 \cdot n(\lambda)+1}^{3 \cdot n(\lambda)} coef_\iota(\lambda) \cdot b_\iota^*(\lambda) \quad (51)$$

Here, $coef(\lambda)$ and $coef_\iota(\lambda)$ in Formulas (50) and (51) are random numbers.

(GenKey-3) The following key information is generated.

$$SKS=(LMT(MT,LAB),D^*(0),D^*(1),\ldots,D(\Psi)) \quad (52)$$

[Enc(PK, M, VSET2: Encryption)]
Input: Public parameters PK, plaintext M, second information $VSET2=\{\lambda, w(\lambda)^\rightarrow | \lambda=1,\ldots,\Psi\}$ $(w_1(\lambda)=1_F)$
Output: Ciphertext C
(Enc-1) The ciphertext $C(\phi)$ ($\phi=0,\ldots,\Psi$) of the common key K is generated by the following operations.

$$C(0)=\upsilon \cdot b_1(0) + \Sigma_{\iota=2}^I \upsilon_\iota(0) \cdot b_\iota(0) \quad (53)$$

$$C(\lambda)=\upsilon \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota(\lambda) \cdot b_\iota(\lambda) \quad (54)$$

Here, $\upsilon, \upsilon_\iota(\phi) \in F_q$ ($\phi=0,\ldots,\Psi$) are constants or random numbers and the following relationships hold.

$$(coef_2(0),\ldots,coef_I(0)) \cdot (\upsilon_2(0),\ldots,\upsilon_I(0)) = \upsilon' \quad (55)$$

$$coef_\iota(\lambda) \cdot \upsilon_\iota(\lambda) = 0_F (\iota=n(\lambda)+1,\ldots,n(\lambda)+\zeta(\lambda)) \quad (56)$$

An example of $\upsilon'$ is any one of $\upsilon_2(0),\ldots,\upsilon_I(0)$. For example, $\upsilon, \upsilon_3(0), \upsilon_5(0), \upsilon_{3 \cdot n(\lambda)+1}(\lambda),\ldots,\upsilon_{4 \cdot n(\lambda)}(\lambda)$ are random numbers, $\zeta(\lambda)=3 \cdot n(\lambda)$, I=5, and the following relationships hold.

$$(\upsilon_2(0),\ldots,\upsilon_I(0))=(0_F,\upsilon_3(0),0_F,\upsilon_5(0))$$

$$\upsilon'=\upsilon_3(0)$$

$$(\upsilon_{n(\lambda)+1}(\lambda),\ldots,\upsilon_{3 \cdot n(\lambda)}(\lambda))=(0_F,\ldots,0_F).$$

(Enc-2) The following common key is generated.

$$K=g_T^{\tau \cdot \tau' \cdot \upsilon'} \in G_T \quad (57)$$

For example, when $\tau=\tau'=1_F$, the following relationship holds.

$$K=g_T^{\upsilon'} \in G_T \quad (58)$$

(Enc-3) The common key K is used to generate the ciphertext $C(\Psi+1)$ of the plaintext M.

$$C(\Psi+1)=Enc_K(M) \quad (59)$$

The common key encryption scheme Enc may be an encryption scheme that is constructed so that encryption can be achieved using the common key K, such as Camellia (registered trademark), AES, or the exclusive OR of the common key and the plaintext. In other simple example, $Enc_K(M)$ may be generated as:

$$C(\Psi+1)=g_T^{\upsilon'} \cdot M \quad (60)$$

In the example in Formula (60), $M \in G_T$.
(Enc-4) The following ciphertext is generated.

$$C=(VSET2, C(0), \{C(\lambda)\}_{(\lambda,w(\lambda)^\rightarrow) \in VSET2}, C(\Psi+1)) \quad (61)$$

Here, the subscript "$w(\lambda) \rightarrow$" represents "$w(\lambda)^\rightarrow$".
[Dec(PK, SKS, C): Decryption)]
Input: Public parameters PK, key information SKS, ciphertext C
Output: Plaintext M'
(Dec-1) For $\lambda=1,\ldots,\Psi$, determination is made as to whether or not the inner product $v(\lambda)^\rightarrow \cdot w(\lambda)^\rightarrow$ of the $n(\lambda)$-dimensional vector $v(\lambda)^\rightarrow$ which is each label $LAB(\lambda)$ of the labeled matrix $LMT(MT, LAB)$ included in the key information SKS and the $n(\lambda)$-dimensional vector $w(\lambda)^\rightarrow$ included in VSET2 of the ciphertext C is 0 and then, from the determination and each label $LAB(\lambda)$ of $LMT(MT, LAB)$, determination is made as to whether or not $GV^\rightarrow \in span<MT_{TFV}>$ (Formulas (40) to (45)). If not $GV^\rightarrow \in span<MT_{TFV}>$, the ciphertext C is rejected; if $GV^\rightarrow \in span<MT_{TFV}>$, the ciphertext C is accepted.
(Dec-2) When the ciphertext C is accepted, $SET \subseteq \{1,\ldots,\lambda | LIT(\lambda)=1\}$ and the coefficients $const(\mu)$ ($\mu \in SET$) that satisfy formula (45) are calculated.
(Dec-3) The following common key is generated.

$$K = e_0(C(0), D^*(0)) \cdot \prod_{\mu \in SET \wedge LAB(\mu)=v(\mu)^\rightarrow} e_\mu(C(\mu), D^*(\mu))^{const(\mu)} \cdot \prod_{\mu \in SET \wedge LAB(\mu)=\neg v(\mu)^\rightarrow} e_\mu(C(\mu), D^*(\mu))^{const(\mu)/(v(\mu)^\rightarrow \cdot w(\mu)^\rightarrow)} \quad (62)$$

Here, from Formulas (6), (25) and (55), the following relationship holds.

$$\begin{aligned} e_0(C(0), D^*(0)) &= e_0\left(\upsilon \cdot b_1(0) + \sum_{\iota=2}^I \upsilon_\iota(0) \cdot b_\iota(0), \right. \\ &\quad \left. -SE \cdot b_1^*(0) + \sum_{\iota=2}^I coef_\iota(0) \cdot b_\iota^*(0)\right) \\ &= e_0((\upsilon \cdot b_1(0), -SE \cdot b_1^*(0)) \cdot \\ &\quad \prod_{\iota=2}^I e_0(\upsilon_\iota(0) \cdot b_\iota(0), coef_\iota(0) \cdot b_\iota^*(0)) \\ &= e_0(b_1(0), b_1^*(0))^{-SE \cdot \upsilon} \cdot \prod_{\iota=2}^I e_0(b_\iota(0), b_\iota^*(0))^{\upsilon_\iota(0) \cdot coef_\iota(0)} \\ &= g_T^{\tau \cdot \tau' \cdot \delta(1,1) \cdot (-SE \cdot \upsilon)} \cdot \prod_{\iota=2}^I g_T^{\tau \cdot \tau' \cdot \delta(\iota,\iota) \cdot \upsilon_\iota(0) \cdot coef_\iota(0)} \\ &= g_T^{\tau \cdot \tau' \cdot (SE \cdot \upsilon + \upsilon')} \end{aligned} \quad (63)$$

From Formulas (6), (25), (41), (48), (54), (56) and $w_1(\lambda)=1_F$, the following relationship holds.

$$\prod_{\mu \in SET \wedge LAB(\mu)=\vec{v(\mu)}} e_\mu(C(\mu), D^*(\mu))^{const(\mu)} = \quad (64)$$

$$\prod_{\mu \in SET \wedge LAB(\mu)=\vec{v(\mu)}} e_\mu\left(\upsilon \cdot \sum_{i=1}^{n(\mu)} w_i(\mu) \cdot b_i(\mu) + \sum_{i=n(\mu)+1}^{n(\mu)+\zeta(\mu)} \upsilon_i(\mu) \cdot b_i(\mu), \text{share}(\mu) \cdot b_1^*(\mu) + \sum_{i=1}^{n(\mu)} coef(\mu) \cdot v_i(\mu) \cdot b_i^*(\mu) + \sum_{i=n(\mu)+1}^{n(\mu)+\zeta(\mu)} \text{coef}_i(\mu) \cdot b_i^*(\mu)\right)^{const(\mu)} =$$

$$\prod_{\mu \in SET \wedge LAB(\mu)=\vec{v(\mu)}} \left\{ \begin{array}{l} e_\mu\left(\upsilon \cdot \sum_{i=1}^{n(\mu)} w_i(\mu) \cdot b_i(\mu), \text{share}(\mu) \cdot b_1^*(\mu)\right) \cdot \\ e_\mu\left(\upsilon \cdot \sum_{i=1}^{n(\mu)} w_i(\mu) \cdot b_i(\mu), \sum_{i=1}^{n(\mu)} coef(\mu) \cdot v_i(\mu) \cdot b_i^*(\mu)\right) \end{array} \right\}^{const(\mu)} =$$

$$\prod_{\mu \in SET \wedge LAB(\mu)=\vec{v(\mu)}} \left( g_T^{\tau \cdot \tau' \cdot \upsilon \cdot share(\mu)} \cdot \prod_{i=1}^{n(\mu)} g_T^{\tau \cdot \tau' \cdot \upsilon \cdot coef(\mu) \cdot w_i(\mu) \cdot v_i(\mu)} \right)^{const(\mu)} =$$

$$\prod_{\mu \in SET \wedge LAB(\mu)=\vec{v(\mu)}} g_T^{\tau \cdot \tau' \cdot \upsilon \cdot const(\mu) \cdot share(\mu)}$$

From Formulas (6), (25), (42), (49), (54) and (56), the following relationship holds.

$$\prod_{\mu \in SET \wedge LAB(\mu)=\neg\vec{v(\mu)}} e_\mu(C(\mu), D^*(\mu))^{const(\mu)/(\vec{v(\mu)} \cdot \vec{w(\mu)})} = \quad (65)$$

$$\prod_{\mu \in SET \wedge LAB(\mu)=\neg\vec{v(\mu)}} e_\mu\left(\upsilon \cdot \sum_{i=1}^{n(\mu)} w_i(\mu) \cdot b_i(\mu) + \sum_{i=n(\mu)+1}^{n(\mu)+\zeta(\mu)} \upsilon_i(\mu) \cdot b_i(\mu), \text{share}(\mu) \cdot \sum_{i=1}^{n(\mu)} v_i(\mu) \cdot b_i^*(\mu) + \sum_{i=n(\mu)+1}^{n(\mu)+\zeta(\mu)} \text{coef}_i(\mu) \cdot b_i^*(\mu)\right)^{const(\mu)/(\vec{v(\mu)} \cdot \vec{w(\mu)})} =$$

$$\prod_{\mu \in SET \wedge LAB(\mu)=\neg\vec{v(\mu)}} \left\{ \prod_{i=1}^{n(\mu)} e_\mu(b_i(\mu), b_i^*(\mu))^{\upsilon \cdot share(\mu) \cdot w_i(\mu) \cdot v_i(\mu)} \right\}^{const(\mu)/(\vec{v(\mu)} \cdot \vec{w(\mu)})} =$$

$$\prod_{\mu \in SET \wedge LAB(\mu)=\neg\vec{v(\mu)}} \left\{ \prod_{i=1}^{n(\mu)} g_T^{\tau \cdot \tau' \cdot \upsilon \cdot share(\mu) \cdot w_i(\mu) \cdot v_i(\mu)} \right\}^{const(\mu)/(\vec{v(\mu)} \cdot \vec{w(\mu)})} =$$

$$\prod_{\mu \in SET \wedge LAB(\mu)=\neg\vec{v(\mu)}} \left\{ g_T^{\tau \cdot \tau' \cdot \upsilon \cdot share(\mu) \cdot \vec{v(\mu)} \cdot \vec{w(\mu)}} \right\}^{const(\mu)/(\vec{v(\mu)} \cdot \vec{w(\mu)})} =$$

$$\prod_{\mu \in SET \wedge LAB(\mu)=\neg\vec{v(\mu)}} g_T^{\tau \cdot \tau' \cdot \upsilon \cdot const(\mu) \cdot share(\mu)}$$

From Formulas (45) and (63) to (65), the following relationship holds.

$$K = g_T^{\tau \cdot \tau' \cdot (-SE \cdot \upsilon + \upsilon')} \cdot \prod_{\mu \in SET \wedge LAB(\mu)=\vec{v(\mu)}} g_T^{\tau \cdot \tau' \cdot \upsilon \cdot const(\mu) \cdot share(\mu)} \cdot \quad (66)$$

$$\prod_{\mu \in SET \wedge LAB(\mu)=\neg\vec{v(\mu)}} g_T^{\tau \cdot \tau' \cdot \upsilon \cdot const(\mu) \cdot share(\mu)}$$

$$= g_T^{\tau \cdot \tau' \cdot (-SE \cdot \upsilon + \upsilon')} g_T^{\tau \cdot \tau' \cdot \upsilon \cdot SE} = g_T^{\tau \cdot \tau' \cdot \upsilon'}$$

For example, when $\tau=\tau'=1_F$, the following relationship holds.

$$K = g_T^{\upsilon'} \in G_T \quad (67)$$

(Dec-4) The common key K is used to generate the plaintext M' as follows:

$$M' = \text{Dec}_K(C(\Psi+1)) = \text{Dec}_K(C(\Psi+1)) \quad (68)$$

For example, in the case of the common key encryption scheme illustrated in Formula (60), the following plaintext M' is generated:

$$M' = C(\Psi+1)/K \quad (69)$$

Here, $g_T^\tau$, $g_T^{\tau'}$, $g_T^{\tau \cdot \tau'}$, instead of $g_T$, may be treated as the generator of $G_T$. Furthermore, a map that determines correspondence between $\lambda$ of key information SKS and $\lambda$ of a ciphertext may be used to determine a combination of $C(\lambda)$ and $D^*(\lambda)$ to perform the process of [Dec(PK, SKS, C): Decryption]. $1_F$ may be the $n(\lambda)$-th element $v_{n(\lambda)}(\lambda)$ of the first information VSET1={$\lambda$, $\vec{v(\lambda)}|\lambda=1, \ldots, \Psi$}, as well as the first element $w_1(\lambda)$ of the second information VSET2={$\lambda$, $\vec{w(\lambda)}|\lambda, \ldots \Psi$}. If element $w_1(\lambda)$ is not $1_F$, $\vec{w(\lambda)}/w_1(\lambda)$ may be used instead of $\vec{w(\lambda)}$; if element $v_{n(\lambda)}(\lambda)$ is not $1_F$, $\vec{v(\lambda)}/v_{n(\lambda)}(\lambda)$ may be used instead of $\vec{v(\lambda)}$. The second information VSET2={$\lambda$, $\vec{w(\lambda)}|\lambda=1, \ldots, \Psi$} may be used instead of the first information VSET1={$\lambda$, $\vec{v(\lambda)}|\lambda=1, \ldots, \Psi$} and the first information VSET1={$\lambda$, $\vec{v(\lambda)}|\lambda=1, \ldots, \Psi$} may be used instead of the second information VSET2={$\lambda$, $\vec{w(\lambda)}|\lambda=1, \ldots, \Psi$}. In that case, the first element $v_1(\lambda)$ of the first information VSET1={$\lambda$, $\vec{v(\lambda)}|\lambda=1, \ldots, \Psi$} is $1_F$.

[CCA Security]

If Formula (70) is satisfied when [1] to [4] given below are executed, the following encryption scheme that uses encryption and decryption oracles is CCA secure.

$$Pr[\text{bit}=\text{bit}'] < (1/2) - \text{FNK(sec)} \quad (70)$$

where FNK(sec) is a function of sec that satisfies $0 < \text{FNK(sec)} \leq 1/2$. In that case, when [3] is performed after [2], it is said to be "CCA2 secure"; when [2] is performed after [3], it is said to be "CCA1 secure". "CCA2" is an attack stronger than "CCA1".

[1] Public parameters PK are given to an attacker.

[2] The attacker provides plaintexts $M_0$ and $M_1$, which are two bit sequences, to an encryption oracle having the public parameters PK. The encryption oracle randomly chooses bit $\in \{0, 1\}$, encrypts one of the plaintexts, $M_{bit}$, and provides the ciphertext $C_{bit}$ to the attacker.

[3] The attacker provides a ciphertext $C_{bit}'$ ($C_{bit}' \neq C_{bit}$) to a decryption oracle having key information SKS and can receive the result of decryption of the ciphertext $C_{bit}'$ from the decryption oracle. [4] The attacker outputs bit' $\in \{0, 1\}$.

[CCA Security of Basic Scheme of Functional Encryption scheme using Access Structure]

The basic scheme of the functional encryption using the access structure is not CCA secure. This will be described with a simple example. In this simple example, the plaintext M is a binary sequence. The ciphertext $C(\Psi+1)=\text{Enc}_K(M)$ (Formula (59)) of the plaintext M is generated by common key encryption using the common key K according to the following formula:

$$C(\Psi+1)=\text{MAP}(K)(+)M \tag{71}$$

A text (Formula (68)) decrypted from the ciphertext $C(\Psi+1)$ using the common key K is generated according to the following formula:

$$M'=C(\Psi+1)(+)\text{MAP}(K) \tag{72}$$

where MAP(K) represents a map of $K \in G_T$ to a binary sequence. In this case, an attacker can take the following strategy (hereinafter referred to as the "assumed strategy").

[1] The public parameters PK are given to the attacker.

[2] The attacker provides the second information $VSET2=\{\lambda, w(\lambda)^{\rightarrow}|\lambda=1, \ldots, \Psi\}$ and two plaintexts $M_0$ and $M_1$ to an encryption oracle that has the public parameters PK. The encryption oracle randomly chooses bit $\epsilon \{0,1\}$, encrypts one of the plaintexts, $M_{bit}$, by using the common key K (Formula (57)) to generate the following ciphertext $C_{bit}(\Psi+1)$:

$$C_{bit}(\Psi+1)=\text{MAP}(K)(+)M_{bit} \tag{73}$$

The encryption oracle further generates the ciphertexts $C(0)$, $C(\lambda)$ $(\lambda=1, \ldots, \Psi)$ (Formulas (53) and (54)) and provides the following ciphertexts to the attacker.

$$C_{bit}=(VSET2,C(0),\{C(\lambda)\}_{(\lambda,w(\lambda)^{\rightarrow}) \in VSET2}, C_{bit}(\Psi+1)) \tag{74}$$

[3] The attacker provides the following ciphertext $C_{bit}'$ to a decryption oracle which has the key information SKS (Formula (52)) and receives the result of decryption of the ciphertext $C_{bit}'$ from the decryption oracle:

$$C_{bit}'=(VSET2,C(0),\{C(\lambda)\}_{(\lambda,w(\lambda)^{\rightarrow}) \in VSET2}, C_{bit}(\Psi+1)\\(+)\Delta M) \tag{75}$$

where $\Delta M$ is a binary sequence having a value known to the attacker.

Here, if bit=0, then $C_{bit}(\Psi+1)=\text{MAP}(K)(+)M_0$ and the result of decryption of $C_{bit}(\Psi+1)(+)\Delta M$ will be $M_0(+)\Delta M$. On the other hand, if bit=1, $C_{bit}(\Psi+1)=\text{MAO}(K)(+)M_1$ and the result of decryption of $C_{bit}(\Psi+1)(+)\Delta M$ will be $M_0(+)\Delta M$.

[4] The attacker outputs bit'=0 when the result of decryption of $C_{bit}'$ is $M_0(+)\Delta M$. When the result of decryption is $M_1(+)\Delta M$, the attacker outputs bit'=1.

In this case, Pr[bit=bit']=1, which does not satisfy Formula (70).

[Functional Encryption Scheme using Access Structure of Present Embodiment]

As described above, the basic scheme of the functional encryption using the access structure is not CCA secure. On the other hand, if the CHK transformation scheme or the BK transformation scheme is applied to the basic scheme of the functional encryption using the access structure in order to improve security against CCA, an additional two-dimensional ciphertext space is required only for the CCA security. According to the present embodiment, CCA security is improved without an additional ciphertext space for the CCA security.

<Improved Functional Encryption Scheme>

The following is an overview of an improved functional encryption scheme according to the present embodiment.

[Encryption Process]

An encryption device for encryption executes the following process.

(Enc-11) A random number generating unit generates a random number r.

(Enc-12) A first encryption unit generates a ciphertext $C_2$ which is the exclusive OR of a binary sequence that depends on the random number r and a binary sequence which is a plaintext M. The random number r is secret information and one who does not know the random number r cannot recover the plaintext M from the ciphertext $C_2$.

(Enc-13) A function calculating unit inputs the pair of the random number r and the ciphertext $C_2$ in each of $S_{max}$ ($S_{max} \geq 1$) collision-resistant functions $H_S$ (S=1, ..., $S_{max}$) to generate $S_{max}$ ($S_{max} \geq 1$) function values $Hs(r, C_2)$ (S=1, ..., $S_{max}$).

(Enc-14) A common key generating unit generates the common key K that satisfies the following relationship for the generator $g_T$ of the cyclic group $G_T$ and the constants $\tau$ and $\tau'$.

$$K=g_T^{\tau \cdot \tau' \cdot \upsilon'} \in G_T \tag{76}$$

(Enc-15) A second encryption unit encrypts the random number r by the common key encryption scheme using the common key K to generate a ciphertext $C(\Psi+1)$.

(Enc-16) A third encryption unit generates a ciphertext $C_1$ including $C(0)$, $C(\lambda)$ ($\lambda=1, \ldots, \Psi$), and $C(\Psi+1)$ given below.

$$C(0)=\upsilon \cdot b_1(0)+\Sigma_{\iota=2}^I \upsilon_\iota(0)\cdot b_\iota(0) \tag{77}$$

$$C(\lambda)=\upsilon \cdot \Sigma_{\iota=1}^{n(\lambda)} w_\iota(\lambda)\cdot b_\iota(\lambda)+\Sigma_{\iota=n(\lambda)+1}^{n(\lambda)+\zeta(\lambda)} \upsilon_\iota(\lambda)\cdot b_\iota(\lambda) \tag{78}$$

$C(\Psi+1)$

Formulas (55) and (56) are satisfied and at least some of the values of $\upsilon$, $\upsilon_\iota(0)$ ($\iota=2, \ldots, I$), $\upsilon_\iota(\lambda)$ ($\iota=n(\lambda)+1, \ldots, n(\lambda)+\zeta(\lambda)$) correspond to at least some of the function values $H_S(r, C_2)$ (S=1, ..., $S_{max}$). In other words, at least some of the values of $\upsilon$, $\upsilon_\iota(0)$ ($\iota=2, \ldots, I$), $\upsilon_\iota(\lambda)$ ($\iota=n(\lambda)+1, \ldots, n(\lambda)+\zeta(\lambda)$) are determined by at least some of the function values $H_S(r, C_2)$ (S=1, ..., $S_{max}$). For example, at least some of $\upsilon$, $\upsilon_\iota(0)$ ($\iota=2, \ldots, I$), $\upsilon_\iota(\lambda)$ ($\iota=n(\lambda)+1, \ldots, n(\lambda)+\zeta(\lambda)$) are at least some of the function values $H_S(r, C_2)$ (S=1, ..., $S_{max}$) or function values of at least some of the function values of $H_S(r, C_2)$ (S=1, ..., $S_{max}$). Values $\upsilon$, $\upsilon_\iota(0)$ ($\iota=2, \ldots, I$), $\upsilon_{76}(\lambda)$ ($\iota=n(\lambda)+1, \ldots, n(\lambda)+\zeta(\lambda)$) that do not correspond to any of the function values $H_S(r, C_2)$ (S=1, ..., $S_{max}$) are set to constants or random numbers.

[Decryption Process]

A decryption device for decryption executes the following process.

(DEC-11) If there are coefficients const($\mu$) that satisfy Formula (45), a common key generating unit generates first key information $D^*(0)$, second key information $D^*(\lambda)$ ($\lambda=1, \ldots, \Psi$) and a common key K' given below.

The first key information can be expressed by $$D^*(0)=-SE\cdot b_1^*(0)+\Sigma_{\iota=2}^I \text{coef}_\iota(0)\cdot b_\iota^*(0) \tag{79}$$

Second key information $D^*(\lambda)$ for $\lambda$ that satisfies $LAB(\lambda)=v(\lambda)^{\rightarrow}$ can be expressed by $$D^*(\lambda) = (\text{share}(\lambda) + \text{coef}(\lambda)\cdot v_1(\lambda))\cdot b_1^*(\lambda) + \\ \sum_{\iota=2}^{n(\lambda)} \text{coef}(\lambda)\cdot v_\iota(\lambda)\cdot b_\iota^*(\lambda) + \sum_{\iota=n(\lambda)+1}^{n(\lambda)+\zeta(\lambda)} \text{coef}_\iota(\lambda)\cdot b_\iota^*(\lambda) \tag{80}$$

Second key information $D^*(\lambda)$ for $\lambda$ that satisfies $LAB(\lambda) = \neg v(\lambda)^{\rightarrow}$ can be expressed by $$D^*(\lambda) = \text{share}(\lambda) \cdot \Sigma_{\iota=1}^{n(\lambda)} v_\iota(\lambda) \cdot b_\iota^*(\lambda) + \Sigma_{\iota=n(\lambda)+1}^{n(\lambda)+\zeta(\lambda)} \text{coef}_\iota(\lambda) \cdot b^*(\lambda) \quad (81)$$

The common key generating unit uses input ciphertexts $C'(0)$ and $C'(\lambda)$ ($\lambda=1, \ldots, \Psi$) to generate the common key $K'$ according to the following formula:

$$K' = e_0(C'(0), D^*(0)) \cdot \prod_{\mu \in SET \wedge LAB(\mu) = v(\mu)^{\rightarrow}} e_\mu(C'(\mu), D^*(\mu))^{\text{const}(\mu)} \cdot \prod_{\mu \in SET \wedge LAB(\mu) = \neg v(\mu)^{\rightarrow}} e_\mu(C'(\mu), D^*(\mu))^{\text{const}(\mu)/(v(\mu)^{\rightarrow} \cdot w(\mu)^{\rightarrow})} \quad (82)$$

(DEC-12) A first decryption unit uses the common key $K'$ to decrypt input ciphertext $C'(\Psi+1)$, thereby generating a decrypted value $r'$.

(DEC-13) A function calculating unit inputs the pair of decrypted value $r'$ and input ciphertext $C_2'$ into each of the $S_{max}$ ($S_{max} \geq 1$) collision-resistive functions $H_S$ ($S=1, \ldots, S_{max}$) to generate the $S_{max}$ ($S_{max} \geq 1$) function values $H_S(r', C_2')$ ($S=1, \ldots, S_{max}$).

(DEC-14) If the ciphertexts $C'(0)$ and $C'(\lambda)$ do not match ciphertexts $C''(0) = \upsilon'' \cdot b_1(0) + \Sigma_{\iota=2}^{I} \upsilon_\iota''(0) \cdot b_\iota(0)$ and $C''(\lambda) = \upsilon'' \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota''(\lambda) \cdot b_\iota(\lambda)$, a determination unit refuses decryption. On the other hand, the ciphertexts $C'(0)$ and $C'(\lambda)$ match the ciphertexts $C''(0)$ and $C''(\lambda)$, a second decryption unit generates a decrypted value $M'$ which is the exclusive OR of a binary sequence that depends on the decrypted value $r'$ and the ciphertext $C_2'$ which is the input binary sequence.

At least some of the values of $\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$) correspond to at least some of the function values $H_S(r', C_2')$ ($S=1, \ldots, S_{max}$). In other words, at least some of the values of $\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$) are determined by at least some of the function values of $H_S(r', C_2')$ ($S=1, \ldots, S_{max}$). For example, at least some of $\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$) are at least some of the function values $H_S(r', C_2')$ ($S=1, \ldots, S_{max}$) or function values of at least some of the function values of $H_S(r', C_2')$ ($S=1, \ldots, S_{max}$). Values of $\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$) that do not correspond to any of the function values $H_S(r', C_2')$ ($S=1, \ldots, S_{max}$) are set to constants or random numbers.

<CCA Security of Improved Functional Encryption Scheme>

Assume a scenario where the assumed strategy described above is applied to the improved scheme.

[1] The public parameters PK are given to an attacker.

[2] The attacker provides the second information $VSET2 = \{\lambda, w(\lambda)^{\rightarrow} | \lambda=1, \ldots, \Psi\}$ and two plaintexts $M_0$ and $M_1$ to an encryption oracle having the public parameters PK. The encryption oracle randomly chooses bit $\epsilon \in \{0, 1\}$, generates a random number $r$ (Enc-11), generates a ciphertext $C_2$ which is the exclusive OR of a binary sequence that depends on the random number $r$ and a plaintext $M_{bit}$ which is a binary sequence, inputs the pair of random number $r$ and the ciphertext $C_2$ in each of $S_{max}$ ($S_{max} \geq 1$) collision-resistant functions $H_S(r, C_2)$ ($S=1, \ldots, S_{max}$) to generate the $S_{max}$ ($S_{max} \geq 1$) function values $H_S(r, C_2)$ ($S=1, \ldots, S_{max}$) (Enc-13), generates the common key K that satisfies $K = g_T^{\tau \cdot \tau' \cdot \upsilon} \in G_T$ (Formula (76)) (Enc-14), and encrypts the random number $r$ by common key encryption using the common key K to generate the ciphertext $C(\Psi+1)$. The encryption oracle further generates the ciphertext $C_1$ including $C(0) = \upsilon \cdot b_1(0) + \Sigma_{\iota=2}^{I} \upsilon_\iota(0) \cdot b_\iota(0)$ (Formula (77)), $C(\lambda) = \upsilon \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota(\lambda) \cdot b_\iota(\lambda)$ (Formula (78)), and $C(\Psi+1)$ (Enc-16). Here, at least some of $\upsilon$, $\upsilon_\iota(0)$ ($\iota=2, \ldots, I$), $\upsilon_\iota(\lambda)$ ($\iota=n(\lambda)+1, \ldots, n(\lambda)+\zeta(\lambda)$) depend on at least some of the function values $H_S(r, C_2)$ ($S=1, \ldots, S_{max}$). The encryption oracle provides a ciphertext $C_{bit}$ including the generated ciphertexts $C_1$ and $C_2$ to the attacker.

[3] The attacker can generate the following ciphertext:

$$C_2' = C_2(+)\Delta M \quad (83)$$

However, the attacker, who does not know the random number $r$, cannot input a pair of random number $r$ and ciphertext $C_2'$ to each of the $S_{max}$ ($S_{max} \geq 1$) collision-resistant functions $H_S$ ($S=1, \ldots, S_{max}$) to generate the function values $H_S(r, C_2')$ ($S=1, \ldots, S_{max}$). The attacker therefore provides a ciphertext $C_{bit}'$ including ciphertexts $C_1$ and $C_2'$ to a decryption oracle having the first key information $D^*(0)$ (Formula (79)) and the second key information $D^*(\lambda)$ (Formulas (80) and (81)).

If there are coefficients $\text{const}(\mu)$ that satisfy Formula (45), the decryption oracle, which has taken the input of the ciphertexts $C_{bit}'$, generates the common key $K'$ (Formula (82)) (DEC-11), decrypts the ciphertext $C'(\Psi+1)$ included in the ciphertext $C_1$ using the common key $K'$ to generate a decrypted value $r'$ (DEC-12), inputs the pair of decrypted value $r'$ and ciphertext $C_2'$ into each of the $S_{max}$ ($S_{max} \geq 1$) collision-resistant functions $H_S$ ($S=1, \ldots, S_{max}$) to generate the $S_{max}$ ($S_{max} \geq 1$) function values $H_S(r', C2')$ ($S=1, \ldots, S_{max}$) (DEC-13). Since it is likely that $H_S(r', C_2') \neq H_S(r, C_2)$ due to the collision resistance of the functions $H_S$, ciphertexts $C'(0)$ and $C'(\lambda)$ are unlikely to match ciphertexts $C''(0) = \upsilon'' \cdot b_1(0) + \Sigma_{\iota=2}^{I} \upsilon_{\iota''}(0) \cdot b_\iota(0)$ and $C''(\lambda) = \upsilon'' \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota''(\lambda) \cdot b_\iota(\lambda)$. Accordingly, decryption is rejected.

[4] Since the attacker cannot obtain the result of decryption of $C_2' = C_2(+)\Delta M$, the attacker cannot "output bit'=0 when the decryption result is $M_0(+)\Delta M$ or output bit'=1 when the decryption is $M_1(+)\Delta M$. Therefore the strategy of the attacker fails.

Embodiment

An embodiment of the improved scheme will be described below. In the following description, an example is given in which the first information $VSET1 = \{\lambda, v(\lambda)^{\rightarrow} | \lambda, \ldots, \Psi\}$ is embedded in key information and the second information $VSET2 = \{\lambda, w(\lambda)^{\rightarrow} | \lambda, \ldots, \Psi\}$ is embedded in a ciphertext. However, the second information $VSET2 = \{\lambda, w(\lambda)^{\rightarrow} | \lambda, \ldots, \Psi\}$ may be embedded in the key information and the first information $VSET1 = \{\lambda, v(\lambda)^{\rightarrow} | \lambda, \ldots, \Psi\}$ may be embedded in the ciphertext. In the example of this embodiment, the $n(\lambda)$-dimensional vector $v(\lambda)^{\rightarrow}$ constituting the first information VSET1 corresponds to a particular policy and the $n(\lambda)$-dimensional vector $w(\lambda)^{\rightarrow}$ constituting the second information $VSET2 = \{\lambda, w(\lambda)^{\rightarrow} | \lambda, \ldots, \Psi\}$ corresponds to an attribute. When the attribute corresponding to the $n(\lambda)$-dimensional vector $w(\lambda)^{\rightarrow}$ matches the policy corresponding to the $n(\lambda)$-dimensional vector $v(\lambda)^{\rightarrow}$, inner product $v(\lambda)^{\rightarrow} \cdot w(\lambda)^{\rightarrow} = 0$; when the attribute corresponding to the $n(\lambda)$-dimensional vector $w(\lambda)^{\rightarrow}$ does not match the policy corresponding to the $n(\lambda)$-dimensional vector $v(\lambda)^{\rightarrow}$, inner product $v(\lambda)^{\rightarrow} \cdot w(\lambda)^{\rightarrow} \neq 0$.

[General Configuration]

Figure 3:
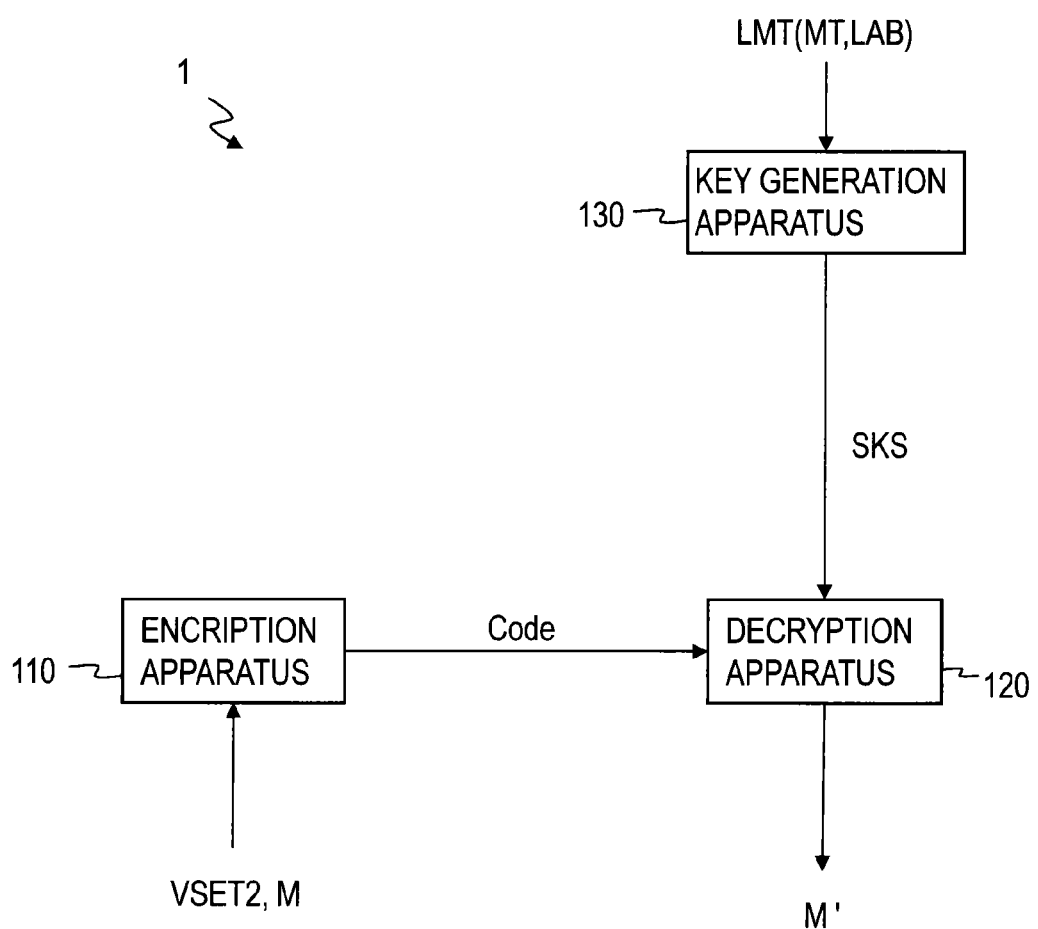
FIG. 3 is a block diagram illustrating an encryption system in one embodiment.

As illustrated in FIG. 3, an encryption system 1 of this embodiment includes an encryption device 110, a decryption device 120 and a key generation device 130. The encryption device 110 and the decryption device 120, and the decryption device 120 and the key generation device 130 are capable of communicating information through media such as a network and portable recording media.

[Encryption Device]

Figure 4:
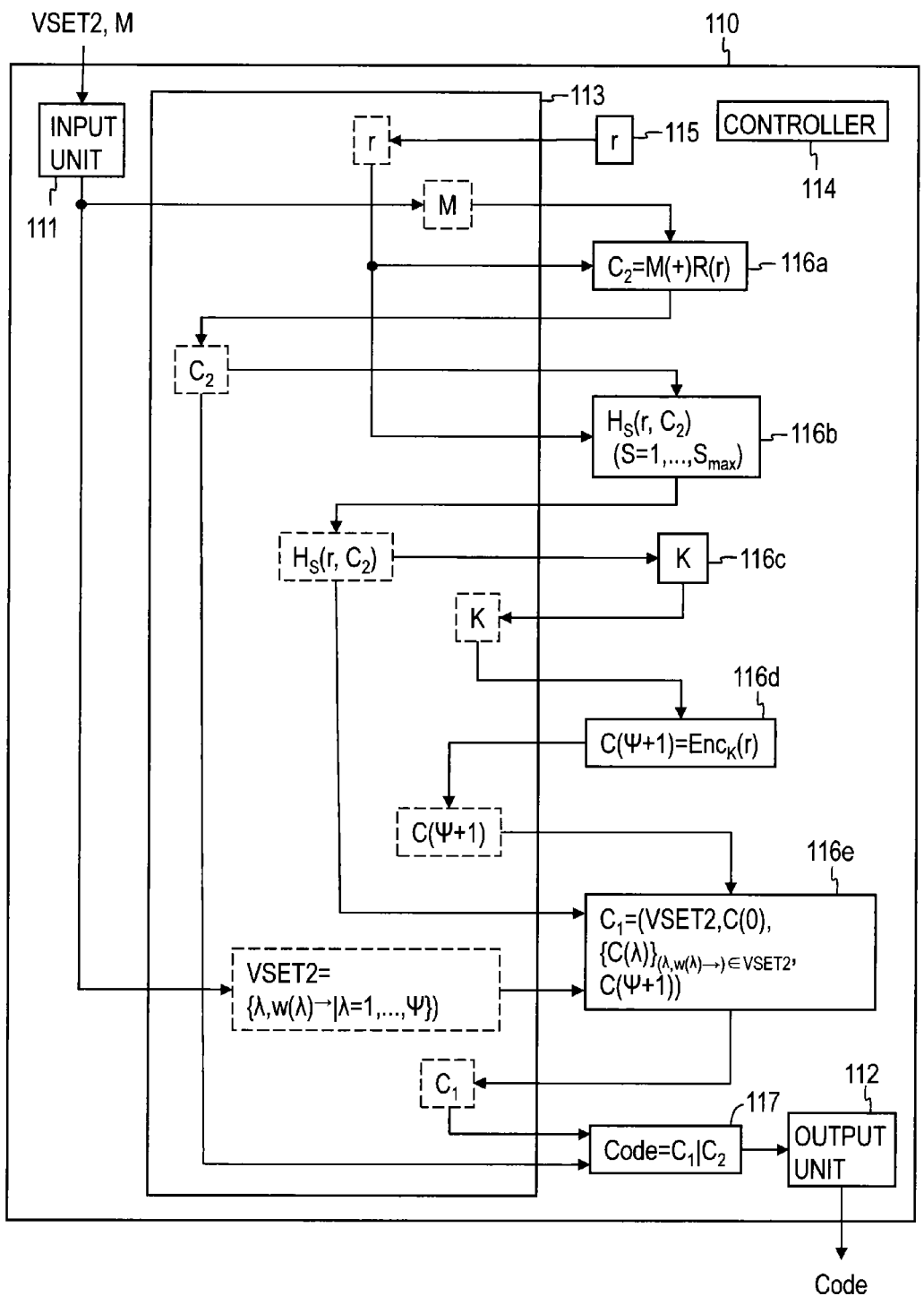
FIG. 4 is a block diagram illustrating an encryption device in the embodiment.

As illustrated in FIG. 4, the encryption device 110 of this embodiment includes an input unit 111, an output unit 112, a storage 113, a controller 114, a random number generating unit 115, encryption units 116a, 116d, and 116e, a function calculating unit 116b, a common key generating unit 116c, and a combining unit 117.

The encryption device 110 is a particular device that includes a well-known or dedicated computer having components such as a CPU (central processing unit), a RAM (random-access memory), and a ROM (read-only memory), for example, and a particular program. The random number generating unit 115, the encryption units 116a, 116d and 116e, the function calculating unit 116b, the common key generating unit 116c, and the combining unit 117 are processing units configured by the CPU executing a particular program, for example. At least some of the processing units may be particular integrated circuits (IC). For example, the random number generating unit 115 may be a well-known IC that generates random numbers. The storage 113 is, for example, a RAM, registers, a cache memory, or elements in an integrated circuit, or an auxiliary storage device such as a hard disk, or storage areas implemented by a combination of at least some of these. The input unit 111 is, for example, an input interface such as a keyboard, a communication device such as a modem and a LAN (local area network) card, and an input port such as a USB terminal. The output unit 112 is, for example, an output interface, a communication device such as a modem and a LAN card, and an output port such as a USB port. The encryption device 110 executes processes under the control of the controller 114.

[Decryption Device]

Figure 5:
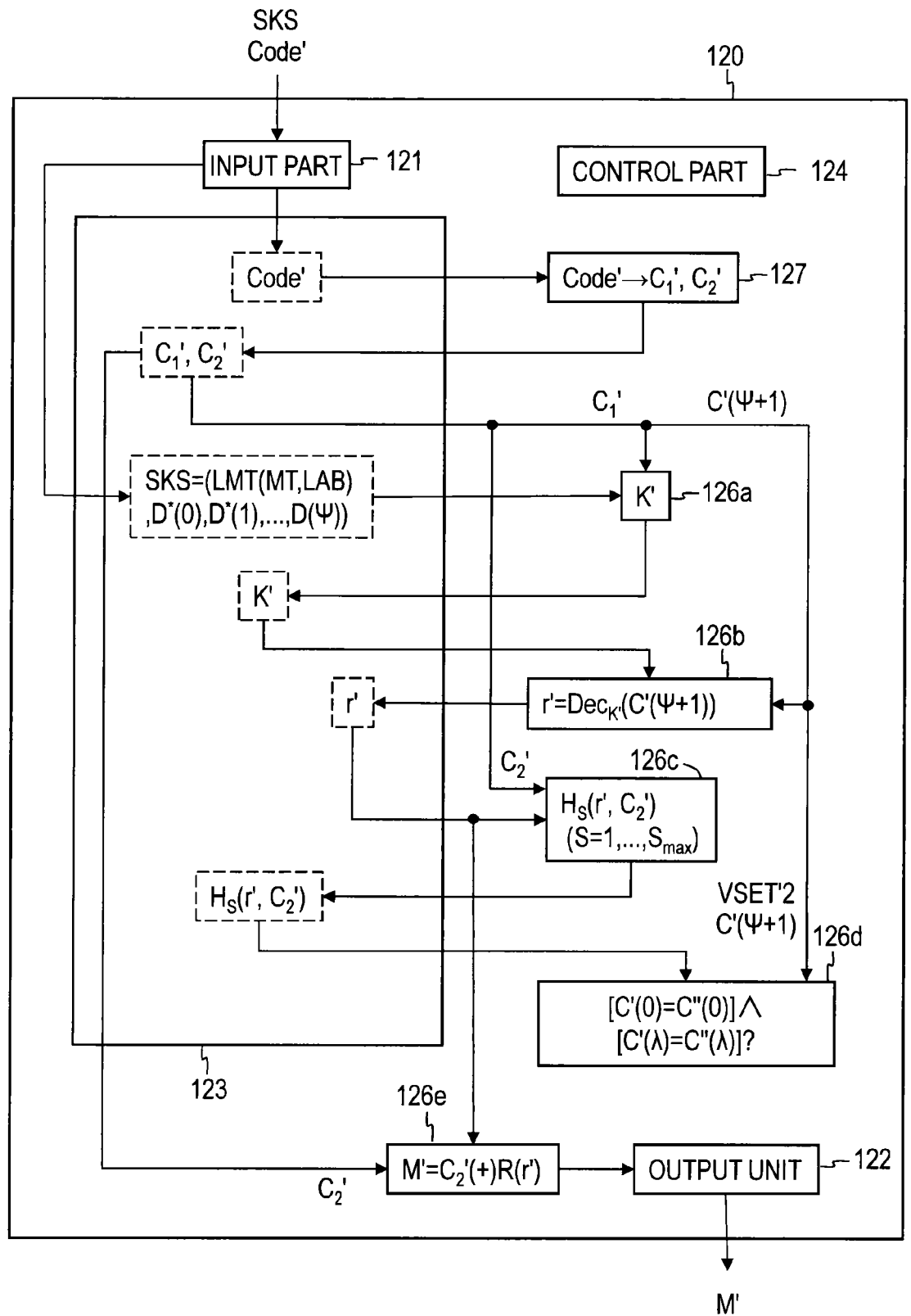
FIG. 5 is a block diagram illustrating a decryption device in the embodiment.

As illustrated in FIG. 5, the decryption device 120 of this embodiment includes an input unit 121, an output unit 122, a storage 123, a controller 124, a common key generating unit 126a, decryption units 126b and 126e, a function calculating unit 126c, a determination unit 126d, and a separating unit 127.

The decryption device 120 is a particular device including a well-known or a dedicated computer having components such as a CPU, a RAM, and a ROM, and a particular program. That is, the controller 124, the common key generating unit 126a, the decryption units 126b and 126e, the function calculating unit 126c, the determination unit 126d and the separating unit 127 are processing units configured by the CPU executing a particular program, for example. At least some of the processing units may be particular integrated circuits. The storage 123 is, for example, a RAM, registers, a cache memory, or elements in an integrated circuit, or an auxiliary storage device such as a hard disk, or storage areas implemented by a combination of at least some of these. The input unit 121 is, for example, an input interface, a communication device and an input port. The output unit 122 is, for example, an output interface, a communication device and an output port. The decryption device 120 executes processes under the control of the controller 124.

[Key Generation Device]

Figure 6:
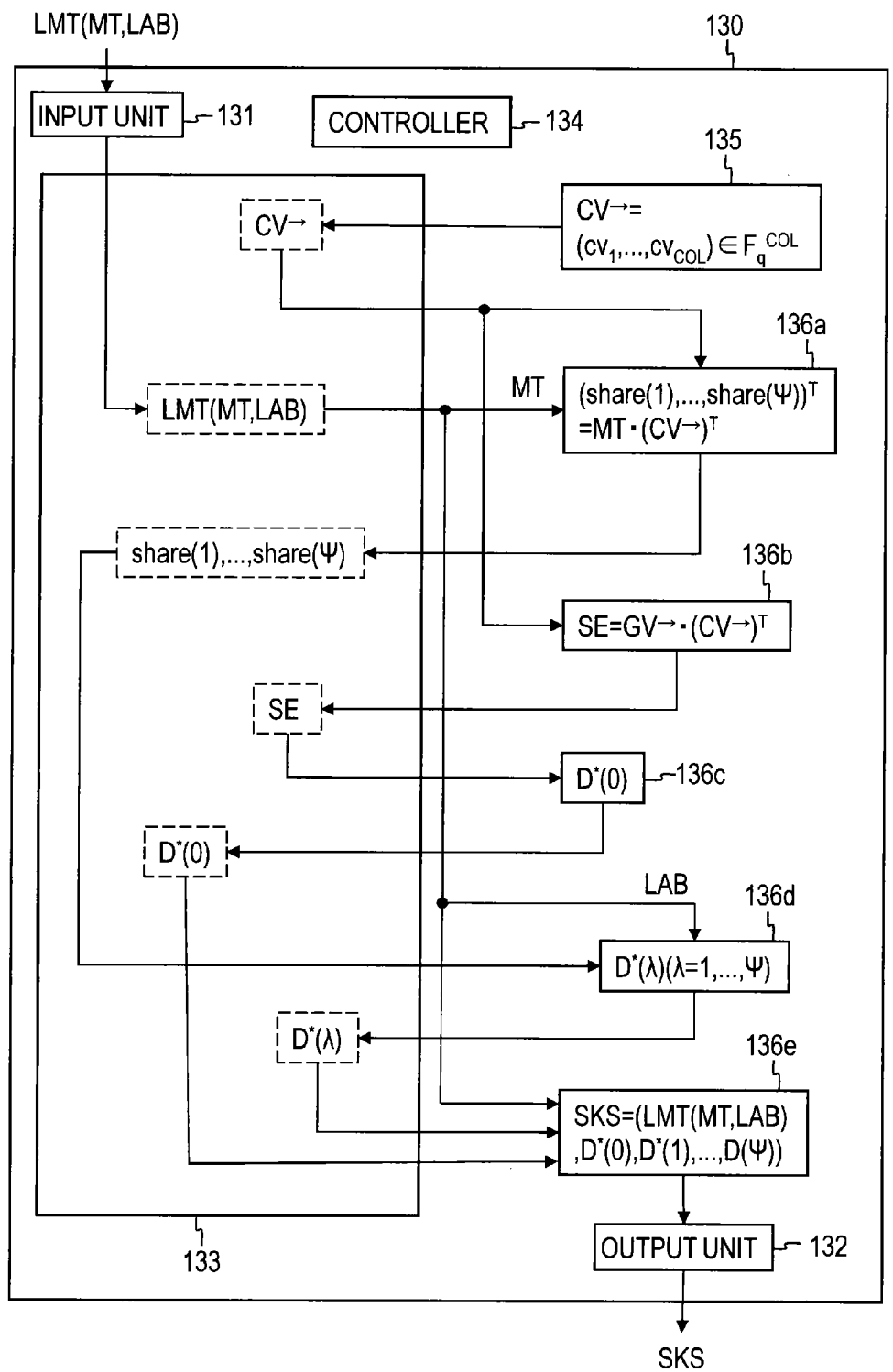
FIG. 6 is a block diagram illustrating a key generation device in the embodiment.

As illustrated in FIG. 6, the key generation device 130 of this embodiment includes an input unit 131, an output unit 132, a storage 133, a controller 134, a selection unit 135, a share information generating unit 136a, a secret information generating unit 136b, and key generating units 136c, 136d and 136e.

The key generation device 130 is a particular device including, for example, a well-known or dedicated computer having components such as a CPU, a RAM and a ROM and, a particular program. That is, the controller 134, the selection unit 135, the share information generating unit 136a, the secret information generating unit 136b and the key generating units 136c, 136d and 136e are processing units configured by the CPU executing a particular program. At least some of the processing units may be particular integrated circuits. The storage 133 is, for example, a RAM, registers, a cache memory, or elements in an integrated circuit, or an auxiliary storage device such as a hard disk, or storage areas implemented by a combination of at least some of these. The input unit 131 is, for example, an input interface, a communication device and an input port. The output unit 132 is, for example, an output interface, a communication device and an output port. The key generation device 130 executes processes under the control of the controller 134.

[Presetting]

Presetting for executing the processes of this embodiment will be described below.

A management device, not depicted, executes [Setup($1^{sec}$, ($\Psi$; n(1), . . . , n($\Psi$))): Setup] described earlier to set the public parameters PK including the set $\{B(\phi)\}_{\phi=0,\ldots,\Psi}$, $1^{sec}$, and param=(q, E, $G_1$, $G_2$, $G_T$, $e_\phi$), and the master key information MSK=$\{B^*(\phi)\}_{\phi=0,\ldots,\Psi}$. The public parameters PK are set in the encryption device 110, the decryption device 120 and the key generation device 130 so that the public parameters K can be used in these devices. The master key information MSK is set in the key generation device 130 so that the master key information MSK can be used in the key generation device 130. The master key information MSK is secret information which is not open to the public. The public parameters PK and other information may be set in the devices by embedding them in a particular program that configures the devices or may be set by storing them in storages of the devices. In this embodiment, an example will be given in which the public parameters PK and other information are embedded in the particular program.

[Key Information Generating Process]

The key information generating process is executed especially when the key information SKS is not stored in the storage 123 of the decryption device 120. When key information SKS is stored in the storage 123 of the decryption device 120, this process may be omitted. The key information may be generated before or after generating a ciphertext.

Figure 7:
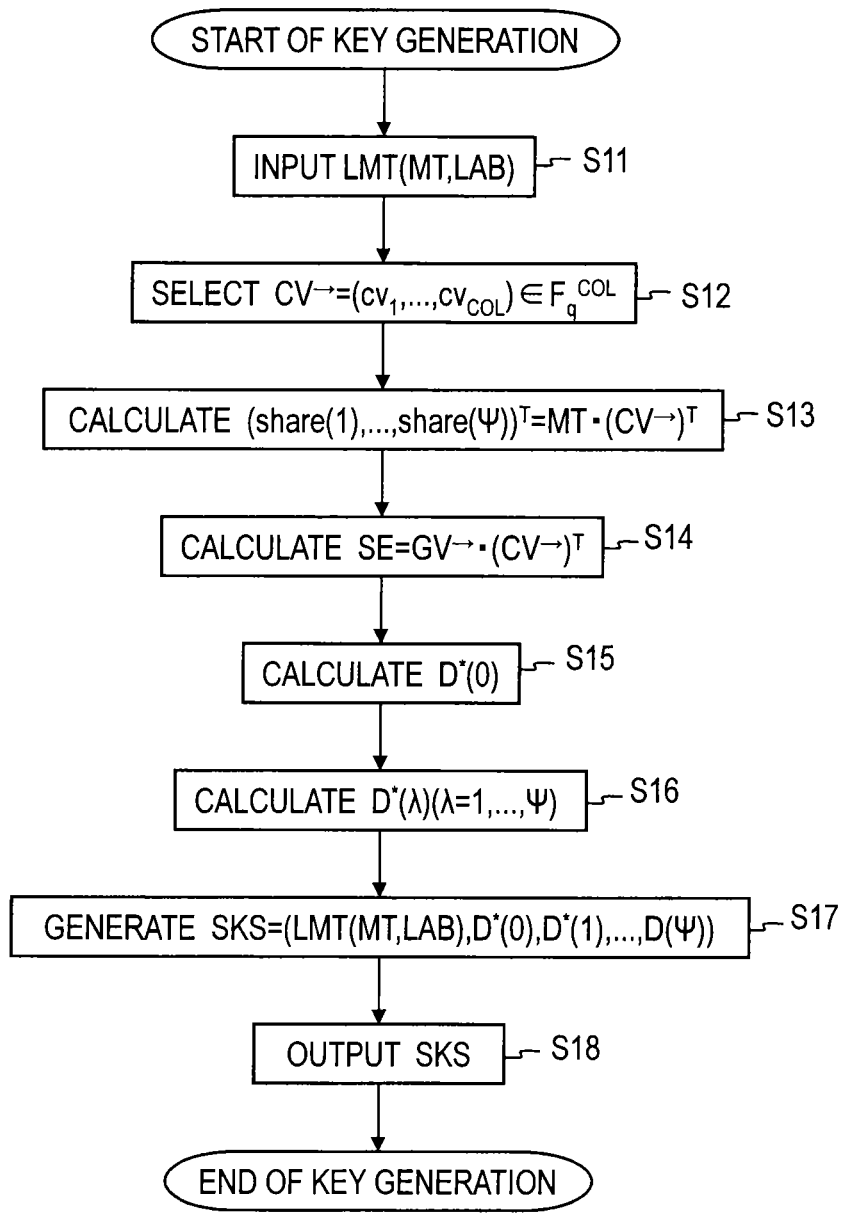
FIG. 7 is a diagram illustrating a key generation process in the embodiment.

As illustrated in FIG. 7, in the key information generating process, first the labeled matrix LMT(MT, LAB) corresponding to the key information to be generated is input in the input unit 131 of the key generation device 130 (FIG. 6). As has been described, the labeled matrix LMT(MT, LAB) is information in which a matrix MT in Formula (34) is associated with the labels LAB($\lambda$) (LAB($\lambda$)=v($\lambda$)$^\rightarrow$ or LAB($\lambda$)=¬n($\lambda$)$^\rightarrow$) corresponding to the n($\lambda$)-dimensional vectors v($\lambda$)$^\rightarrow$ constituting the first information VSET1. The input labeled matrix LMT(MT, LAB) is stored in the storage 133 (step S11).

Then, the selection unit 135 randomly selects a COL-dimensional vector CV$^\rightarrow \in F_q^{COL}$ (Formula (36)) consisting of the elements of the finite field $F_q$ and stores the COL-dimensional vector CV$^\rightarrow$ in the storage 133 (step S12). The matrix MT and the COL-dimensional vector CV$^\rightarrow$ are input in the share information generating unit 136a. The share information generating unit 136a calculates the share information share($\lambda$) $\in F_q$ ($\lambda$=1, . . . , $\Psi$) according to Formula (39) and stores the generated share information share($\lambda$) $\in F_q$ ($\lambda$=1, . . . , $\Psi$) in the storage 133 (step S13). The COL-dimensional vector $\overrightarrow{CV}$ is input in the secret information generating unit 136b and the secret information generating unit 136b generates the secret information SE according to Formula (37) and stores the secret information SE in the storage 133 (step S14).

Then the secret information SE is input in the key generating unit 136c. The key generating unit 136c generates the key information $D^*(0)$ according to Formula (46) and stores the key information $D^*(0)$ in the storage 133. For example, the key generating unit 136c generates the key information $D^*(0)$ according to Formula (47) and stores the key information $D^*(0)$ in the storage 133 (step S15). The label information $LAB(\lambda)$ ($\lambda=1, \ldots, \Psi$) is input in the key generating unit 136d and the key generating unit 136d generates the key information $D^*(\lambda)$ ($\lambda=1, \ldots, \omega$) according to Formulas (48) and (49) and stores the key information $D^*(\lambda)$ in the storage 133. For example, the key generating unit 136d generates the key information $D^*(\lambda)$ ($\lambda=1, \ldots, \Psi$) according to Formulas (50) and (51), and stores the key information $D^*(\lambda)$ in the storage 133 (step S16). The labeled matrix $LMT(MT, LAB)$, the key information $D^*(0)$ and the key information $D^*(\lambda)$ ($\lambda=1, \ldots, \Psi$) are input in the key generating unit 136e and the key generating unit 136e generates the key information SKS according to formula (52) and sends the key information SKS to the output unit 132 (step S17).

The output unit 132 outputs the key information SKS (step S18). The key information SKS is input in the input unit 121 of the decryption device 120 (FIG. 5) and is then stored in the storage 123.

[Encryption Process]

Figure 8:
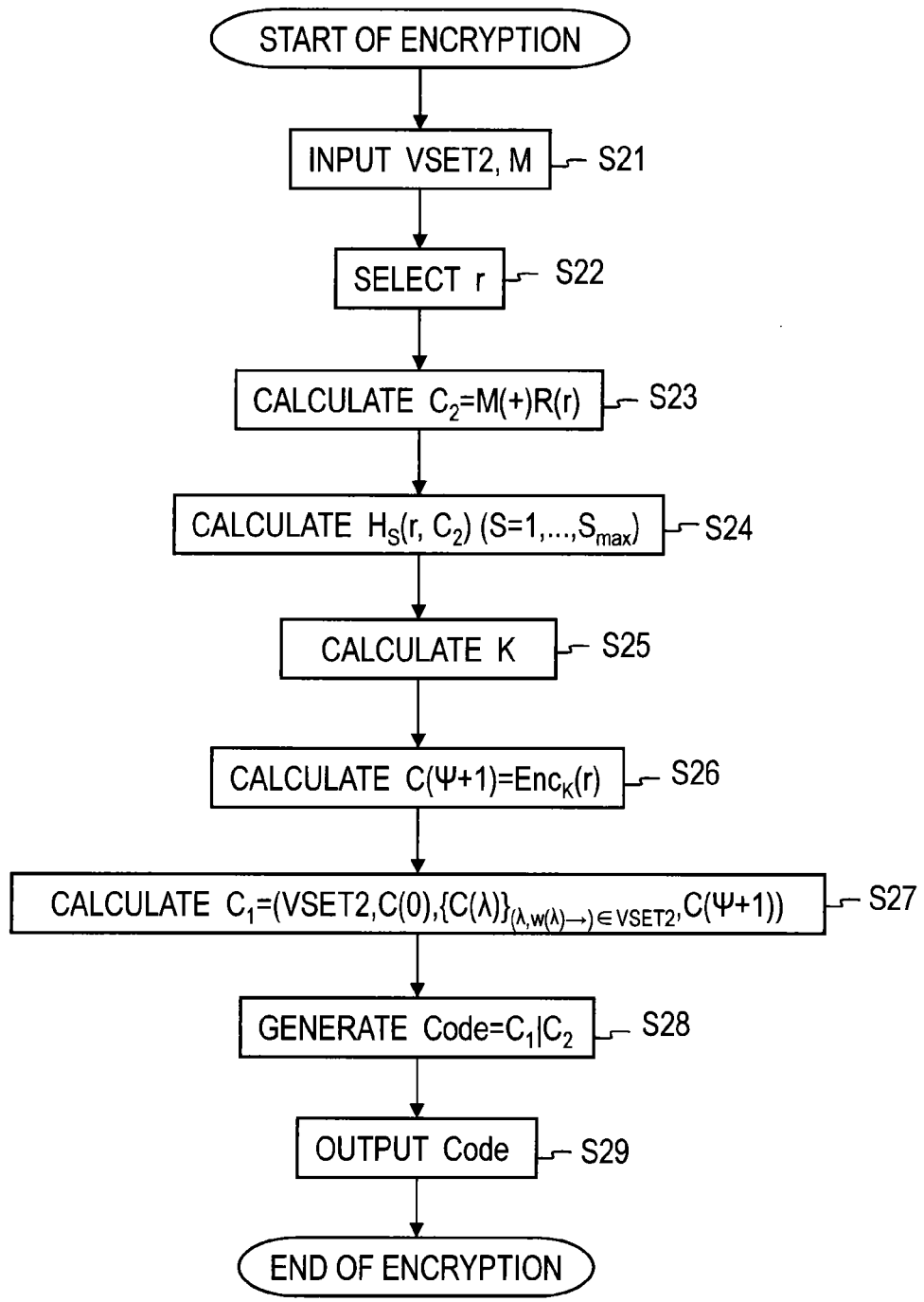
FIG. 8 is a diagram illustrating an encryption process in the embodiment.

In the encryption process, as illustrated in FIG. 8, the second information $VSET2=\{\lambda, \overrightarrow{w(\lambda)} | \lambda=1, \ldots, \Psi\}$ and a plaintext M, which is a binary sequence, are first input in the input unit 111 of the encryption device 110 (FIG. 4) and are then stored in the storage 113 (step S21).

Then the random number generating unit 115 generates a random number r and stores the random number r in the storage 113. The random number r is an element of the domain of the injective function R. For example, if the injective function R is a function that takes input of one element of the cyclic group $G_T$, the random number r is an element of the cyclic group $G_T$; if the injective function R is a function that takes input of one binary sequence, the random number r is a binary sequence (step S22).

The random number r and the plaintext M are input in the encryption unit 116a. The encryption unit 116a provides the exclusive OR of the function value $R(r)$, which is the binary sequence obtained by applying the injective function R to the random number r, and the plaintext M as the ciphertext $C_2$ as follows:

$$C_2 = M(+)R(r) \tag{84}$$

The ciphertext $C_2$ is stored in the storage 113 (step S23).

The random number r and the ciphertext $C_2$ are input in the function calculating unit 116b. The function calculating unit 116b inputs the pair of the random number r and the ciphertext $C_2$ into each of the $S_{max}$ ($S_{max} \geq 1$) collision-resistant functions $H_S$ ($S=1, \ldots, S_{max}$) to generate the $S_{max}$ ($S_{max} \geq 1$) function values $H_S(r, C_2) \in F_q$ ($S=1, \ldots, S_{max}$). Note that $S_{max}$ in this embodiment is a constant. An example of $S_{max}$ is given below (step S24).

$$S_{max} = 3 + \Sigma_{\lambda=1}^{\Psi} n(\lambda) \tag{85}$$

Then, common key generating unit 116c generates the common key $K \in G_T$ that satisfies Formula (76) for the generator $g_T$ of the cyclic group $G_T$ and the constants $\tau, \tau', \upsilon' \in F_q$. While $\upsilon' \in F_q$ may be a random number, $\upsilon' \in F_q$ in this embodiment is a value corresponding to at least some of the function values $H_S(r, C_2) \in F_q$ ($S=1, \ldots, S_{max}$) input in the common key generating unit 116c. For example, $\upsilon' \in F_q$ is one of the function values $H_S(r, C_2) \in F_q$ ($S=1, \ldots, S_{max}$) or a function value of one of the function values $H_S(r, C_2) \in F_q$ ($S=1, \ldots, S_{max}$). An example of $\upsilon' \in F_q$ is given below (step S25).

$$\upsilon' = H_2(r, C_2) \in F_q \tag{86}$$

The common key K and the random number r are input in the encryption unit 116d. The encryption unit 116d uses the common key K to encrypt the random number r by common key encryption, thereby generating the following ciphertext $C(\Psi+1)$:

$$C(\Psi+1) = Enc_K(r) \tag{87}$$

The ciphertext $C(\Psi+1)$ is stored in the storage 113 (step S26).

The second information VSET2 and at least some of the function values $H_S(r, C_2) \in F_q$ ($S=1, \ldots, S_{max}$) as well as the ciphertext $C(\Psi+1)$ are input in the encryption unit 116e. The encryption unit 116e sets values corresponding to at least some of the function values $H_S(r, C_2) \in F_q$ ($S=1, \ldots, S_{max}$) as values of at least some of $\upsilon, \upsilon_\iota(0)$ ($\iota=2, \ldots, I$), $\upsilon_\iota(\lambda)$ ($\iota=n(\lambda)+1, \ldots, n(\lambda)+\zeta(\lambda)$) according to a predetermined criterion, and generates $C(0)$ and $C(\lambda)$ ($\lambda=1, \ldots, \Psi$) according to Formulas (77) and (78). For example, at least some of $\upsilon, \upsilon_\iota(0)$ ($\iota=2, \ldots, I$), $\upsilon_\iota(\lambda)$ ($\iota=n(\lambda)+1, \ldots, n(\lambda)+\zeta(\lambda)$) are at least some of the function values $H_S(r, C_2) \in F_q$ ($S=1, \ldots, S_{max}$) or function values of at least some of the function values $H_S(r, C_2) \in F_q$ ($S=1, \ldots, S_{max}$). Formulas (55) and (56) need to be satisfied. For example, if $S_{max} = 3 + \Sigma_{\lambda=1}^{\Psi} n(\lambda)$, $\zeta(\lambda) = 3 \cdot n(\lambda)$ and $I=5$ are set, each of $\upsilon_2(0), \upsilon_4(0), \upsilon_{n(\lambda+1)}(\lambda), \ldots, \upsilon_{3 \cdot n(\lambda)}(\lambda)$ is set to a zero element $0_F$, $\upsilon' = \upsilon_3(0)$ is set, and $\upsilon, \upsilon_3(0), \upsilon_5(0), \upsilon_{3 \cdot n(\lambda)+1}(\lambda), \ldots, \upsilon_{4 \cdot n(\lambda)}(\lambda)$ are set to at least some of $H_1(r, C_2), \ldots, H_{Smax}(r, C_2)$. Here, in terms of security, it is desirable that $\upsilon, \upsilon_3(0), \upsilon_5(0), \upsilon_{3 \cdot n(\lambda)+1}(\lambda), \ldots, \upsilon_{4 \cdot n(\lambda)}(\lambda)$ correspond to at least some of $H_1(r, C_2), \ldots, H_{Smax}(r, C_2)$ on one-to-one basis. In that case, the value of $S_{max}$ is greater than or equal to the number of $\upsilon, \upsilon_3(0), \upsilon_5(0), \upsilon_{3 \cdot n(\lambda)+1}(\lambda), \ldots, \upsilon_{4 \cdot n(\lambda)}(\lambda)$.

$\upsilon, \upsilon_\iota(0)$ ($\iota=2, \ldots, I$), $\upsilon_\iota(\lambda)$ ($\iota=n(\lambda)+1, \ldots, n(\lambda)+\zeta(\lambda)$) that do not correspond to any of the function values $H_S(r, C_2) \in F_q$ ($S=1, \ldots, S_{max}$) are set to constants, for example, selected from the finite field $F_q$. Which of $\upsilon, \upsilon_\iota(0)$ ($\iota=2, \ldots, I$) and $\upsilon_\iota(\lambda)$ ($\iota=n(\lambda)+1, \ldots, n(\lambda)+\zeta(\lambda)$) corresponds to which of $H_1(r, C_2), \ldots, H_{Smax}(r, C_2)$ is predetermined, for example.

The encryption unit 116e generates the following ciphertext $C_1$ including the second information VSET2, $C(0), C(\lambda)$ ($\lambda=1, \ldots, \Psi$) and $C(\Psi+1)$.

$$C_1 = (VSET2, C(0), \{C(\lambda)\}_{(\lambda, w(\lambda) \rightarrow) \in VSET2}, C(\Psi+1)) \tag{88}$$

The ciphertext $C_1$ is stored in the storage 113 (step S27).

Ciphertexts $C_1$ and $C_2$ are input in the combining unit 117. The combining unit 117 generates the bit-combined value of the binary sequence corresponding to the ciphertext $C_1$ and the ciphertext $C_2$ as the ciphertext Code:

$$Code = C_1 | C_2 \tag{89}$$

The decryption device 120 can identify the position of the ciphertext $C_1$ and the position of the ciphertext $C_2$ in the ciphertext Code. For example, the positions of the ciphertexts $C_1$ and $C_2$ in the ciphertext Code may be fixed, or additional information indicating the positions of the ciphertexts $C_1$ and $C_2$ in the ciphertext Code may be added to the ciphertext Code (step S28).

The ciphertext Code is sent to the output unit 112. The output unit 112 outputs the ciphertext Code (step S29). This ends the encryption process.

[Decryption Process]

Figure 9:
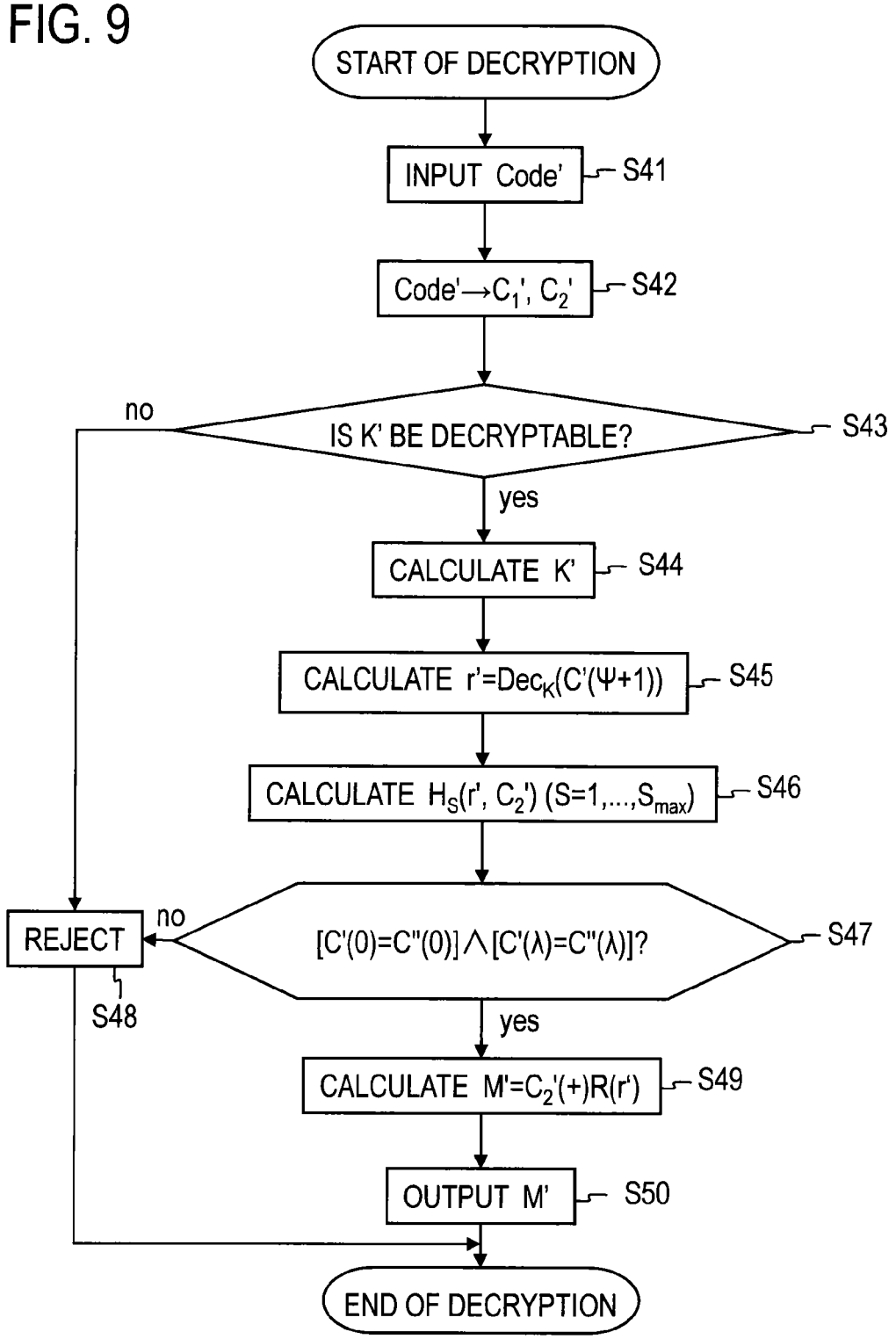
FIG. 9 is a diagram illustrating a decryption process in the embodiment.

As illustrated in FIG. 9, in the decryption process, first a ciphertext Code' is input in the input unit 121 of the decryption device 120 (FIG. 5) and is then stored in the storage 123. The ciphertext Code' may be the ciphertext Code described above, for example (step S41).

The ciphertext Code' is input in the separating unit 127. The separating unit 127 separates the Code' into two, ciphertexts $C_1'$ and $C_2'$ by a predetermined method, and stores the ciphertexts $C_1'$ and $C_2'$ in the storage 123. If the ciphertext Code' is the ciphertext Code, $C_1=C_1'$ and $C_2=C_2'$ (step S42).

Then, the key information SKS and the ciphertext $C_1'$ are input in the common key generating unit 126a. The common key generating unit 126a determines whether or not a common key $K' \in G_T$ can be recovered using the key information SKS and the ciphertext $C_1'$. That is, the common key generating unit 126a uses the first information VSET1={$\lambda$, $v(\lambda)^{\rightarrow} | \lambda=1, \ldots, \Psi$} corresponding to a labeled matrix LMT (MT, LAB), the second information VSET2'={$\lambda$, $w(\lambda)^{\rightarrow} | \lambda=1, \ldots, \Psi$} included in the ciphertext $C_1'$, and the labels LAB($\lambda$) of LMT(MT, LAB) to determine whether or not the inner product $v(\lambda)^{\rightarrow} \cdot w(\lambda)^{\rightarrow}$ of the $n(\lambda)$-dimensional vector $v(\lambda)^{\rightarrow}$ that is each label LAB($\lambda$) of the labeled matrix LMT(MT, LAB) included in the key information SKS and the $n(\lambda)$-dimensional vector $w(\lambda)^{\rightarrow}$ included in VSET2 of the ciphertext C is 0, and uses the results of the determination and each label LAB($\lambda$) of LMT(MT, LAB) to determine whether or not $GV^{\rightarrow} \in \text{span}<MT_{TFV}>$. As described earlier, if $GV^{\rightarrow} \in \text{span}<MT_{TFV}>$, the common key $K' \in G_T$ can be recovered; if not $GV^{\rightarrow} \in \text{span}<MT_{TFV}>$, the common key $K' \in G_T$ cannot be recovered (step S43). An example of the process at step S43 will be described later in detail. If the common key $K' \in G_T$ is determined to be unrecoverable, decryption is rejected (step S48) and the decryption process ends.

On the other hand, if the common key $K' \in G_T$ is determined to be recoverable, the common key generating unit 126a obtains coefficients const($\mu$) that satisfy Formula (45) and calculates the common key $K' \in G_T$ according to Formula (82). The generated common key K' is stored in the storage 123 (step S44).

The ciphertext $C'(\Psi+1)$ included in the ciphertext $C_1'$ and the common key K' are input in the decryption unit 126b. If $C_1=C_1'$, $C(\Psi+1)=C'(\Psi+1)$ holds. The decryption unit 126b uses the common key K' to decrypt the input ciphertext $C'(\Psi+1)$, thereby obtaining the following decrypted value r':

$$r'=\text{Dec}_{K'}(C'(\Psi+1)) \quad (90)$$

The decryption unit 126b stores the decrypted value r' in the storage 123 (step S45).

The decrypted value r' and the ciphertext $C_2'$ are input in the function calculating unit 126c. The function calculating unit 126c inputs the pair of the decrypted value r' and the ciphertext $C_2'$ into each of $S_{max}$ ($S_{max} \geq 1$) collision-resistant functions $H_S$ (S=1, ..., $S_{max}$) to generate function values $H_S(r', C_2')$ (S=1, ..., $S_{max}$). The function values $H_S(r', C_2')$ (S=1, ..., $S_{max}$) are stored in the storage 123 (step S46).

Then at least some of the function values $H_S(r', C_2') \in F_q$ (S=1, ..., $S_{max}$), and the second information VSET2' included in the ciphertext $C_1'$, and ciphertexts C'(0), $\{C'(\lambda)\}_{(\lambda, w(\lambda)^{\rightarrow}) \in VSET2'}$ are input in the determination unit 126d. The determination unit 126d uses the $n(\lambda)$-dimensional vectors $w(\lambda)^{\rightarrow}$ included in the second information VSET2' and at least some of the function values $H_S(r', C_2')$ to generate the following ciphertexts C''(0), C''($\lambda$) ($\lambda=1, \ldots, \Psi$):

$$C''(0)=\upsilon'' \cdot b_1(0)+\Sigma_{\iota=2}^I \upsilon_\iota''(0) \cdot b_\iota(0) \quad (91)$$

$$C''(\lambda)=\upsilon'' \cdot \Sigma \iota=1^{n(\lambda)} w_\iota(\lambda) \cdot b_\iota(\lambda)+\Sigma_{\iota=n(\lambda)+1}^{n(\lambda)+\zeta(\lambda)} \upsilon_\iota''(\lambda) \cdot b_\iota(\lambda) \quad (92)$$

The method for generating the ciphertexts C''(0) and C''($\lambda$) ($\lambda=1, \ldots, \Psi$) is the same as the method for generating the ciphertexts C(0) and C($\lambda$) ($\lambda=1, \ldots, \Psi$) at step S27, except that the second information VSET2 is replaced with the second information VSET2', the function values $H_S(r, C_2)$ are replaced with the function values $H_S(r', C_2')$, and $\upsilon$, $\upsilon_\iota(0)$ ($\iota=2, \ldots, I$), $\upsilon_\iota(\lambda)$ ($\iota=n(\lambda)+1, \ldots, n(\lambda)+\zeta(\lambda)$) are replaced with $\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$). That is, the determination unit 126d sets the values corresponding to at least some of the function values $H_S(r', C_2') \in F_q$ (S=1, ..., $S_{max}$) as at least some of the function values $\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$) according to the predetermined criterion, and generates C''(0) and C''($\lambda$) ($\lambda=1, \ldots, \Psi$) according to Formulas (91) and (92). For example, at least some of $\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$) are at least some of the function values $H_S(r', C_2') \in F_q$ (S=1, ..., $S_{max}$) or function values of at least some of the function values $H_S(r', C_2') \in F_{q (S=1, \ldots, S_{max})}$. Also, Formulas (55) and (56) in which $\upsilon_\iota(0)$ and $\upsilon_\iota(\lambda)$ are replaced with $\upsilon_\iota''(0)$ and $\upsilon_\iota''(\lambda)$ need to be satisfied. For example, if $S_{max}=3+\Sigma_{\lambda=1}^\Psi n(\lambda)$, $\zeta(\lambda)=3 \cdot n(\lambda)$ and I=5 are set, each of $\iota_2''(0)$, $\iota_4''(0)$, $\upsilon_{n(\lambda)+1}''(\lambda), \ldots, \upsilon_{3 \cdot n(\lambda)}''(\lambda)$ is set to zero elements $0_F$, and $\upsilon''$, $\upsilon_3''(0)$, $\upsilon_5''(0)$, $\upsilon_{3 \cdot n(\lambda)+1}''(\lambda), \ldots, \upsilon_{4 \cdot n(\lambda)}''(\lambda)$ are set to at least some of $H_1(r', C_2'), \ldots, H_{Smax}(r', C_2')$. For example, $\upsilon''$, $\upsilon_3''(0)$, $\upsilon_5''(0)$, $\upsilon_{3 \cdot n(\lambda)+1}''(\lambda), \ldots, \upsilon_{4 \cdot n(\lambda)}''(\lambda)$ correspond to at least some of $H_1(r', C_2'), \ldots, H_{Smax}(r', C_2')$ on a one-to-one basis. In that case, the value of $S_{max}$ is greater than or equal to the number of $\upsilon''$, $\upsilon_3''(0)$, $\upsilon_5''(0)$, $\upsilon_{3 \cdot n(\lambda)+1}''(\lambda), \ldots, \upsilon_{4 \cdot n(\lambda)}''(\lambda)$.

$\upsilon''$, $\upsilon_\iota''(0)$ ($\iota=2, \ldots, I$), $\upsilon_\iota''(\lambda)$ ($\iota=n(\lambda)+1, \ldots, n(\lambda)+\zeta(\lambda)$) that do not correspond to any of the function values $H_S(r', C_2') \in F_q$ (S=1, ..., $S_{max}$) are set to the constants selected from the finite field $F_q$ (the same constants as that used at step S27), for example. Which of $\upsilon''$, $\upsilon_\iota''(0)$ ($\upsilon=2, \ldots, I$), $\upsilon_\iota''(\lambda)$ ($\iota=n(\lambda)+1, \ldots, n(\lambda)+\zeta(\lambda)$) corresponds to which of $H_1(r', C_2'), \ldots, H_{Smax}(r', C_2')$ is predetermined according to the same criterion used at step S27.

The determination unit 126d determines whether all of the following are satisfied or not (step S47).

$$C'(0)=C''(0) \quad (93)$$

$$C'(\lambda)=C''(\lambda)(\lambda=1, \ldots, \Psi) \quad (94)$$

Here, if at least one of Formulas (93) and (94) is not satisfied, decryption is rejected (step S48) and the decryption process ends.

On the other hand, if all of Formulas (93) and (94) are satisfied, the ciphertext $C_2'$, which is the binary sequence, and the decrypted value r' are input in the decryption unit 126e. The decryption unit 126e generates the decrypted value M' which is the exclusive OR of the function value R(r'), which is the binary sequence obtained by applying the injective function R to the decrypted value r', and the ciphertext $C_2'$ (step S49).

$$M'=C_2'(+)R(r') \quad (95)$$

The decrypted value M' is sent to the output unit 122 and the output unit 122 outputs the decrypted value M' (step S50). This ends the decryption process.

[Specific Example of Process at Step S43]

A specific example of the operation at step S43 will be described below. For simplicity, the COL-dimensional vector $GV^{\rightarrow}$ in Formula (38) is used in the description of the example. However, this does not limit the present invention; the process described below may be extended and applied to the case where a generalized COL-dimensional vector $GV^{\rightarrow}$ as in Formula (36) is used.

Figure 10:
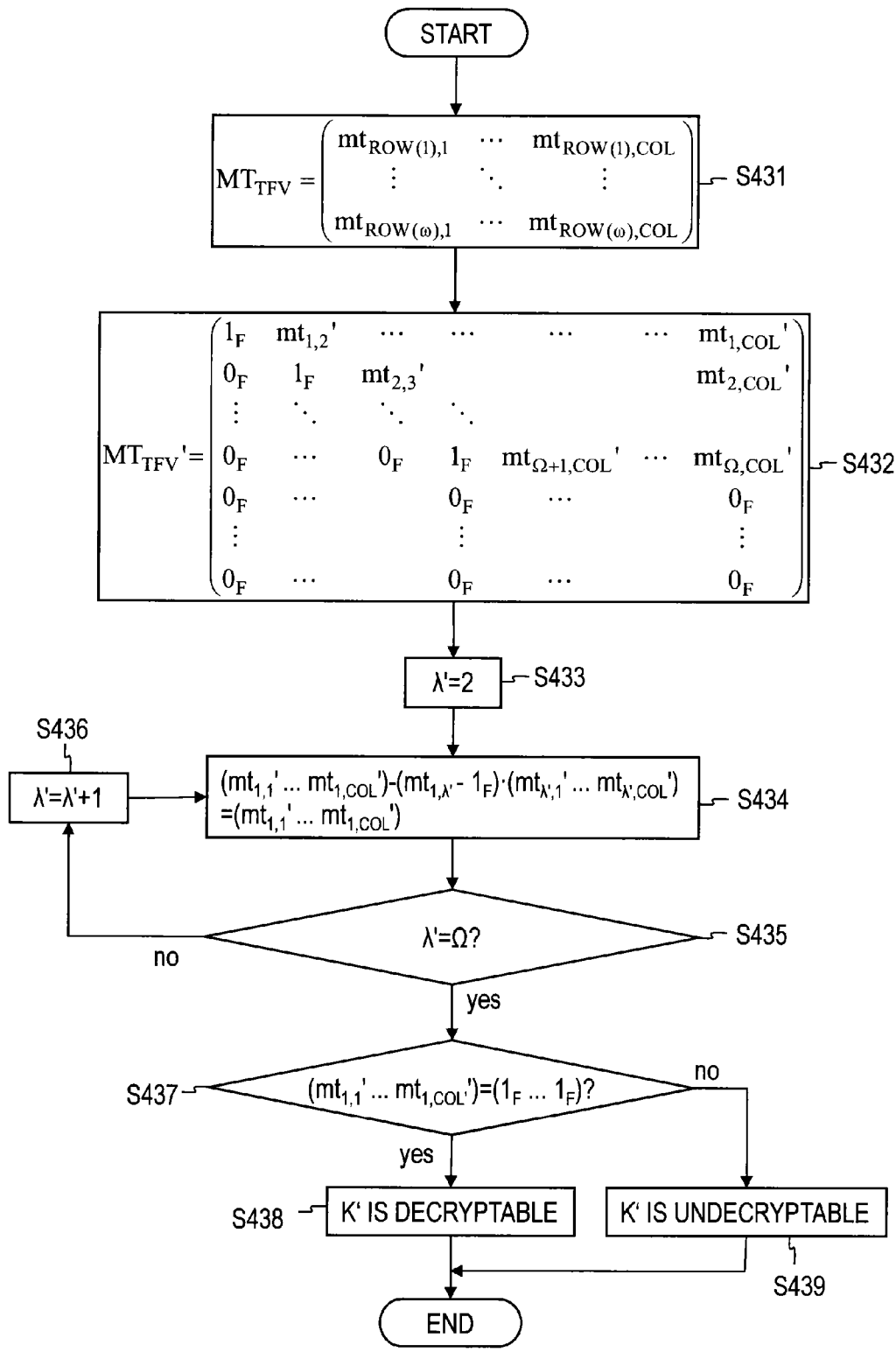
FIG. 10 is a diagram illustrating a process at step 43 of FIG. 9.

As illustrated in FIG. 10, the common key generating unit 126a uses the first information $VSET1=\{\lambda, v(\lambda)^{\rightarrow}|=1, \ldots, \Psi\}$ corresponding to the labeled matrix LMT(MT, LAB) and the second information $VSET2'=\{\{\lambda, w(\lambda)^{\rightarrow}|\lambda=1, \ldots, \Psi\}$ included in the ciphertext $C_1'$, and the labels $LAB(\lambda)$ of LMT(MT, LAB) to generate the partial matrices $MT_{TFV}$ illustrated in Formulas (41) to (44). Here, $MT_{TFV}$ can be expressed as:

$$MT_{TFV} = \begin{pmatrix} mt_{ROW(1),1} & \cdots & mt_{ROW(1),COL} \\ \vdots & \ddots & \vdots \\ mt_{ROW(\omega),1} & \cdots & mt_{ROW(\omega),COL} \end{pmatrix} \quad (96)$$

where $MT_{TFV}$ in Formula (96) is a matrix of $\omega$ rows and COL columns, $\omega$ is an integer greater than or equal to 1, and $ROW(1), \ldots, ROW(\omega)$ are row numbers $ROW(1), \ldots, ROW(\omega) \in SET$ of the matrix MT (Formula (34)) in which $LIT(ROW(1))=1, \ldots, LIT(ROW(\omega))=1$ (step S431).

Then, the common key generating unit 126a performs calculations for each row vector $mt_{\lambda'}^{\rightarrow}=(mt_{\lambda',1}, \ldots mt_{\lambda',COL})$ ($\lambda'=ROW(1), \ldots, ROW(\omega)$) of $MT_{TFV}$ and calculations between row vectors $mt_{\lambda'}^{\rightarrow}$ of $MT_{TFV}$ to generate an upper triangular matrix $MT_{TFV}'$, where a submatrix from the first row and column to the $\Omega$-th row and column is an $\Omega \times \Omega$ upper triangular matrix in which diagonal elements are a multiplicative identity $1_F$ and, all of the elements of the $\Omega+1$ and subsequent row vectors $mt_{\lambda'}^{\rightarrow}$, if any, are the additive identity $0_F$. Here, $\omega$ is an integer greater than or equal to 1 and less than or equal to the number of rows and the number of columns of the submatrix $MT_{TFV}$. $MT_{TFV}'$ may be for example:

$$MT'_{TFV} = \begin{pmatrix} 1_F & mt'_{1,2} & \cdots & \cdots & \cdots & mt'_{1,COL} \\ 0_F & 1_F & mt'_{2,3} & & & mt'_{2,COL} \\ \vdots & \ddots & \ddots & \ddots & & \\ 0_F & \cdots & 0_F & 1_F & mt'_{\Omega+1 COL} & \cdots & mt'_{\Omega,COL} \\ 0_F & \cdots & & 0_F & \cdots & & 0_F \\ \vdots & & & \vdots & & & \vdots \\ 0_F & \cdots & & 0_F & \cdots & & 0_F \end{pmatrix} \quad (97)$$

However, there may not be the elements of the $\Omega+1$-th or more rows and there may not be the elements of the $\Omega+1$-th or more columns.

The upper triangular matrix $MT_{TFV}'$ as given above can be generated by using Gaussian elimination, for example. For example, first the row vector $mt_1^{\rightarrow}=(mt_{1,1}, \ldots, mt_{1,COL})$ of the first row of the submatrix $MT_{TFV}$ is divided by $mt_{1,1}$ and the result is set as the first row vector of $MT_{TFV}'$. Then, the first row vector of $MT_{TFV}'$ multiplied by $mt_{2,1}$ is subtracted from the second row vector $m_2^{\rightarrow}=(mt_{2,1}, \ldots, mt_{2,COL})$ of the submatrix $MT_{TFV}$ to generate a row vector $(0_F, mt_{2,2}'', \ldots, mt_{2,COL}'')$, which is then divided by $mt_{2,2}''$ and the result is set as the second row vector of $MT_{TFV}'$. In this way, each previously generated row vector of $MT_{TFV}'$ can be transformed to a row vector of a greater row number to generate an upper triangular matrix $MT_{TFV}'$. The operations for generating the upper triangular matrix $MT_{TFV}'$ are unary operations on row vectors and binary operations between row vectors and different operations cannot be performed on different elements in the same row vector. When the modulus for division reaches the additive identity $0_F$, a new row vector to be transformed is selected. If the submatrix $M_{TFV}$ includes multiple row vectors that are not linearly independent of each other (that is, linearly dependent multiple row vectors), one vector that is representative of those row vectors is the row vector containing the elements of the $\Omega \times \Omega$ upper triangular matrix and the other row vectors are row vectors that consist only of the additive identity $0_F$ (step S432).

Then the common key generating unit 126a sets $\lambda'=2$ (step S433). The common key generating unit 126a sets the following vector in Formula (98) as new $(mt_{1,1}' \ldots mt_{1,COL}')$ to update the row vector $(mt_{1,1}' \ldots mt_{1,COL}')$ of the first row of the upper triangular matrix $MT_{TFV}'$.

$$(mt_{1,1}' \ldots mt_{1,COL}')-(mt_{1,\lambda'}-1_F)\cdot(mt_{\lambda',1}' \ldots mt_{\lambda',COL}') \quad (98)$$

p Here, $(mt_{\lambda',1}' \ldots mt_{\lambda', COL}')$ represents the row vector of the $\lambda'$th row of the upper triangular matrix $MT_{TFV}'$.

The common key generating unit 126a determines whether or not $\lambda'=\Omega$ (step S435). If not $\lambda'\Omega$, the common key generating unit 126a sets $\lambda'+1$ as new $\lambda'$ (step S436) and then returns to step S434. On the other hand, if $\lambda'=\Omega$, the common key generating unit 126a determines whether or not the following formula is satisfied (step S437).

$$(mt_{1,1}' \ldots mt_{1,COL}')=(1_F, \ldots, 1_F) \quad (99)$$

If Formula (99) is satisfied, the common key generating unit 126a determines that K' is decryptable (step S438); otherwise, the common key generating unit 126a determines that K' is not decryptable (step S439).

All the specifics of the operations for generating the upper triangular matrix $MT_{TFV}'$ at step S432 and all the specifics of the operations at step S434 are stored in a storage 123. If K' is determined to be decryptable (step S438), all of the operations for generating the upper triangular matrix $MT_{TFV}'$ and all of the operations at step S434 are applied to a matrix including the elements of the submatrix $MT_{TFV}$ as its indeterminates. A column vector of the first row of a matrix obtained as a result is the linear sum of column vectors $ind_{\lambda'}^{\rightarrow}=ind_{\lambda', 1}, \ldots, ind_{\lambda'}, COL)$ ($\lambda'=ROW(1), \ldots, ROW(\omega) \in SET$) of a matrix $IND_{TFV}$ including the elements of the submatrix $MT_{TFV}$ as its indeterminates, that is, the sum of products of row vectors $ind_{\lambda'}^{\rightarrow}$ and a coefficient $const(\lambda')$ corresponding to the column vectors.

$$const(ROW(1))\cdot ind_{ROW(1)}^{\rightarrow}+ \quad \cdots \quad +const(ROW(\omega))\cdot ind_{ROW(\omega)}^{\rightarrow}$$

The coefficient $const(\mu)$ corresponding to a column vector $ind_{\mu}^{\rightarrow}$ in the $\mu$-th row ($\mu \in SET$) of the matrix $IND_{TFV}$ is the coefficient $const(\mu)$ that satisfies Formula (45) (see the relationships in Formulas (37) and (39)).

[Variations]

The present invention is not limited to the embodiments described above. For example, while determination is made at step S47 as to whether or not both of Formulas (93) and (94) are satisfied, determination at step S47 may be as to whether or not the combination of $C'(0)$ and $C'(\lambda)$ ($\lambda=1, \ldots, \Psi$) matches the combination of $C''(0)$ and $C''(\lambda)(\lambda=1, \ldots, \Psi)$. Alternatively, determination may be made as to whether one function value corresponding to $C'(0)$ and $C'(\lambda)$ ($\lambda=1, \ldots, \Psi$) matches one function value corresponding to $C''(0)$ and $C''(\lambda)$ ($\lambda=1, \ldots, \Psi$). Alternatively, determination may be made with a function that outputs a first value when both of Formulas (93) and (94) are satisfied and outputs a second value when at least one of Formulas (93) and (94) is not satisfied.

When decryption is rejected at step S48, the decryption device 120 may output error information or a random number unrelated to decryption or may output nothing.

The operations defined on the finite field $F_q$ described above may be replaced with operations defined on a finite ring $Z_q$ of order q. One exemplary way to replace operations defined on a finite filed $F_q$ with operations defined on a finite ring $Z_q$ is to allow the order q that is not a prime or a power of a prime.

Terms in Formulas (46), (48) to (51) and (53) to (56) and other operations that are multiplied by an additive identity are the identities of the cyclic groups $G_1$ or $G_2$. Operations on the terms that are multiplied by an additive identity may or may not be performed.

The processes described above can be performed not only in the chronological order presented herein but also may be performed in parallel or separately depending on the processing capacity of the devices that perform the processes or as necessary. It would be understood that other modifications can be made as appropriate without departing from the spirit of the present invention.

If the configuration of any of the embodiments described above are implemented by a computer, processes of functions that the devices need to include are described by a program. The processes of the functions are implemented on a computer by executing the program on the computer.

The program describing the processes can be recorded on a computer-readable recording medium. The computer-readable recording medium may be any recording medium such as a magnetic recording device, an optical disc, a magneto-optical recording medium, or a semiconductor memory, for example.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the storage device of the computer and executes the processes according to the read program. In another execution mode of the program, the computer may read the program directly from the portable recording medium and execute the processes according to the program or the computer may execute the processes according to received program each time the program is transferred from the server computer to the computer. Alternatively, the processes may be executed using a so-called ASP (Application Service Provider) service in which the program is not transferred from a server to the computer but process functions are implemented by instructions to execute the program and acquisition of the results of the execution.

DESCRIPTION OF REFERENCE NUMERALS

1 . . . Encryption system
110 . . . Encryption device
120 . . . Decryption device

What is claimed is:

1. An encryption device comprising:
a random number generating unit that generates a random number r;
a first encryption unit that generates a ciphertext $C_2$, the ciphertext $C_2$ being an exclusive OR of a binary sequence dependent on the random number r and a plaintext M, the plaintext M being a binary sequence;
a function calculating unit that generates $S_{max}$ function values $H_S(r, C_2)$, where $S=1, \ldots, S_{max}$ and $S_{max} \geq 1$, each of the function values $H_S(r, C_2)$ being obtained by inputting a pair of the random number r and the ciphertext $C_2$ in each of collision-resistant functions $H_S$;
a common key generating unit that generates a common key K, the common key being an element of a cyclic group $G_T$;
a second encryption unit that encrypts the random number r by common key encryption using the common key K to generate ciphertext $C(\Psi+1)$; and
a third encryption unit that generates a ciphertext $C_1$ including $C(0) = \upsilon \cdot b_1(0) + \Sigma_{\iota=2}^{I} \upsilon_\iota(0) \cdot b_\iota(0)$, $C(\lambda) = \upsilon \cdot \Sigma_{\kappa=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota(\lambda) \cdot b_\iota(\lambda)$ and the ciphertext $C(\Psi+1)$;
wherein $\Psi$ is an integer greater than or equal to 1, $\phi$ is an integer greater than or equal to 0 and less than or equal to $\Psi$, $n(\phi)$ is an integer greater than or equal to 1, $\zeta(\phi)$ is an integer greater than or equal to 0, $\lambda$ is an integer greater than or equal to 1 and less than or equal to $\Psi$, I is a constant greater than or equal to 2 and less than or equal to $n(0)+\zeta(0)$, $e_\phi$ is a nondegenerate bilinear map that outputs one element of the cyclic group $G_T$ in response to input of $n(\phi)+\zeta(\phi)$ elements $\gamma_\beta$ ($\beta=1, \ldots, n(\phi)+\zeta(\phi)$) of a cyclic group $G_1$ and $n(\phi)+\zeta(\phi)$ elements $\gamma_\beta^*$ ($\beta=1, \ldots, n(\phi)+\zeta(\phi)$) of a cyclic group $G_2$, i is an integer greater than or equal to 1 and less than or equal to $n(\phi)+\zeta(\phi)$, $b_i(\phi)$ are $n(\phi)+\zeta(\phi)$-dimensional basis vectors each consisting of $n(\phi)+\zeta(\phi)$ elements of the cyclic group $G_1$, $b_i^*(\phi)$ are $n(\phi)+\zeta(\phi)$-dimensional basis vectors each consisting of $n(\phi)+\zeta(\phi)$ elements of the cyclic group $G_2$, $\delta(i, j)$ is a Kronecker delta function, $e_\phi(b_i(\phi), b_j^*(\phi)) = g_T^{\tau \cdot \tau' \cdot \delta(i,j)}$ is satisfied for a generator $g_T$ of the cyclic group $G_T$ and constants $\tau$ and $\tau'$, $w(\lambda)^{\rightarrow} = (w_1(\lambda), \ldots, w_{n(\lambda)}(\lambda))$ are $n(\lambda)$-dimensional vectors each consisting of $w_1(\lambda), \ldots, w_n(\lambda)(\lambda)$, and at least some of the values of $\upsilon, \upsilon_2(0), \ldots, \upsilon_I(0), \upsilon_{n(\lambda)+1}(\lambda), \ldots, \upsilon_{n(\lambda)+\zeta(\lambda)}(\lambda)$ correspond to at least some of the function values $H_S(r, C_2)$.

2. The encryption device according to claim 1, wherein the binary sequence dependent on the random number r is a function value obtained by applying a random function to the random number r.

3. The encryption device according to claim 1, wherein at least some of the collision-resistant functions $H_S$ are random functions.

4. The encryption device according to claim 2, wherein at least some of the collision-resistant functions $H_S$ are random functions.

5. The encryption device according to any one of claims 1 to 4, wherein:
the constants $\tau$ and $\tau'$, the elements $w_1(\lambda), \ldots, w_{n(\lambda)}(\lambda)$, the function values $H_S(r, C_2)$ and $\upsilon, \upsilon_2(0), \ldots, \upsilon_I(0), \upsilon_{n(\lambda)+1}(\lambda), \ldots, \upsilon_{n(\lambda)+\zeta(\lambda)}(\lambda)$ are elements of a finite field $F_q$; and
each order of the cyclic groups $G_1$ and $G_2$ is equal to order q ($q \geq 1$) of the finite field $F_q$.

6. The encryption device according to any one of claims 1 to 4, wherein $\zeta(\lambda)=3 \cdot n(\lambda)$, $I=5$, $S_{max}=3+\Sigma_{\lambda=1}^{\Psi} n(\lambda)$, $\upsilon_2(0), \upsilon_4(0), \upsilon_{n(\lambda)+1}(\lambda), \ldots, \upsilon_{3 \cdot n(\lambda)}(\lambda)$ are zero elements, $K=g_T^{\tau \cdot \tau' \cdot \upsilon'} \in G_T$, $\upsilon'=\upsilon_3(0)$, and $\upsilon, \upsilon_3(0), \upsilon_5(0), \upsilon_{3 \cdot n(\lambda)+1}(\lambda), \ldots, \upsilon_{4 \cdot n(\lambda)}(\lambda)$ are at least some of $H_1(r, C_2), \ldots, H_{Smax}(r, C_2)$.

7. The encryption device according to claim 6, wherein:
the constants $\tau$ and $\tau'$, the elements $w_1(\lambda), \ldots, w_{n(\lambda)}(\lambda)$, the function values $H_S(r, C_2)$ and $\upsilon, \upsilon_2(0), \ldots, \upsilon_I(0), \upsilon_{n(\lambda)+1}(\lambda), \ldots, \upsilon_{n(\lambda)+\zeta(\lambda)}(\lambda)$ are elements of a finite filed $F_q$; and
each order of the cyclic groups $G_1$ and $G_2$ is equal to order q ($q \geq 1$) of the finite field $F_q$.

8. A decryption device comprising:
a common key generating unit that when constants $\text{const}(\mu)$ that satisfy $SE=\tau_{\mu\in SET}\,\text{const}(\lambda)\cdot\text{share}(\lambda)$ ($\lambda\in ET$) exist, generates a common key $$K' = e_0(C'(0), D^*(0))\cdot \prod_{\mu\in SET\wedge LAB(\mu)=v(\mu)^\rightarrow} e_\mu(C'(\mu), D^*(\mu))^{\text{const}(\mu)} \cdot$$
$$\prod_{\mu\in SET\wedge LAB(\mu)=\neg v(\mu)^\rightarrow} e_\mu(C'(\mu), D^*(\mu))^{\text{const}(\mu)/(v(\mu)^\rightarrow\cdot w(\mu)^\rightarrow)}$$

by using first key information $D^*(0)$, second key information $D^*(\lambda)$ and input ciphertexts $C'(0)$ and $C'(\lambda)$;
a first decryption unit that decrypts an input ciphertext $c'(\Psi+1)$ by using the common key $K'$ to generate a decrypted value $r'$;
a function calculating unit that generates $S_{max}$ function values $H_S(r', C_2')$, where $S=1,\ldots,S_{max}$ and $S_{max}\geq 1$, each of the function values $H_S(r', C_2')$ being obtained by inputting a pair of the decrypted value $r'$ and an input ciphertext $C_2'$ into each of collision-resistant functions $H_S$; and
a determination unit that rejects decryption if the ciphertexts $C'(0)$ and $C'(\lambda)$ do not match ciphertexts $C''(0)=\upsilon''\cdot b_1(0)+\Sigma_{\iota=2}^I \upsilon_\iota''(0)\cdot b_\iota(0)$ and $C''(\lambda)=\upsilon''\cdot\Sigma_{\iota=1}^{n(\lambda)} w_\iota(\lambda)\cdot b_\iota(\lambda)+\Sigma_{\iota=n(\lambda)+1}^{n(\lambda)+\zeta(\lambda)}\upsilon_\iota''(\lambda)\cdot b_\iota(\lambda)$;
wherein the values of at least some of $\upsilon''$, $\upsilon_2''(0),\ldots,\upsilon_I''(0)$, $\upsilon_{n(\lambda)+1}''(\lambda),\ldots,\upsilon_{n(\lambda)+\zeta(\lambda)}''(\lambda)$ correspond to at least some of the function values $H_S(r', C_2')$; and
$\Psi$ is an integer greater than or equal to 1, $\phi$ is an integer greater than or equal to 0 and less than or equal to $\Psi$, $\zeta(\phi)$ is an integer greater than or equal to 0, $\lambda$ is an integer greater than or equal to 1 and less than or equal to $\Psi$, $n(\phi)$ is an integer greater than or equal to 1, $I$ is a constant greater than or equal to 2 and less than or equal to $n(0)+\zeta(0)$, $e_\phi$ is a nondegenerate bilinear map that outputs one element of a cyclic group $G_T$ in response to input of $n(\phi)+\zeta(\phi)$ elements $\gamma_\beta$ of a cyclic group $G_1$ and $n(\phi)+\zeta(\phi)$ elements $\gamma_\beta^*$ of a cyclic group $G_2$, $\beta=1,\ldots,n(\phi)+\zeta(\phi)$, $i$ is an integer greater than or equal to 1 and less than or equal to $n(\phi)+\zeta(\phi)$, $b_i(\phi)$ are $n(\phi)+\zeta(\phi)$-dimensional basis vectors each consisting of $n(\phi)+\zeta(\phi)$ elements of the cyclic group $G_1$, $b_i^*(\phi)$ are $n(\phi)+\zeta(\phi)$-dimensional basis vectors each consisting of $n(\phi)+\zeta(\phi)$ elements of the cyclic group $G_2$, $\delta(i,j)$ is a Kronecker delta function, $e_\phi(b_i(\phi), b_j^*(\phi))=g_T^{\tau\cdot\tau'\cdot\delta(i,j)}$ is satisfied for a generator $g_T$ of the cyclic group $G_T$ and constants $\tau$ and $\tau'$, $v(\lambda)^\rightarrow=(v_1(\lambda),\ldots,v_{n(\lambda)}(\lambda))$ are $n(\lambda)$-dimensional vector each consisting of $v_1(\lambda),\ldots,v_{n(\lambda)}(\lambda)$, $w(\lambda)^\rightarrow=(w_1(\lambda),\ldots,w_{n(\lambda)}(\lambda))$ are $n(\lambda)$-dimensional vectors each consisting of $w_1(\lambda),\ldots,w_{n(\lambda)}(\lambda)$, labels $LAB(\lambda)$ where $\lambda=1,\ldots,\Psi$, are pieces of information each representing the $n(\lambda)$-dimensional vector $v(\lambda)^\rightarrow$ or the negation $\neg v(\lambda)^\rightarrow$ of the $n(\lambda)$-dimensional vector $v(\lambda)^\rightarrow$, $LAB(\lambda)=v(\lambda)^\rightarrow$ means that $LAB(\lambda)$ represents the $n(\lambda)$-dimensional vector $v(\lambda)^\rightarrow$, $LAB(\lambda)=\neg v(\lambda)^\rightarrow$ means that $LAB(\lambda)$ represents the negation $\neg v(\lambda)^\rightarrow$ of the $n(\lambda)$-dimensional vector $v(\lambda)^\rightarrow$, $\text{share}(\lambda)$, where $\lambda=1,\ldots,\Psi$, represents share information obtained by secret-sharing of secret information $SE$, the first key information is $D^*(0)=-SE\cdot b_1^*(0)+\Sigma_{\iota=2}^I \text{coef}_\iota(0)\cdot b_\iota^*(0)$, the second key information for $\lambda$ that satisfies $LAB(\lambda)=v(\lambda)^\rightarrow$ is $D^*(\lambda)=(\text{share}(\lambda)+\text{coef}(\lambda)\cdot v_1(\lambda))\cdot b_1^*(\lambda)+\Sigma_{\iota=2}^{n(\lambda)}\text{coef}(\lambda)\cdot v_\iota(\lambda)\cdot b_\iota^*(\lambda)+\Sigma_{\iota=n(\lambda)+1}^{n(\lambda)+\zeta(\lambda)}\text{coef}_\iota(\lambda)\cdot b_\iota^*(\lambda)$, the second information for $\lambda$ that satisfies $LAB(\lambda)=\neg v(\lambda)^\rightarrow$ is $D^*(\lambda)=\text{share}(\lambda)\cdot\Sigma_{\iota=1}^{n(\lambda)} v_\iota(\lambda)\cdot b_\iota^*(\lambda)+\Sigma_{\iota=n(\lambda)+1}^{n(\lambda)+\zeta(\lambda)}\text{coef}_\iota(\lambda)\cdot b^*(\lambda)$, and SET represents a set of $\lambda$ that satisfies $\{LAB(\lambda)=v(\lambda)^\rightarrow\}^\wedge\{v(\lambda)^\rightarrow=0\}$ or $\{LAB(\lambda)=\neg v(\lambda)^\rightarrow\}\wedge\{v(\lambda)^\rightarrow\cdot w(\lambda)^\rightarrow\neq 0\}$.

9. The decryption device according to claim 8, wherein at least some of the collision-resistant functions $H_S$ are random functions.

10. The decryption device according to claim 9, wherein:
the elements $v_1(\lambda),\ldots,v_{n(\lambda)}(\lambda)$, the elements $w_1(\lambda),\ldots,w_{n(\lambda)}(\lambda)$, the function values $H_S(r', C_2')$ and $\upsilon''$, $\upsilon_2''(0),\ldots,\upsilon_I''(0),\upsilon n(\lambda)+1''(\lambda),\ldots,\upsilon_{n(\lambda)+\zeta(\lambda)}''(\lambda)$ are elements of a finite field $F_q$; and
each order of the cyclic groups $G_1$ and $G_2$ is equal to order $q$ ($q\geq 1$) of the finite field $F_q$.

11. The decryption device according to claim 8, wherein:
the elements $v_1(\lambda),\ldots,v_{n(\lambda)}(\lambda)$, the elements $w_1(\lambda),\ldots,w_{n(\lambda)}(\lambda)$, the function values $H_S(r', C_2')$ and $\upsilon''$, $\upsilon_2''(0),\ldots,\upsilon_I''(0),\ldots,\upsilon_{n(\lambda)+\zeta(\lambda)}''(\lambda)$ are elements of a finite field $F_q$; and
each order of the cyclic groups $G_1$ and $G_2$ is equal to order $q$ ($q\geq 1$) of the finite field $F_q$.

12. The decryption device according to any one of claims 8 to 11, wherein $\zeta(\lambda)=3\cdot n(\lambda)$, $I=5$, $S_{max}=3+\Sigma_{\lambda=1}^\Psi n(\lambda)$, $\upsilon_2''(0)$, $\upsilon_4''(0)$, $\upsilon_{n(\lambda)+1}''(\lambda)$, $\upsilon_{3\cdot n(\lambda)}''(\lambda)$ are zero elements, $K'=g_T^{\tau\cdot\tau'\cdot\upsilon'''}\in G_T$, $\upsilon'''=\upsilon_3''(0)$, $\upsilon''$, $\upsilon_3''(0)$, $\upsilon_5''(0)$, $\upsilon_{3\cdot n(\lambda)+1}''(\lambda),\ldots,v_{4\cdot n(\lambda)}''(\lambda)$ are at least some of $H_1(r', C_2'), H_{Smax}(r', C_2')$, the first key information is $D^*(0)=-SE\cdot b_1^*(0)+b_3^*(0)+\text{coef}_4(0)\cdot b_4^*(0)$, the second key information for $\lambda$ that satisfies $LAB(\lambda)=v(\lambda)^\rightarrow$ is $D^*(\lambda)=(\text{share}(\lambda)+\text{coef}(\lambda)\cdot v_1(\lambda))\cdot b_1^*(\lambda)+\Sigma_{\iota=2}^{n(\lambda)}\text{coef}(\lambda)\cdot v_\iota(\lambda)\cdot b_\iota^*(\lambda)+\Sigma_{\iota=2\cdot n(\lambda)+1}^{3\cdot n(\lambda)}\text{coef}_\iota(\lambda)\cdot b_\iota^*(\lambda)$, and the second key information for $\lambda$ that satisfies $LAB(\lambda)=\neg v(\lambda)^\rightarrow$ is $D^*(\lambda)=\text{share}(\lambda)\cdot\Sigma_{\iota=1}^{n(\lambda)} v_\iota(\lambda)\cdot b_\iota^*(\lambda)+\Sigma_{\iota=2\cdot n(\lambda)+1}^{3\cdot n(\lambda)}\text{coef}_\iota(\lambda)\cdot b_\iota^*(\lambda)$.

13. The decryption device according to claim 12, wherein the binary sequence dependent on the decrypted value $r'$ is a function value obtained by applying a random function to the decrypted value $r'$.

14. The decryption device according to any one of claims 8 to 11, further comprising a second decryption unit that generates a decrypted value $M'$ when the ciphertexts $C'(0)$ and $C'(\lambda)$ match ciphertexts $C''(0)=\upsilon''\cdot b_1(0)+\Sigma_{\iota=2}^I \upsilon_\iota''(0)\cdot b_\iota(0)$ and $C''(\lambda)=\upsilon''\cdot\Sigma_{\iota=1}^{n(\lambda)} w_\iota(\lambda)\cdot b_\iota(\lambda)+\Sigma_{\iota=n(\lambda)+1}^{n(\lambda)+\zeta(\lambda)}v_\iota''(\lambda)\cdot b_\iota(\lambda)$, the decrypted value $M'$ being an exclusive OR of a binary sequence dependent on the decrypted value $r'$ and a binary sequence which is an input ciphertext $C_2'$.

15. The decryption device according to claim 14, wherein $\zeta(\lambda)=3\cdot n(\lambda)$, $I=5$, $S_{max}=3+\Sigma_{\lambda=1}^\Psi n(\lambda)$, $\upsilon_2''(0)$, $\upsilon_4''(0)$, $\upsilon_{n(\lambda)+1}''(\lambda)$, $\upsilon_{3\cdot n(\lambda)}''(\lambda)$ are zero elements, $K'=g_T^{\tau\cdot\tau'\cdot\upsilon'''}\in G_T$, $\upsilon'''=\upsilon_3''(0)$, $\upsilon_5''(0)$, $\upsilon_{3\cdot n(\lambda)+1}''(\lambda),\ldots,\upsilon_{4\cdot n(\lambda)}''(\lambda)$ are at least some of $H_1(r', C_2'),\ldots,H_{Smax}(r', C_2')$, the first key information is $D^*(0)=-SE\cdot b_1^*(0)+b_3^*(0)+\text{coef}_4(0)\cdot b_4^*(0)$, the second key information for $\lambda$ that satisfies $LAB(\lambda)=v(\lambda)^\rightarrow$ is $D^*(\lambda)=(\text{share}(\lambda)+\text{coef}(\lambda)\cdot v_1(\lambda))\cdot b_1^*(\lambda)+\Sigma_{\iota=2}^{n(\lambda)}\text{coef}(\lambda)\cdot v_\iota(\lambda)\cdot b_\iota^*(\lambda)+\Sigma_{\iota=2\cdot n(\lambda)+1}^{3\cdot n(\lambda)}\text{coef}_\iota(\lambda)\cdot b_\iota^*(\lambda)$, and the second key information for $\lambda$ that satisfies $LAB(\lambda)=\neg v(\lambda)^\rightarrow$ is $D^*(\lambda)=\text{share}(\lambda)\cdot\Sigma_{\iota=1}^{n(\lambda)} v_\iota(\lambda)\cdot b_\iota^*(\lambda)+\Sigma_{\iota=2\cdot n(\lambda)+1}^{3\cdot n(\lambda)}\text{coef}_\iota(\lambda)\cdot b_\iota^*(\lambda)$.

16. The decryption device according to claim 15, wherein the binary sequence dependent on the decrypted value $r'$ is a function value obtained by applying a random function to the decryption value $r'$.

17. An encryption method comprising the steps of:
generating a random number $r$ by a random number generating unit;
generating a ciphertext $C_2$ by a first encryption unit, the ciphertext $C_2$ being an exclusive OR of a binary sequence dependent on the random number r and a plaintext M, the plaintext M being a binary sequence;

generating $S_{max}$ function values $H_S(r, C_2)$ by a function calculating unit, where $S=1, \ldots, S_{max}$ and $S_{max} \geq 1$, each of the function values $H_S(r, C_2)$ being obtained by inputting a pair of the random number r and the ciphertext $C_2$ in each of collision-resistant functions $H_S$;

generating a common key K by a common key generating unit, the common key being an element of a cyclic group $G_T$;

encrypting, by a second encryption unit, the random number r by common key encryption using the common key K to generate ciphertext $C(\Psi+1)$; and generating a ciphertext $C_1$ including $C(0)=\upsilon \cdot b_1(0)+\Sigma_{\iota=2}^{I}\upsilon_\iota(0) \cdot b_\iota(0)$, $C(\lambda)=\upsilon \cdot \Sigma_{\iota=1}^{n(\lambda)} w_\iota(\lambda) \cdot b_\iota(\lambda)+\Sigma_{\iota=n(\lambda)+1}^{n(\lambda)+\zeta(\lambda)} \upsilon_\iota(\lambda) \cdot b_\iota(\lambda)$ and the ciphertext $C(\Psi+1)$ by a third encryption unit;

wherein $\Psi$ is an integer greater than or equal to 1, $\phi$ is an integer greater than or equal to 0 and less than or equal to $\Psi$, $n(\phi)$ is an integer greater than or equal to 1, $\zeta(\phi)$ is an integer greater than or equal to 0, $\lambda$ is an integer greater than or equal to 1 and less than or equal to $\Psi$, I is a constant greater than or equal to 2 and less than or equal to $n(0)+\zeta(0)$, $e_\phi$ is a nondegenerate bilinear map that outputs one element of the cyclic group $G_T$ in response to input of $n(\phi)+\zeta(\phi)$ elements $\gamma_\beta$ of a cyclic group $G_1$ and $n(\phi)+\zeta(\phi)$ elements $\gamma_\beta^*$ of a cyclic group $G_2$, $\beta=1, \ldots, n(\phi)+\zeta(\phi)$, i is an integer greater than or equal to 1 and less than or equal to $n(\phi)+\zeta(\phi)$, $b_i$ are $n(\phi)+\zeta(\phi)$-dimensional basis vectors each consisting of $n(\phi)+\zeta(\phi)$ elements of the cyclic group $G_1$, $b_i^*(\phi)$ are $n(\phi)+\zeta(\phi)$-dimensional basis vectors each consisting of $n(\phi)+\zeta(\phi)$ elements of the cyclic group $G_2$, $\delta(i, j)$ is a Kronecker delta function, $e_\phi(b_i(\phi), b_j^*(\phi))=g_T^{\tau \cdot \tau' \cdot \delta(i,j)}$ is satisfied for a generator $g_T$ of the cyclic group $G_T$ and constants $\tau$ and $\tau'$, $w(\lambda)^{\rightarrow}=(w_1(\lambda), \ldots, w_{n(\lambda)}(\lambda))$ are $n(\lambda)$-dimensional vectors each consisting of $w_1(\lambda), \ldots, w_{n(\lambda)}(\lambda)$, and at least some of the values of $\upsilon$, $\upsilon_\iota(0)$ ($\iota=2, \ldots, I$), $\upsilon_\iota(\lambda)$ ($\iota=n(\lambda)+1, \ldots, n(\lambda)+\zeta(\lambda)$) correspond to at least some of the function values $H_S(r, C_2)$.

18. The encryption method according to claim 17, wherein the binary sequence dependent on the random number r is a function value obtained by applying a random function to the random number r.

19. The encryption method according to claim 17, wherein at least some of the collision-resistant functions $H_S$ are random functions.

20. The encryption method according to claim 18, wherein at least some of the collision-resistant functions $H_S$ are random functions.

21. The encryption method according to any one of claims 17 to 20, wherein:
the constants $\tau$ and $\tau'$, the elements $w_1(\lambda), \ldots, w_{n(\lambda)}(\lambda)$, the function values $H_S(r, C_2)$ and $\upsilon$, $\upsilon_2(0), \ldots, \upsilon_I(0)$, $\upsilon_{n(\lambda)+1}\upsilon_{n(\lambda)+\zeta(\lambda)}(\lambda)$ are elements of a finite field $F_q$; and
each order of the cyclic groups $G_1$ and $G_2$ is equal to order $q$ ($q \geq 1$) of the finite field $F_q$.

22. The encryption method according to any one of claims 17 to 20, wherein $\zeta(\lambda)=3 \cdot n(\lambda)$, $I=5$, $S_{max}=3+\Sigma_{\lambda=1}^{\Psi} n(\lambda)$, $\upsilon_2(0)$, $\upsilon_4(0)$, $\upsilon_{n(\lambda)+1}(\lambda), \ldots, \upsilon_{3 \cdot n(\lambda)}(\lambda)$ are zero elements, $K=g_T^{\tau \cdot \tau' \cdot \upsilon} \in G_T$, $\upsilon'=\upsilon_3(0)$, and $\upsilon$, $\upsilon_3(0)$, $\upsilon_5(0)$, $\upsilon_{3 \cdot n(\lambda)+1}(\lambda), \ldots, \upsilon_{4 \cdot n(\lambda)}(\lambda)$ are at least some of $H_1(r, C_2), \ldots, H_{Smax}(r, C_2)$.

23. The encryption method according to claim 22, wherein:
the constants $\tau$ and $\tau'$, the elements $w_1(\lambda), \ldots, w_{n(\lambda)}(\lambda)$, the function values $H_S(r, C_2)$ and $\upsilon$, $\upsilon_2(0), \ldots, \upsilon_I(0)$, $\upsilon_{n(\lambda)+1}(\lambda), \ldots, \upsilon_{n(\lambda)+\zeta(\lambda)}(\lambda)$ are elements of a finite field $F_q$; and
each order of the cyclic groups $G_1$ and $G_2$ is equal to order $q$ ($q \geq 1$) of the finite field $F_q$.

24. A decryption method comprising the steps of:
when constants const($\mu$) that satisfy $SE=\Sigma_{\mu \in SET} const(\mu) \cdot share(\mu)$, ($\mu \in SET$) exist, generating a common key $$K' = e_0(C'(0), D^*(0)) \cdot \prod_{\mu \in SET \wedge LAB(\mu)=v(\mu)^{\rightarrow}} e_\mu(C'(\mu), D^*(\mu))^{const(\mu)} \cdot \prod_{\mu \in SET \wedge LAB(\mu)=\neg v(\mu)^{\rightarrow}} e_\mu(C'(\mu), D^*(\mu))^{const(\mu)/(v(\mu)^{\rightarrow} \cdot w(\mu)^{\rightarrow})},$$

by a common key generating unit, using first key information $D^*(0)$, second key information $D^*(\lambda)$ and input ciphertexts $C'(0)$ and $C'(\lambda)$;

decrypting an input ciphertext $C'(\Psi+1)$, by a first decryption unit, using the common key K' to generate a decrypted value r';

generating $S_{max}$ function values $H_S(r', C_2')$ where $S=1, \ldots, S_{max}$ and $S_{max} \geq 1$, by a function calculating unit, each of the function values $H_S(r', C_2')$ being obtained by inputting a pair of the decrypted value r' and an input ciphertext $C_2'$ into each of collision-resistant function $H_S$; and rejecting decryption by a determination unit if the ciphertexts $C'(0)$ and $C'(\lambda)$ do not match ciphertexts $C''(0)=\upsilon'' \cdot b_1(0)+\Sigma_{\iota=2}^{I} \upsilon_\iota''(0) \cdot b_\iota(0)$ and $C''(\lambda)=\upsilon'' \cdot \Sigma_{\iota=1}^{n(\lambda)} w_\iota(\lambda) \cdot b_\iota(\lambda)+\Sigma_{\iota=n(\lambda)+1}^{n(\lambda)+\zeta(\lambda)} \upsilon_\iota''(\lambda) \cdot b_\iota(\lambda)$;

wherein the values of at least some of $\upsilon''$, $\upsilon_2''(0), \ldots, \upsilon_I''(0)$, $\upsilon_{n(\lambda)+1}''(\lambda), \ldots, \upsilon_{n(\lambda)+\zeta(\lambda)}''(\lambda)$ correspond to at least some of the function values $H_S(r', C_2')$; and $\Psi$ is an integer greater than or equal to 1, $\phi$ is an integer greater than or equal to 0 and less than or equal to $\Psi$, $\zeta(\phi)$ is an integer greater than or equal to 0, $\lambda$ is an integer greater than or equal to 1 and less than or equal to $\Psi$, $n(\phi)$ is an integer greater than or equal to 1, I is a constant greater than or equal to 2 and less than or equal to $n(0)+\zeta(0)$, $e_\phi$ is the nondegenerate bilinear map that outputs one element of a cyclic group $G_T$ in response to input of $n(\phi)+\zeta(\phi)$ elements $\gamma_\beta$ of a cyclic group $G_1$ and $n(\phi)+\zeta(\phi)$ elements $\gamma_\beta^*$ of a cyclic group $G_2$, $\beta=1, \ldots, n(\phi)+\zeta(\phi)$, i is an integer greater than or equal to 1 and less than or equal to $n(\phi)+\zeta(\phi)$, $b_i(\phi)$ are $n(\phi)+\zeta(\phi)$-dimensional basis vectors each consisting of $n(\phi)+\zeta(\phi)$ elements of the cyclic group $G_1$, $b_i^*(\phi)$ are $n(\phi)+\zeta(\phi)$-dimensional basis vectors each consisting of $n(\phi)+\zeta(\phi)$ elements of the cyclic group $G_2$, $\delta(i, j)$ is a Kronecker delta function, $e_\phi(bi(\phi), b_j^*(\phi))=g_T^{\tau \cdot \tau' \cdot \delta(i,j)}$ is satisfied for a generator $g_T$ of the cyclic group $G_T$ and constants $\tau$ and $\tau'$, $v(\lambda)^{\rightarrow}=(v_1(\lambda), \ldots, v_{n(\lambda)}(\lambda))$ are $n(\lambda)$-dimensional vectors each consisting of $v_1(\lambda), \ldots, v_{n(\lambda)}(\lambda)$, $w(\lambda)^{\rightarrow}=(w_1(\lambda), \ldots, w_{n(\lambda)}(\lambda))$ are $n(\lambda)$-dimensional vectors each consisting of $w_2(\lambda), \ldots, w_{n(\lambda)}(\lambda)$, labels LAB($\lambda$) ($\lambda=1, \ldots, \Psi$) are pieces of information each representing the $n(\lambda)$-dimensional vector $v(\lambda)^{\rightarrow}$ or the negation $\neg v(\lambda)^{\rightarrow}$ of the $n(\lambda)$-dimensional vector $v(\lambda)^{\rightarrow}$, LAB($\lambda$)=$v(\lambda)^{\rightarrow}$ means that LAB($\lambda$) represents the $n(\lambda)$-dimensional vector $v(\lambda)^{\rightarrow}$, LAB($\lambda$)=$\neg v(\lambda)^{\rightarrow}$ means that LAB($\lambda$) represents the negation $\neg v(\lambda)^{\rightarrow}$ of the $n(\lambda)$-dimensional vector, share($\lambda$), where $\lambda=1, \ldots, \Psi$, represents share information obtained by secret-sharing of secret information SE, the first key information is $D^*(0)=-SE \cdot b_1^*(0)+\Sigma_{\iota=2}^{I} coef_\iota(0) \cdot b_\iota^*(0)$, the second key information for $\lambda$ that satisfies $LAB(\lambda)=v(\lambda)^{\rightarrow}$ is $D^*(\lambda)= (share(\lambda)+coef(\lambda) \cdot v_1(\lambda)) \cdot b_1^*(\lambda)+\Sigma_{\iota=2}^{n(\lambda)} coef(\lambda) \cdot v_\iota(\lambda) \cdot b_\iota^*(\lambda)+\Sigma_{\iota=n(\lambda)+1}^{n(\lambda)+\zeta(\lambda)} coef_\iota(\lambda) \cdot b_\iota^*(\lambda)$, the second information for $\lambda$ that satisfies $LAB(\lambda)=\neg v(\lambda)^{\rightarrow}$ is $D^*(\lambda)=share(\lambda) \cdot \Sigma_{\iota=1}^{n(\lambda)} v_\iota(\lambda) \cdot b_\iota^*(\lambda)+\Sigma_{\iota=n(\lambda)+1}^{n(\lambda)+\zeta(\lambda)} coef_\iota(\lambda) \cdot b^*(\lambda)$, and SET represents a set of $\lambda$ that satisfies $\{LAB(\lambda)=v(\lambda)^{\rightarrow}\} \wedge \{v(\lambda)^{\rightarrow} \cdot w(\lambda)^{\rightarrow}=0\}$ or $\{LAB(\lambda)=\neg v(\lambda)^{\rightarrow}\} \wedge \{v(\lambda)^{\rightarrow} \cdot w(\lambda)^{\rightarrow} \neq 0\}$.

25. The decryption method according to claim 24, wherein at least some of the collision-resistant functions $H_S$ are random functions.

26. The decryption method according to claim 25, wherein: the elements $v_1(\lambda), \ldots, v_{n(\lambda)}(\lambda)$, the elements $w_1(\lambda), \ldots, w_{n(\lambda)}(\lambda)$, the function values $H_S(r', C_2')$ and $\upsilon''$, $\upsilon_2''(0), \ldots, \upsilon_I''(0), \upsilon n(\lambda)+1''(\lambda), \ldots, \upsilon_{n(\lambda)+\zeta(\lambda)}''(\lambda)$ are elements of a finite field $F_q$; and each order of the cyclic groups $G_1$ and $G_2$ is equal to order q ($q \geq 1$) of the finite field $F_q$.

27. The decryption method according to claim 24, wherein: the elements $v_1(\lambda), \ldots, v_{n(\lambda)}(\lambda)$, the elements $w_1(\lambda), \ldots, w_{n(\lambda)}(\lambda)$, the function values $H_S(r', C_2')$ and $\upsilon''$, $\upsilon_2''(0), \ldots, \upsilon_I''(0), \upsilon n(\lambda)+1''(\lambda), \ldots, \upsilon_{n(\lambda)+\zeta(\lambda)}''(\lambda)$ are elements of a finite field $F_q$; and each order of the cyclic groups $G_1$ and $G_2$ is equal to order q ($q \geq 1$) of the finite field $F_q$.

28. The decryption method according to any one of claims 24 to 27, wherein $\zeta(\lambda)=3 \cdot n(\lambda)$, $I=5$, $S_{max}=3+\Sigma_{\lambda=1}^{\Psi} n(\lambda)$, $\upsilon_2''(0), \upsilon_4''(0), \upsilon_{n(\lambda)+1}''(\lambda), \upsilon_{3 \cdot n(\lambda)}''(\lambda)$ are zero elements, $K'=g_T^{\tau \cdot \tau' \cdot \upsilon'''} \epsilon G_T$, $\upsilon'''=\upsilon_3''(0), \upsilon'', \upsilon_3''(0), \upsilon_5''(0), \upsilon_{3 \cdot n(\lambda)+1}''(\lambda), \ldots, v_{4 \cdot n(\lambda)}''(\lambda)$ are at least some of $H_1(r', C_2'), H_{Smax}(r', C_2')$, the first key information is $D^*(0)=-SE \cdot b_1^*(0)+b_3^*(0)+coef_4(0) \cdot b_4^*(0)$, the second key information for $\lambda$ that satisfies $LAB(\lambda)=v(\lambda)^{\rightarrow}$ is $D^*(\lambda)=(share(\lambda)+coef(\lambda) \cdot v_1(\lambda)) \cdot b_\iota^*(\lambda)+\Sigma_{\iota=2}^{n(\lambda)} coef(\lambda) \cdot v_\iota(\lambda) \cdot b_\iota^*(\lambda)+\Sigma_{\iota=2 \cdot n(\lambda)+1}^{3 \cdot n(\lambda)} coef_\iota(\lambda) \cdot b_\iota^*(\lambda)$, and the second key information for $\lambda$ that satisfies $LAB(\lambda)=\neg v(\lambda)^{\rightarrow}$ is $D^*(\lambda)=\neg v(\lambda)^{\rightarrow}$ is $D^*(\lambda)=share(\lambda) \cdot \Sigma_{\iota=1}^{n(\lambda)} v_\iota(\lambda) \cdot b_\iota^*(\lambda)+\Sigma_{\iota=2 \cdot n(\lambda)+1}^{3 \cdot n(\lambda)} coef_\iota(\lambda) \cdot b_\iota^*(\lambda)$.

29. The decryption method according to claim 28, wherein the binary sequence dependent on the decrypted value r' is a function value obtained by applying a random function to the decrypted value r'.

30. The decryption method according to any one of claims 24 to 27, further comprising the step of generating a decrypted value M' by a second decryption unit when the ciphertexts C'(0) and C'($\lambda$) match ciphertexts $C''(0)=\upsilon'' \cdot b_1(0)+\Sigma_{\iota=2}^{I} \upsilon_{\iota'''}0) \cdot b_\iota(0)$ and $C''(\lambda)=\upsilon'' \cdot \Sigma_{\iota=1}^{n(\lambda)} w_\iota(\lambda) \cdot b_\iota(\lambda)+\Sigma_{\iota=n(\lambda)+1}^{n(\lambda)+\zeta(\lambda)} \upsilon_\iota''(\lambda) \cdot b_\iota(\lambda)$, the decrypted value M' being an exclusive OR of a binary sequence dependent on the decrypted value r' and a binary sequence which is an input ciphertext $C_2'$.

31. The decryption method according to claim 30, wherein $\zeta(\lambda)=3 \cdot n(\lambda)$, $I=5$, $S_{max}=3+\Sigma_{\lambda=1}^{\Psi} n(\lambda)$, $\upsilon_2''(0), \upsilon_4''(0), \upsilon_{n(\lambda)+1}''(\lambda), \upsilon_{3 \cdot n(\lambda)}''(\lambda)$ are zero elements, $K'=g_T^{\tau \cdot \tau' \cdot \upsilon'''} \epsilon G_T$, $\upsilon'''=\upsilon_3''(0), \upsilon'', \upsilon_3''(0), \upsilon_5''(0), \upsilon_{3 \cdot n(\lambda)+1}''(\lambda), \ldots, v_{4 \cdot n(\lambda)}''(\lambda)$ are at least some of $H_1(r', C_2'), H_{Smax}(r', C_2')$, the first key information is $D^*(0)=-SE \cdot b_1^*(0)+b_3^*(0)+coef_4(0) \cdot b_4^*(0)$, the second key information for $\lambda$ that satisfies $LAB(\lambda)=v(\lambda)^{\rightarrow}$ is $D^*(\lambda)=(share(\lambda)+coef(\lambda) \cdot v_1(\lambda)) \cdot b_\iota^*(\lambda)+\Sigma_{\iota=2}^{n(\lambda)} coef(\lambda) \cdot v_\iota(\lambda) \cdot b_\iota^*(\lambda)+\Sigma_{\iota=2 \cdot n(\lambda)+1}^{3 \cdot n(\lambda)} coef_\iota(\lambda) \cdot b_\iota^*(\lambda)$, and the second key information for $\lambda$ that satisfies $LAB(\lambda)=\neg v(\lambda)^{\rightarrow}$ is $D^*(\lambda)= share(\lambda) \cdot \Sigma_{\iota=1}^{n(\lambda)} v_\iota(\lambda) \cdot b_\iota^*(\lambda)+\Sigma_{\iota=2 \cdot n(\lambda)+1}^{3 \cdot n(\lambda)} coef_\iota(\lambda) \cdot b_\iota^*(\lambda)$.

32. The decryption method according to claim 31, wherein the binary sequence dependent on the decrypted value r' is a function value obtained by applying a random function to the decryption value r'.

33. A computer-readable recording medium having recorded thereon a computer program for causing a computer to function as the encryption device of claim 1.

34. A computer-readable recording medium having recorded thereon a computer program for causing a computer to function as the decryption device of claim 8.

* * * * *

UNITED STATES PATENT AND TRADEMARK OFFICE
CERTIFICATE OF CORRECTION

PATENT NO. : 8,897,442 B2  
APPLICATION NO. : 13/703381  
DATED : November 25, 2014  
INVENTOR(S) : Eiichiro Fujisaki Page 1 of 2

It is certified that error appears in the above-identified patent and that said Letters Patent is hereby corrected as shown below:

In the Claims

Column 38, Claim 1, lines 10-11, change "$C(\lambda) = \upsilon \cdot \Sigma_{K=1}^{n(\lambda)} w_\iota(\lambda) \cdot b_\iota(\lambda) + \Sigma_{\iota=n(\lambda)+1}^{n(\lambda)+\iota(\lambda)} \upsilon(\lambda) \cdot b_\iota(\lambda)$" to --$C(\lambda) = \upsilon \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota(\lambda) \cdot b_\iota(\lambda)$--;

Column 38, Claim 1, line 33, change "of $w_1(\lambda), \ldots, w_n(\lambda)(\lambda),$" to --of $w_1(\lambda), \ldots, w_{n(\lambda)}(\lambda),$--.

Column 39, Claim 8, line 3, change "$SE = \tau_{\mu \in SET}\, const(\lambda) \cdot share(\lambda)\ (\lambda \in ET)$" to --$SE = \Sigma_{\mu \in SET}\, const(\mu) \cdot share(\mu)\ (\mu \in SET)$--;

Column 39, Claim 8, line 48, change "$e_\varphi(bi(\varphi), b_j^*(\varphi)) = g_T^{\tau \cdot \tau' \cdot \delta(i,j)}$" to --$e_\varphi(b_i(\varphi), b_j^*(\varphi)) = g_T^{\tau \cdot \tau' \cdot \delta(i,j)}$--;

Column 39, Claim 8, lines 65-66, change "$D^*(\lambda) = (share(\lambda) + coef(\lambda) \cdot v_1(\lambda)) \cdot b_1^*(\lambda) + \Sigma_{\iota=2}^{n(\lambda)} coef(\lambda) \cdot v_\iota(\lambda) \cdot b_\iota^*(\lambda) + \Sigma_{\iota=(\lambda)+1}^{n(\lambda)+\zeta(\lambda)} coef_\iota(\lambda) \cdot b_\iota^*(\lambda),$" to --$D^*(\lambda) = (share(\lambda) + coef(\lambda) \cdot v_1(\lambda)) \cdot b_1^*(\lambda) + \Sigma_{\iota=2}^{n(\lambda)} coef(\lambda) \cdot v_\iota(\lambda) \cdot b_\iota^*(\lambda) + \Sigma_{\iota=n(\lambda)+1}^{n(\lambda)+\zeta(\lambda)} coef_\iota(\lambda) \cdot b_\iota^*(\lambda),$--.

Column 40, Claim 8, line 3, change "$\{LAB(\lambda) = v(\lambda)^\rightarrow\}^{\wedge}\{v(\lambda)^\rightarrow = 0\}$" to --$\{LAB(\lambda) = v(\lambda)^\rightarrow\} \wedge \{v(\lambda)^\rightarrow \cdot w(\lambda)^\rightarrow = 0\}$--;

Column 40, Claim 10, line 11, change "$\upsilon n(\lambda)+1''(\lambda)$" to --$\upsilon_{n(\lambda)+1}''(\lambda)$--;

Column 40, Claim 14, lines 43-44, change "$C''(\lambda) = \upsilon'' \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} v_\iota''(\lambda) \cdot b_\iota(\lambda)$" to --$C''(\lambda) = \upsilon'' \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota''(\lambda) \cdot b_\iota(\lambda)$--;

Column 40, Claim 15, lines 49-50, change "$K' = g_T^{\tau \cdot \tau' \cdot \upsilon'''} \in G_T, \upsilon''' = \upsilon_3''(0), \upsilon_5''(0), \upsilon_{3 \cdot n(\lambda)+1}''(\lambda), \ldots, \upsilon_{4 \cdot n(\lambda)}''(\lambda)$" to --$K' = g_T^{\tau \cdot \tau' \cdot \upsilon'''} \in G_T, \upsilon''' = \upsilon_3''(0), \upsilon'', \upsilon_3''(0), \upsilon_5''(0), \upsilon_{3 \cdot n(\lambda)+1}''(\lambda), \ldots, \upsilon_{4 \cdot n(\lambda)}''(\lambda)$--.

Column 41, Claim 17, line 31, change "equal to $n(\varphi) + \zeta(\varphi), b_i$ are" to --equal to $n(\varphi) + \zeta(\varphi), b_i(\varphi)$ are--;

Signed and Sealed this  
Ninth Day of June, 2015

Michelle K. Lee  
*Director of the United States Patent and Trademark Office*

CERTIFICATE OF CORRECTION (continued)
U.S. Pat. No. 8,897,442 B2

Page 2 of 2

Column 41, Claim 21, line 58, change "$\upsilon_{n(\lambda)+1} \upsilon_{n(\lambda)+\zeta(\lambda)}(\lambda)$ are elements" to --$\upsilon_{n(\lambda)+1}(\lambda), ..., \upsilon_{n(\lambda)+\zeta(\lambda)}(\lambda)$ are elements--.

Column 42, Claim 24, line 55, change "$e_\varphi(bi(\varphi), b_j^*(\varphi)) = g_T^{\tau \cdot \tau' \cdot \delta(i,j)}$" to --$e_\varphi(b_i(\varphi), b_j^*(\varphi)) = g_T^{\tau \cdot \tau' \cdot \delta(i,j)}$--;

Column 42, Claim 24, line 60, change "consisting of $w_2(\lambda), ..., w_{n(\lambda)}(\lambda),$" to --consisting of $w_1(\lambda), ..., w_{n(\lambda)}(\lambda),$--.

Column 43, Claim 24, lines 8-9, change "is $D^*(\lambda) = share(\lambda) \cdot \Sigma_{i=1}^{n(\lambda)} v_i(\lambda) \cdot b_i^*(\lambda) + \Sigma_{i=n(\lambda)+1}^{n(\lambda)+\zeta(\lambda)} coef_i(\lambda) \cdot b^*(\lambda),$" to --is $D^*(\lambda) = share(\lambda) \cdot \Sigma_{i=1}^{n(\lambda)} v_i(\lambda) \cdot b_i^*(\lambda) + \Sigma_{i=n(\lambda)+1}^{n(\lambda)+\zeta(\lambda)} coef_i(\lambda) \cdot b^*(\lambda),$--;

Column 43, Claim 26, lines 17-18, change "values $H_S(r', C_2')$ and $\upsilon'', \upsilon_2''(0), ..., \upsilon_1''(0), \upsilon n(\lambda)+1''(\lambda), ..., \upsilon_{n(\lambda)+\zeta(\lambda)}''(\lambda)$ are" to --values $H_S(r', C_2')$, where $S = 1, ..., S_{max}$, and $\upsilon'', \upsilon_2''(0), ..., \upsilon_1''(0), \upsilon_{n(\lambda)+1}''(\lambda), ..., \upsilon_{n(\lambda)+\zeta(\lambda)}''(\lambda)$ are--;

Column 43, Claim 27, line 25, change "$\upsilon n(\lambda)+1''(\lambda), ..., \upsilon_{n(\lambda)+\zeta(\lambda)}''(\lambda)$" to --$\upsilon_{n(\lambda)+1}''(\lambda), ..., \upsilon_{n(\lambda)+\zeta(\lambda)}''(\lambda)$--.

Column 44, Claim 30, lines 10-11, change "$C''(0) = \upsilon'' \cdot b_1(0) + \Sigma_{i=2}^{l} \upsilon_i''(0) \cdot b_i(0)$" to --$C''(0) = \upsilon'' \cdot b_1(0) + \Sigma_{i=2}^{l} \upsilon_i''(0) \cdot b_i(0)$--;

Column 44, Claim 31, line 18, change "$\upsilon_{n(\lambda)+1}''(\lambda), \upsilon_{3 \cdot n(\lambda)}''(\lambda)$ are zero elements" to --$\upsilon_{n(\lambda)+1}''(\lambda), ..., \upsilon_{3 \cdot n(\lambda)}''(\lambda)$ are zero elements--;

Column 44, Claim 31, line 20, change "at least some of $H_1(r', C_2'), H_{Smax}(r', C_2')$" to --at least some of $H_1(r', C_2'), ..., H_{Smax}(r', C_2')$--.